(12) United States Patent (10) Patent No.: US 8,444,425 B2
Byrne (45) Date of Patent: May 21, 2013

(54) WIRE MANAGEMENT SYSTEM FOR MODULAR ELECTRICAL SYSTEMS

(76) Inventor: Norman R. Byrne, Ada, MI (US)

( * ) Notice: Subject to any disclaimer, the term of this patent is extended or adjusted under 35 U.S.C. 154(b) by 0 days.

(21) Appl. No.: 12/664,186

(22) PCT Filed: Jun. 11, 2008

(86) PCT No.: PCT/US2008/007303
§ 371 (c)(1),
(2), (4) Date: Dec. 11, 2009

(87) PCT Pub. No.: WO2008/154028
PCT Pub. Date: Dec. 18, 2008

(65) Prior Publication Data
US 2010/0190369 A1 Jul. 29, 2010

Related U.S. Application Data

(60) Provisional application No. 60/943,226, filed on Jun. 11, 2007.

(51) Int. Cl.
*H01R 4/60* (2006.01)
(52) U.S. Cl.
USPC ......................................... 439/215
(58) Field of Classification Search
USPC .......................... 439/215, 557, 214
See application file for complete search history.

(56) References Cited

U.S. PATENT DOCUMENTS

| | | | | |
|---|---|---|---|---|
| 2,293,850 A * | 8/1942 | Robinson | ....................... | 439/216 |
| 2,457,831 A * | 1/1949 | O'Brien | ........................ | 439/214 |
| 4,278,834 A * | 7/1981 | Boundy | ........................ | 174/497 |
| 4,740,167 A * | 4/1988 | Millhimes et al. | ............... | 439/92 |
| 4,773,866 A * | 9/1988 | Basques | ........................... | 439/21 |
| 4,907,384 A * | 3/1990 | Underwood | ................ | 52/126.6 |
| 4,959,021 A * | 9/1990 | Byrne | ............................. | 439/310 |
| 5,021,608 A * | 6/1991 | Hadfield | ....................... | 174/483 |
| 5,044,971 A * | 9/1991 | Hollingsworth | .............. | 439/215 |
| 5,051,100 A * | 9/1991 | Kato et al. | ..................... | 439/140 |
| 5,087,207 A * | 2/1992 | Byrne | ............................. | 439/215 |
| 5,092,786 A * | 3/1992 | Juhlin et al. | ................... | 439/215 |
| 5,096,431 A * | 3/1992 | Byrne | ............................. | 439/171 |
| 5,096,434 A * | 3/1992 | Byrne | ............................. | 439/215 |
| 5,171,159 A * | 12/1992 | Byrne | ............................ | 439/215 |
| 5,236,370 A * | 8/1993 | King et al. | ..................... | 439/215 |
| 5,252,086 A * | 10/1993 | Russell et al. | ................ | 439/215 |
| 5,291,678 A * | 3/1994 | Murray | ........................... | 40/564 |
| 5,340,326 A * | 8/1994 | LeMaster | ...................... | 439/207 |
| 5,380,224 A * | 1/1995 | DiCicco | ..................... | 439/607.5 |
| 5,582,522 A * | 12/1996 | Johnson | ....................... | 439/214 |
| 5,888,097 A * | 3/1999 | DiCicco | .................... | 439/607.44 |
| 6,027,352 A * | 2/2000 | Byrne | ............................ | 439/215 |
| 6,036,517 A * | 3/2000 | Byrne | ............................ | 439/215 |
| 6,089,892 A * | 7/2000 | Snow et al. | ................... | 439/217 |
| 6,123,562 A * | 9/2000 | King et al. | .................... | 439/215 |

(Continued)

*Primary Examiner* — Amy Cohen Johnson
*Assistant Examiner* — Vladimir Imas
(74) *Attorney, Agent, or Firm* — Gardner, Linn, Burkhart & Flory LLP

(57) ABSTRACT

A modular electrical system (230) comprises a number of separate components forming a four-wire system (110). The component set (230) includes receptacle junction blocks (130), two-way connectors (232), four-way connectors (236), two-way jumper cable assemblies (234), and three-way jumper cable assemblies (238). The components of the component set (230) include various configurations of male blade terminals (150) and female terminals (200) located on the individual components so that a number of differing system configurations can be achieved.

19 Claims, 58 Drawing Sheets

U.S. PATENT DOCUMENTS

| | | | |
|---|---|---|---|
| 6,323,421 B1 * | 11/2001 | Pawson et al. | 174/503 |
| 6,335,484 B1 * | 1/2002 | Jarry et al. | 174/480 |
| 6,384,336 B1 * | 5/2002 | VanderVelde et al. | 174/95 |
| 6,406,314 B1 * | 6/2002 | Byrne | 439/215 |
| 6,437,247 B1 * | 8/2002 | Holliday | 174/101 |
| 6,575,777 B2 * | 6/2003 | Henriott et al. | 439/215 |
| 6,902,415 B2 * | 6/2005 | Ramsey et al. | 439/215 |
| 7,122,738 B2 * | 10/2006 | Kanamaru | 174/50 |
| 7,201,593 B2 * | 4/2007 | Kondas et al. | 439/215 |
| 7,262,371 B2 * | 8/2007 | Makwinski et al. | 174/481 |
| 7,294,005 B1 * | 11/2007 | Laukhuf | 439/215 |
| 7,456,366 B2 * | 11/2008 | Makwinski et al. | 174/481 |
| 7,465,178 B2 * | 12/2008 | Byrne | 439/215 |
| 7,494,356 B2 * | 2/2009 | Byrne | 439/215 |
| 7,544,900 B2 * | 6/2009 | Makwinski et al. | 174/481 |
| 7,648,379 B2 * | 1/2010 | Johnson et al. | 439/215 |
| 7,651,353 B2 * | 1/2010 | Laukhuf | 439/215 |
| 2002/0052133 A1 * | 5/2002 | Henriott et al. | 439/215 |
| 2005/0130476 A1 * | 6/2005 | Kochanski | 439/215 |
| 2006/0024996 A1 * | 2/2006 | Johnson et al. | 439/215 |
| 2006/0035499 A1 * | 2/2006 | Johnson et al. | 439/215 |
| 2006/0052009 A1 * | 3/2006 | Johnson et al. | 439/660 |
| 2007/0259548 A1 * | 11/2007 | Byrne | 439/215 |
| 2009/0239402 A1 * | 9/2009 | Byrne | 439/215 |

* cited by examiner

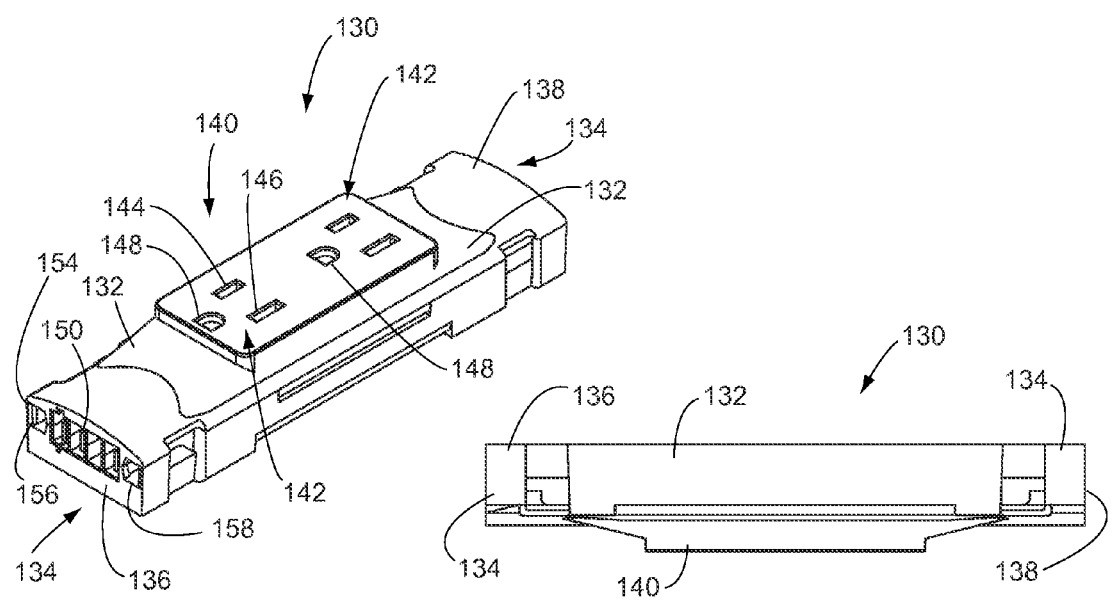
Fig. 2
Fig. 3
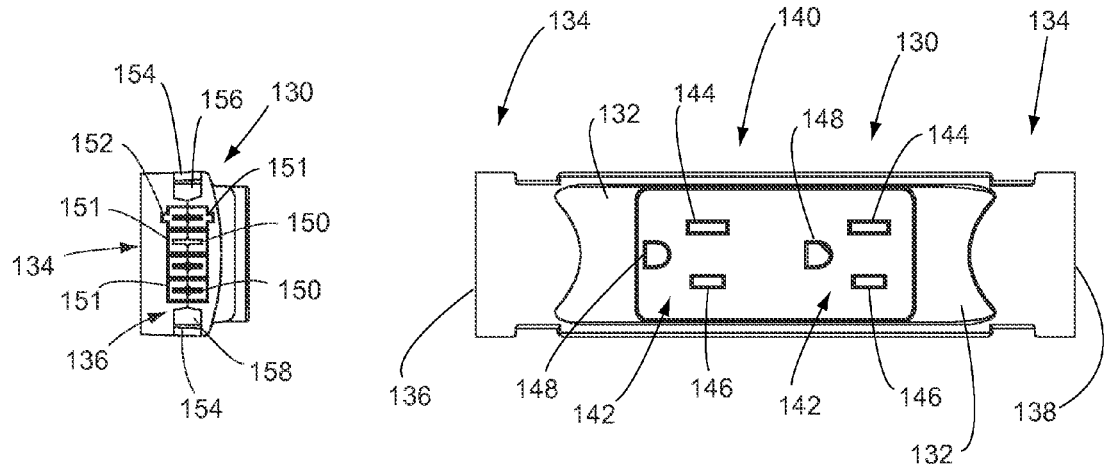
Fig. 4
Fig. 5

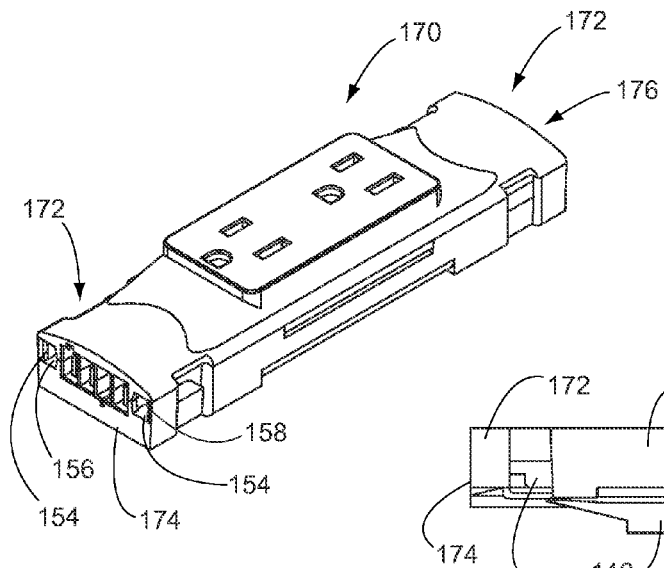
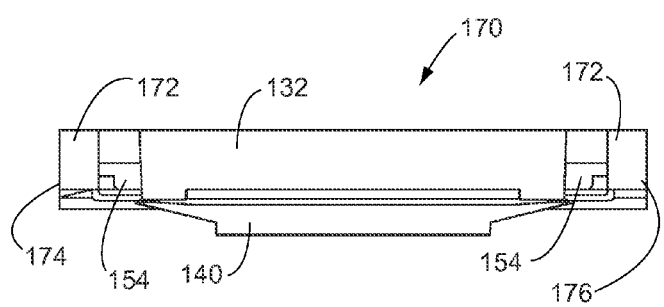
Fig. 10
Fig. 11
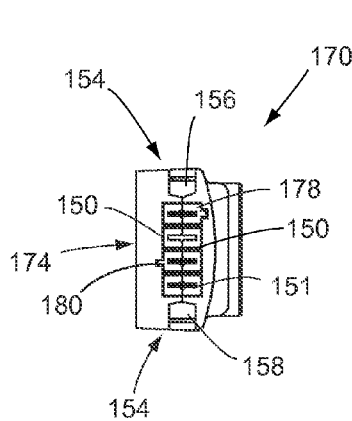
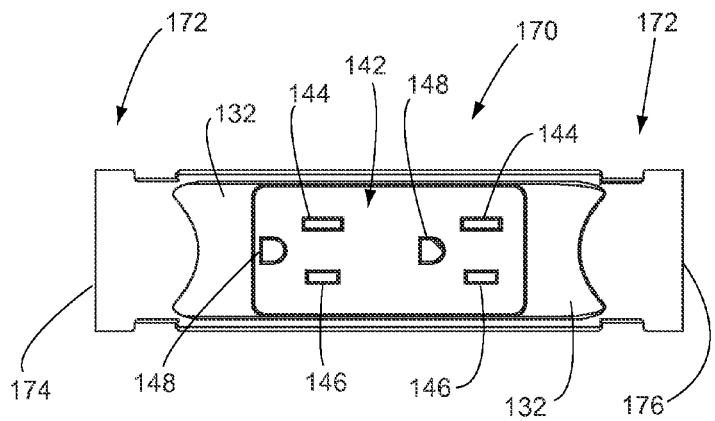
Fig 12
Fig 13

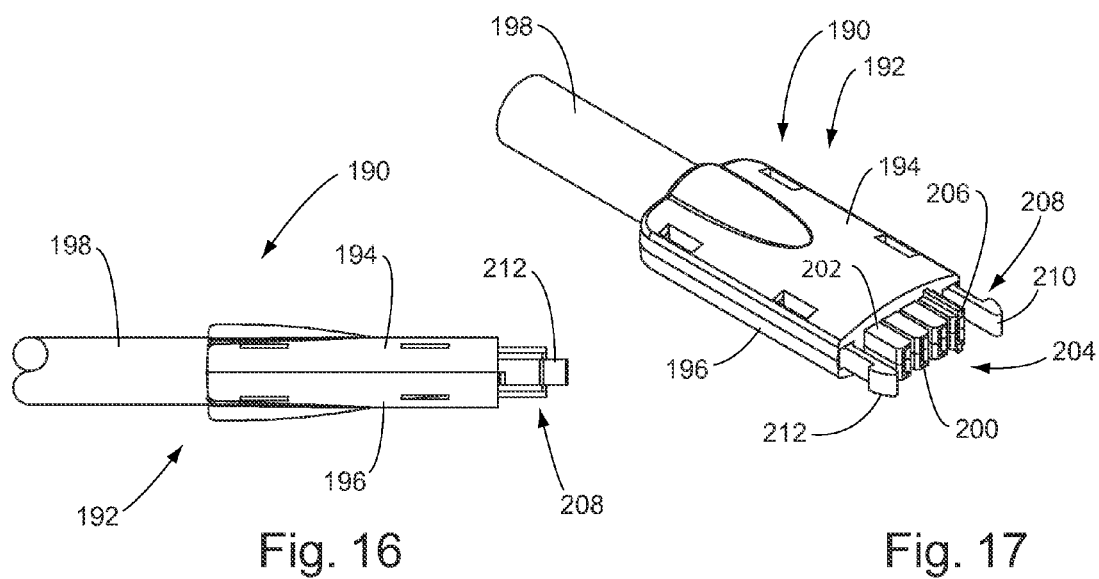
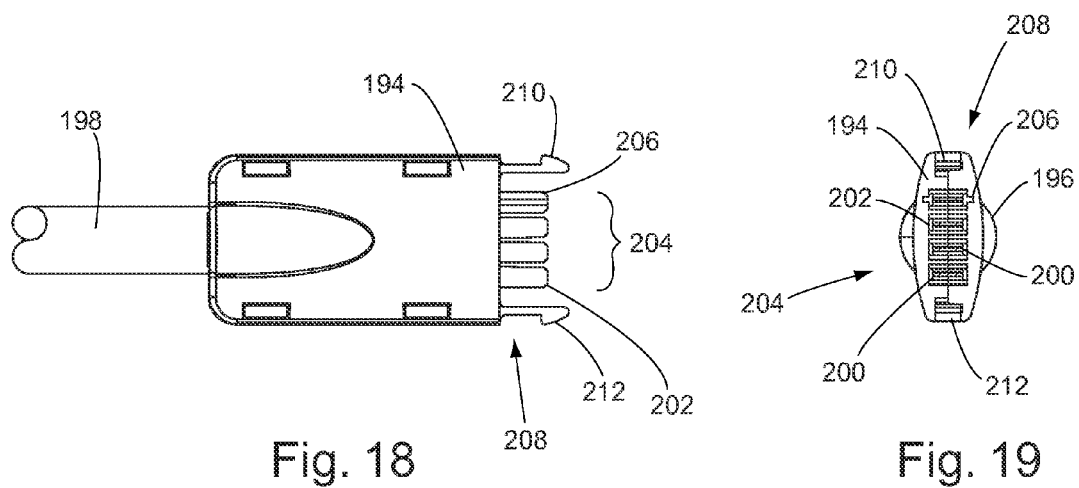

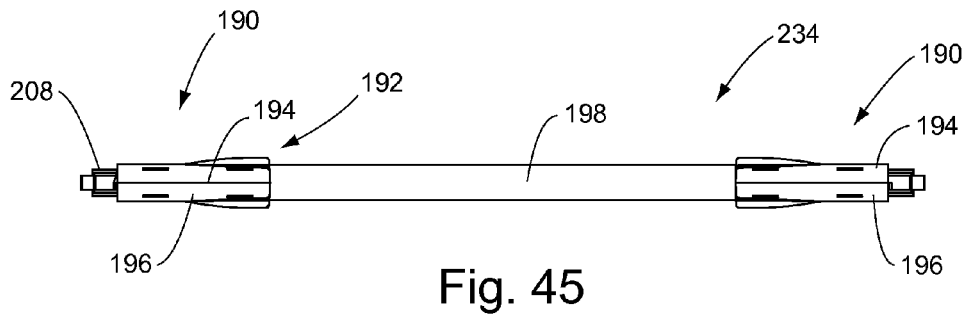
Fig. 45
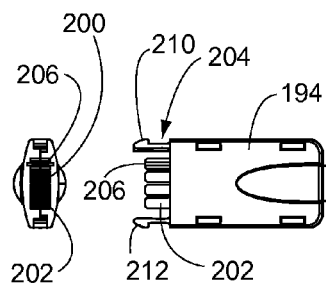
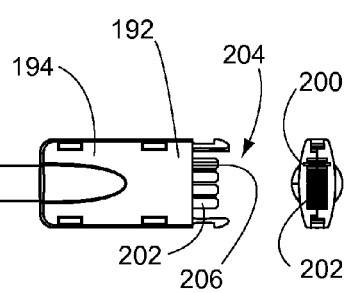
Fig. 47  Fig. 46  Fig. 48
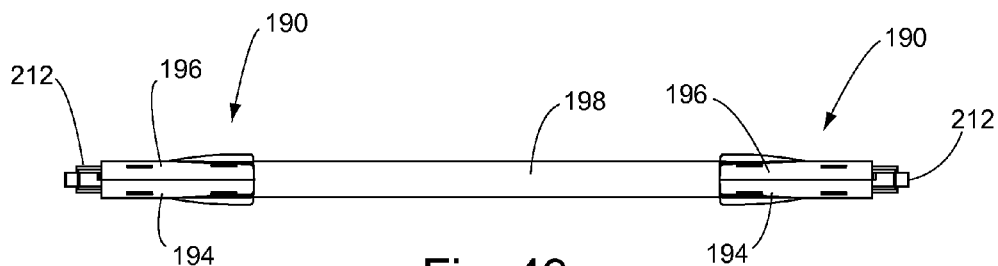
Fig. 49
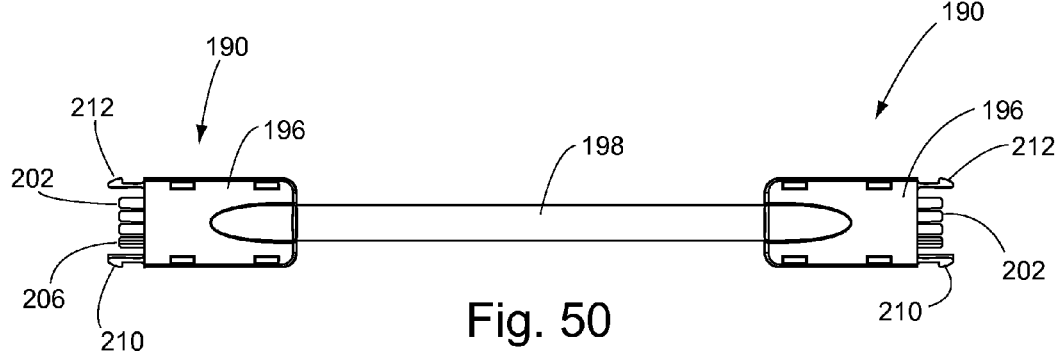
Fig. 50

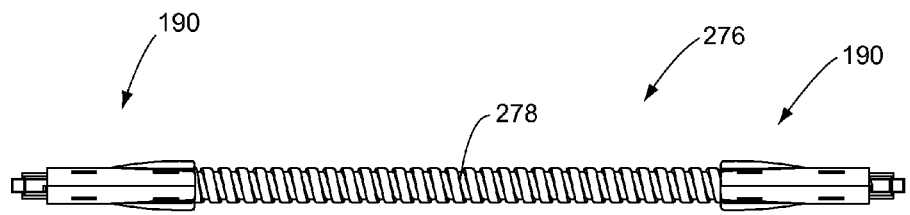
Fig. 51
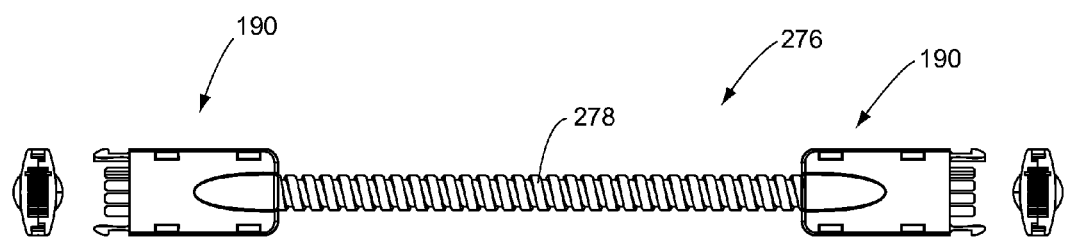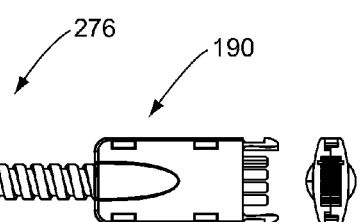
Fig. 52A  Fig. 52  Fig. 52B
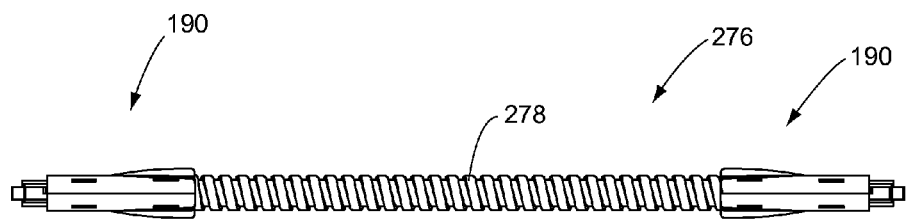
Fig. 53
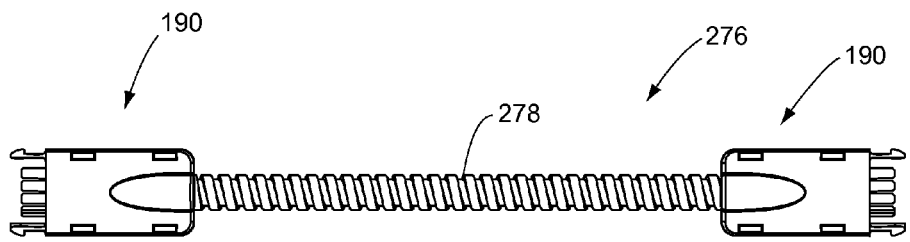
Fig. 54

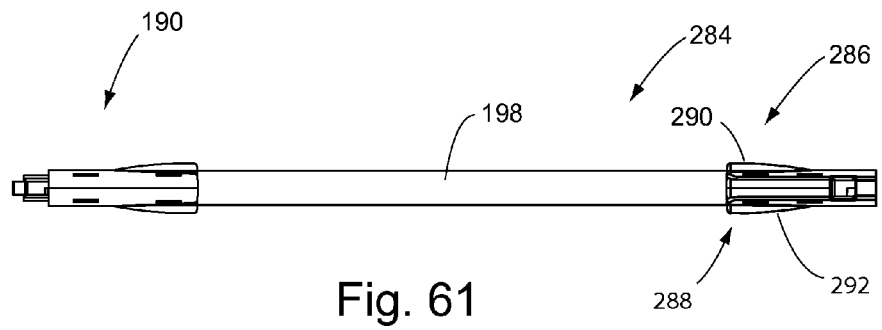
Fig. 61
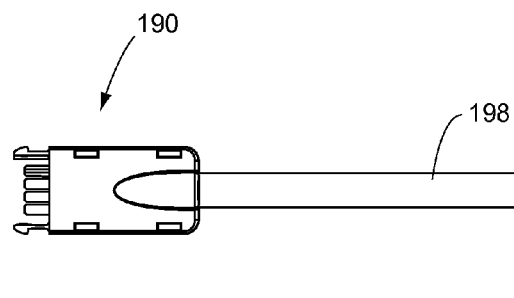
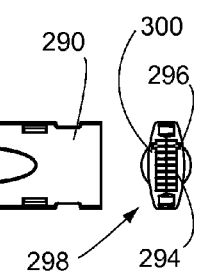
Fig. 63        Fig. 62        Fig. 64
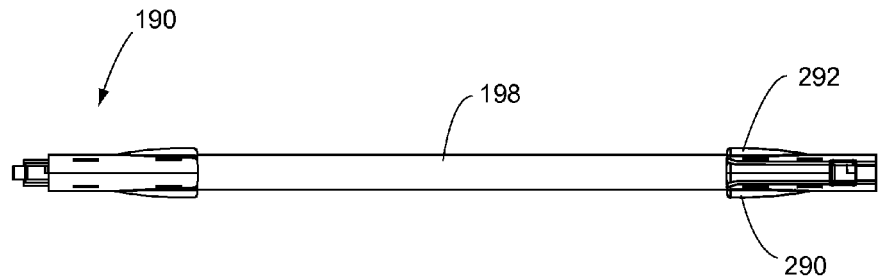
Fig. 65
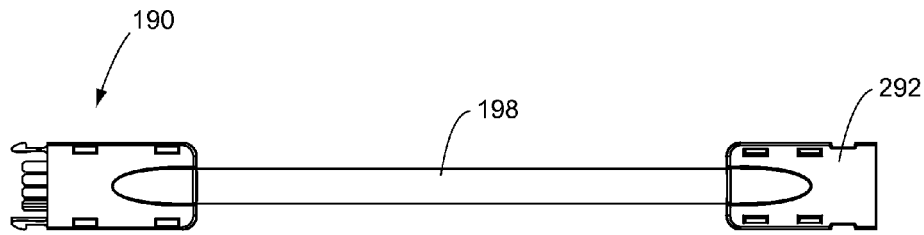
Fig. 66

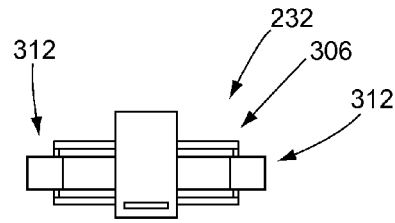
Fig. 82
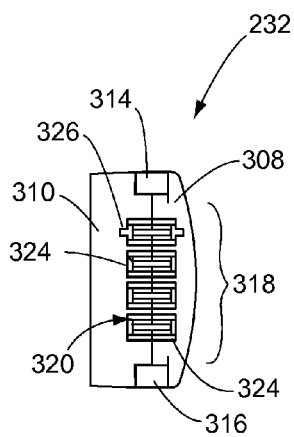 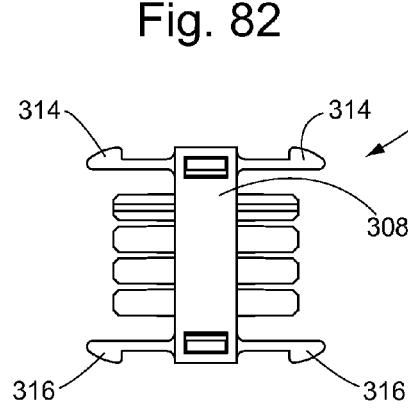 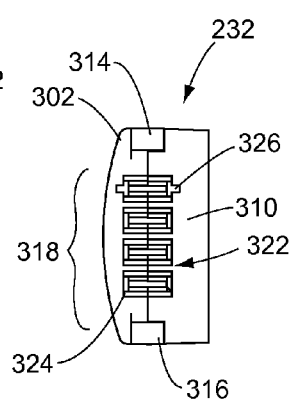
Fig. 84　　　　　Fig. 83　　　　　Fig. 85
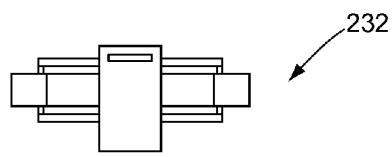
Fig. 86
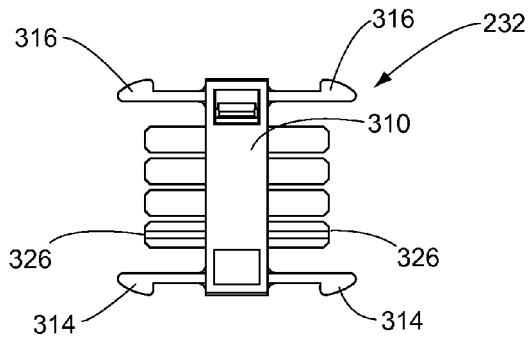
Fig. 87

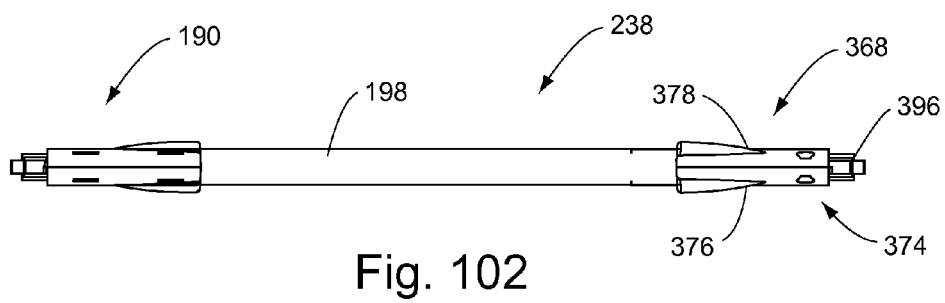
Fig. 102
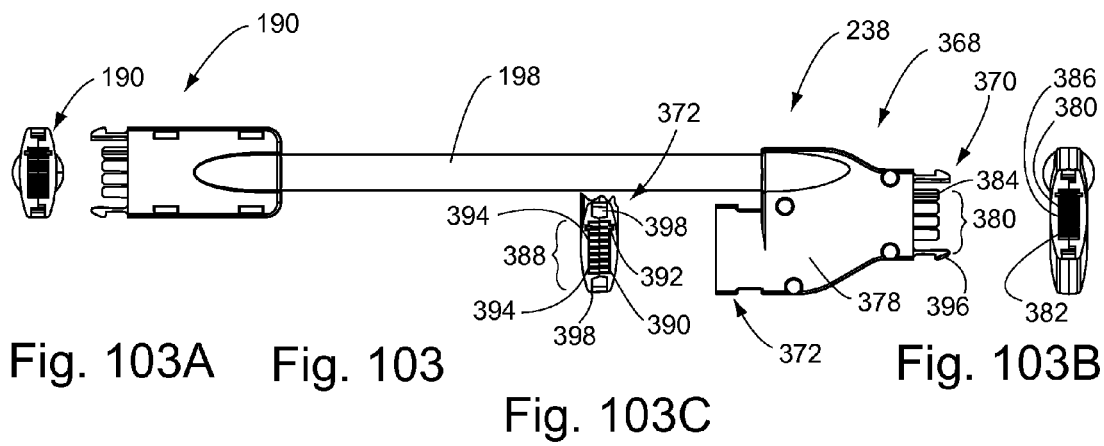
Fig. 103A    Fig. 103    Fig. 103B
Fig. 103C
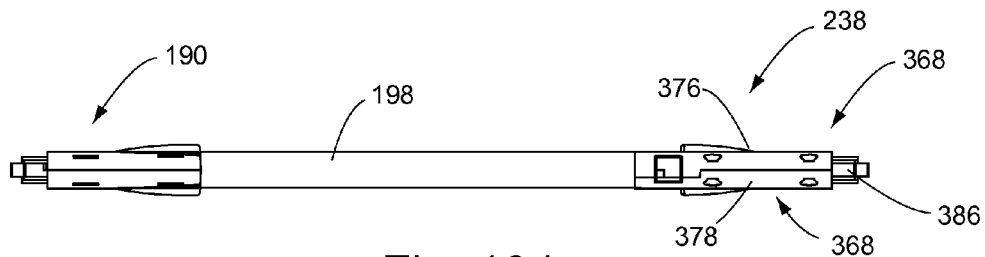
Fig. 104
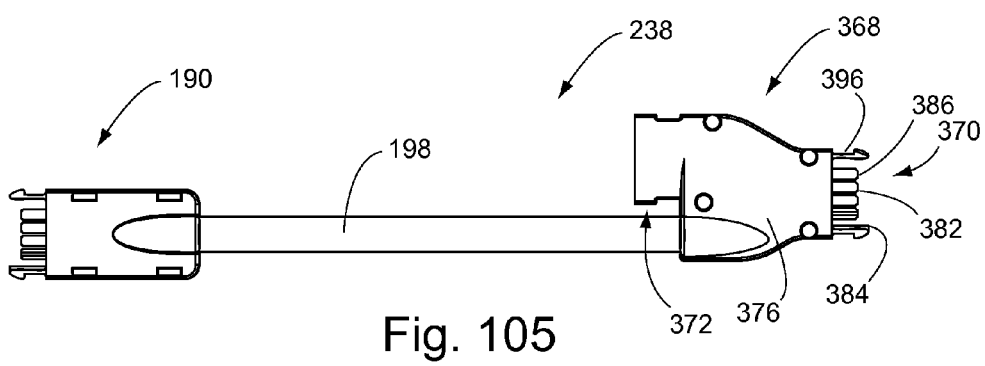
Fig. 105

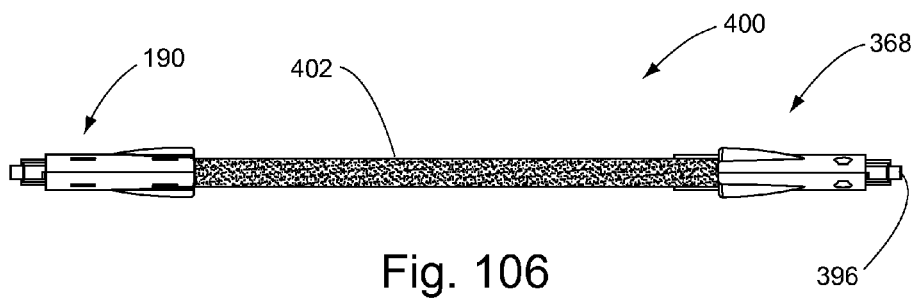
Fig. 106
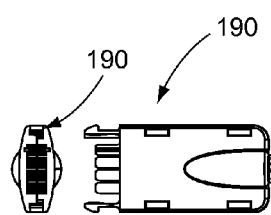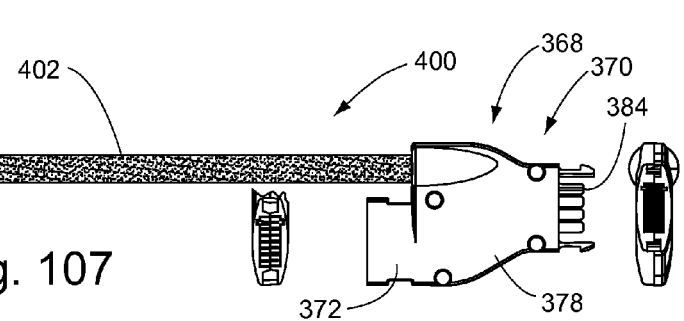
Fig. 107A  Fig. 107  Fig. 107C  Fig. 107B
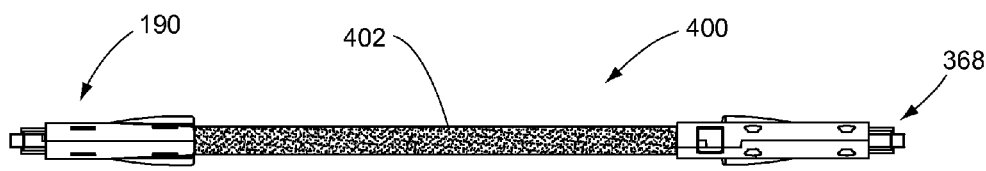
Fig. 108
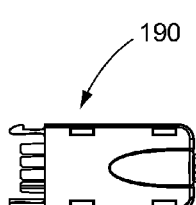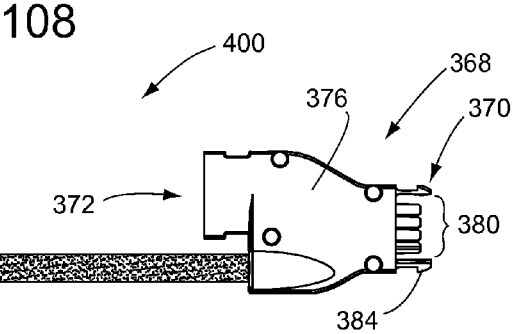
Fig. 109

Fig. 134
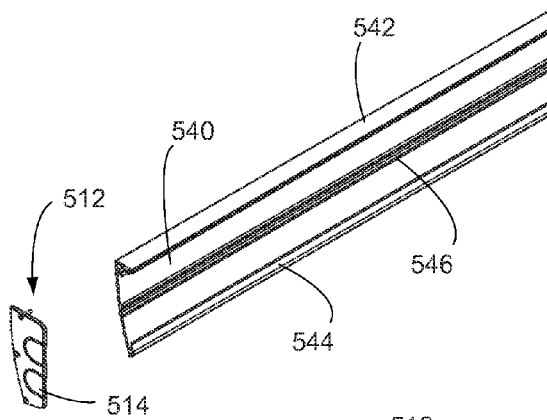
Fig. 133
Fig. 135
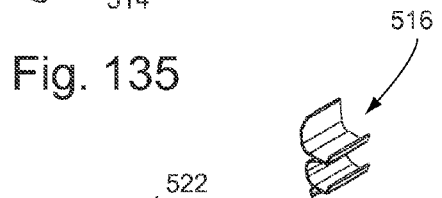
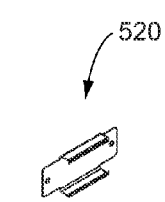
Fig. 136   Fig. 137
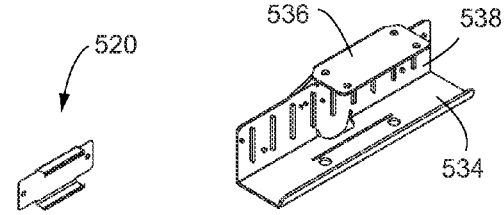
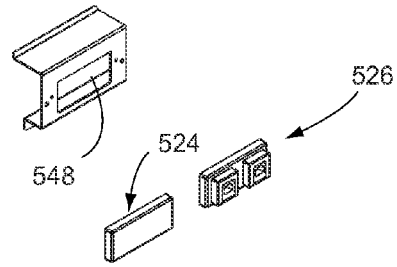
Fig. 138
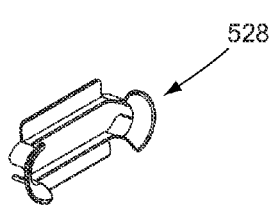
Fig. 139
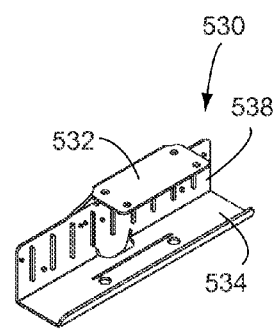
Fig. 140

WIRE MANAGEMENT SYSTEM FOR MODULAR ELECTRICAL SYSTEMS

CROSS-REFERENCE TO RELATED APPLICATIONS

This patent application claims priority of U.S. Provisional Patent Application Ser. No. 60/943,226 filed on Jun. 11, 2007

STATEMENT REGARDING FEDERALLY SPONSORED RESEARCH OR DEVELOPMENT

Not applicable.

REFERENCE TO MICROFISHE APPENDIX

Not applicable.

BACKGROUND OF THE INVENTION

1. Field of the Invention

The invention relates to electrical power and communication distribution systems and, more particularly, to wire management systems for facilitating management of wires and associated components of the modular electrical systems.

2. Background Art

Known interior wall systems typically employ pre-fabricated modular units. These units are often joined together in various configurations, so as to divide a workplace into smaller offices or work areas. Generally, such modular wall panels may be equipped with means for receiving general building power and, possibly, general communications. Such building power may, for example, be conventional AC power received either under floor or from relatively permanent walls or the like. In various types of environments comprising electrical equipment, or wherein electrical apparatus are otherwise employed, interconnections of electrical components to incoming utility power are typically provided by means of cables or wires. For example, in office systems compromising modular furniture components, it is often necessary to provide electrical interconnections between incoming power supplies and various types of electrical devices typically used in an office environment, such as electric typewriters, lamps, etc. Computer-related devices, such as video display terminals and similar peripherals, are also now commonly employed in various office and industrial environments.

One advantage inherent in modular office systems is the capability to rearrange furniture components as necessitated by changes in space requirements, resulting from changes in the number of personnel and other business-related considerations. However, these modular systems must not only allow for change in furniture configurations, but also must provide for convenient interconnection of electrical devices to utility power, regardless of the spacial configuration of the modular systems and resultant variable distances between electrical devices.

In providing the interconnection of electrical apparatus and power inputs, it is necessary to include an arrangement for feeding the incoming utility power to the power outlets. In stationary structures, such as conventional industrial buildings and the like, a substantial amount of room would normally exist behind stationary walls and other areas in which to provide the requisite cabling for interconnecting incoming utility power to electrical receptacles mounted in the walls. Such systems, however, can be designed so as to remain stationary throughout their lifetime, without requiring general changes in the office or industrial environment areas.

In addition to receiving electrical power from the general incoming building power supply, modular office systems typically require communications connections for office equipment such as telephones, interne communications and the like. The problems associated with providing distribution of communications essentially correspond to the same problems existing with respect to distribution of conventional electrical power.

In this regard, it is known to provide modular wall panels with areas characterized as raceways. Often, these raceways are located along bottom edges of modular panels. The raceways are adapted to house electrical cabling and electrical junction blocks. The cabling and junction blocks are utilized to provide electrical outlets and electrical power connections to adjacent panels. However, it is also apparent that to the extent reference is made herein to providing electrical outlets and electrical power connections for adjacent panels, the same issues exist with respect to providing communications among panels.

Still further, it is known that the raceway of one modular wall unit may be provided with a male connector at one end, and a female connector at another end. Pairs of junction blocks, each provided with electrical outlets, made to be disposed at spaced-apart positions along the raceway. Conduits may be extended between the junction blocks and between the connectors in the junction blocks. In this manner, electrical interconnection is provided between the units.

The modular panels of a space-divider may be configured, such that adjacent panels are in a straight line, or at various angular positions relative to each other. It is common to configure intersecting walls in such a fashion that three or four modular wall panels may intersect at right angles. Each of the panels typically requires electrical outlets, and may require outlets on both sides of the panels. In any event, electrical power has to be provided to all of the panels, and often only one of the panels at the multiple panel junction is connected to a power supply source. Under such circumstances, the interconnecting wiring becomes a significant problem. That is, special modifications may have to be made to power systems of wall panels to be used in such a configuration. Because interchangeability of wall panels is highly desirable, custom modifications are preferably avoided. Still further, modifications of wall panels on site at the installation facility is complex and may be relatively expensive.

In addition to the foregoing issues, problems can arise with respect to the use of junction blocks and the amount of room which may exist within a raceway. That is, raceways require sufficient room so as to provide for junction blocks, electrical outlet receptacle blocks, and cabling extending between junction blocks and between adjacent panels.

One example of a prior art system is illustrated in Propst's, et al., U.S. Pat. No. 4,382,648 issued May 10, 1983. In the Propst, et al. system, mating connectors of opposing panels are engaged when the panels are aligned in a straight line. When the panels are positioned in an intersecting relationship, specially manufactured couplers are utilized. One type of special coupler is used when the panels are positioned at right angles. Another type is used with adjoining panels arranged at angles other than right angles. Consequently, costly inventory of couplers must be maintained. The Propst, et al. system uses a double set of connectors comprising a male and female connector for each conductor to be interconnected. When a single one of these prior art panels intersects two adjacent panels, one of the specially manufactured couplers connects the female terminals to one of the adjacent panels, and another of the couplers connects the male terminals to the adjacent panel.

A further system is disclosed in Driscoll, U.S. Pat. No. 4,135,775, issued Jan. 23, 1979. In the Driscoll system, each panel is provided with an electrical outlet box in its raceway. Panels of different widths are provided with a pair of female connectors. Outlet boxes of adjacent panels are interconnected by means of flexible cables having male connectors at both ends. When three or four panels are adjoined in an intersecting arrangement, two cables may be connected the pair of female connectors at one end of an outlet box. In this manner, connection of two adjacent panels is facilitated.

With respect to both of the foregoing systems, and other than in the special intersecting relationship, one half of the double set of terminals of these systems is superfluous. There is a distinct disadvantage in modern day systems, where several independent electrical circuits are needed in a wall panel system, with each requiring separate connectors. Space for such circuits and their connectors is very limited in the raceway areas of modern, thin-line wall panels.

Other systems also exist with respect to electrical connectors, junction boxes, and the like. For example, Rodrigues, U.S. Pat. No. 1,187,010 issued Jun. 13, 1916, discloses a detachable and interchangeable electrical switch plug adapted for use in connection with various electrically heated appliances. A clamping device is positioned in a fixed, but detachable relationship to one end of the plug. Means are provided to enclose and prevent sharp flexure of the cord comprising a flexible enclosing tube gripped under tension by the other end of the clamping device. The plug and the clamping device may be simultaneously removed from the socket.

Finizie, U.S. Pat. No. 2,540,575, issued Feb. 6, 1951, discloses a cord guide member for utensil plugs. The concept is to reduce wear on the cord and the connector plug, and to provide a connection which will withstand heavy pulling strains without injury. Strain relief is also provided. A sectional body is equipped anteriorally adjacent one end of the body with terminals. The other end of the body contains an anterior chamber or socket. A pivotable cord-guiding member having a pivot member is movably mounted in the socket. A wedge-shaped strain relief insert is received within a wedge-shaped recess in the pivot member. A cord extends into the pivot member and includes wires passing from the cord toward the terminals. The incoming portions of the wires are moved around the insert and firmly wedged within the recess.

Byrne, U.S. Pat. No. 4,551,577, issued Nov. 5, 1985, describes a retractable power center. The power center provides for conveniently located electrical power source receptacles adapted to be mounted on a work surface. In one embodiment, the power center includes a rectangular housing received within a slot in a work surface. A clamping arrangement is utilized to secure the housing to the work surface. A lower extrusion is connected to the lower portion of the housing. A movable power carriage mounts the receptacles and a catch assembly releasably maintains a carriage in a closed and retracted position. In response to manual activation, the catch assembly is released and springs tensioned between the carriage and the extrusion exert forces so as to extend the carriage upward into an extended, open position. In the open position, the user can energize the desired electrical devices from the receptacles, and then lower the carriage into the retracted position.

Byrne, U.S. Pat. No. 4,959,021, issued Sep. 25, 1990, discloses a pivotable power feed connector having a pivotal connector adapted to be connected to a flexible conduit or cable. The cable has a series of conductors extending there through. The connector is pivotably connected to a block assembly through which the conductors extend. The block assembly, in turn, is connectable to a contact block, with the conductors conductively connected to a set of prong terminals extending outwardly from the block. A cover is secured over the block so as to prevent the prong terminals from being exposed during assembly and disassembly.

The cover automatically exposes the prong terminals as the power feed connector is moved into engagement with a receptacle in a modular office panel. The connector allows the conduit or cable to be swiveled to an arc of approximately 180 degrees to any desired position. The connector is also manually removable from interconnection with the block assembly. Such removal allows the conduit or cable to be pulled back from the conductors and cut to a desired length. The connector includes a power feed cover which can be utilized in part to maintain the connector in either of two spatial configurations relative to the block assembly.

Nienhuis, et al., U.S. Pat. No. 5,013,252, issued May 7, 1991, discloses an electrified wall panel system having a power distribution server located within a wall panel unit. The server includes four receptacle module ports oriented in an h-shaped configuration. A first receptacle port is located on the first side of the wall panel unit and opens toward a first end of the unit. A second receptacle unit is also located on the first side of the wall panel unit, and opens toward a second end of the wall panel unit. A third receptacle port and a second sided wall panel unit opens toward the first end of the wall panel unit, while correspondingly, a fourth receptacle port on the second side of the wall panel unit opens toward the second end of the wall panel unit. First and second harnesses are each electrically connected at first ends thereof to the power distribution server. They extend to opposite ends of the wall paneled unit and include connector ports on the second ends thereof for providing electrical interconnection of adjacent wall panel units. The Nienhuis, et al. patent also discloses a system with a wall panel connector interchangeably usable with the interconnection of two, three or four units. The connector includes a hook member for connecting together adjacent vertical members of frames of adjacent wall panel units at a lower portion thereof. A draw naught for connecting together adjacent vertical members of frames of adjacent wall panel units and an odd proportion thereof is provided by vertical displacement thereof.

Lincoln, et al., U.S. Pat. No. 5,073,120, issued Dec. 17, 1991, discloses a power distribution assembly having a bussing distribution connector. The connector includes a series of bus terminals positioned within an electrically insulative housing. A series of electrical terminals are positioned in the housing for distributing more than one electrical circuit. At least one ground terminal, one neutral terminal, and three hot terminals are provided. A grounding shell partially surrounds the bus connector and includes a grounding tab grounding the one ground terminal to the metallic grounding shell. In another embodiment, two bus connectors are interconnected together, so as to provide for an increased number of output ports.

Byrne, U.S. Pat. No. 5,096,431, issued Mar. 17, 1992, discloses an outlet receptacle with rearrangeable terminals. The receptacle is provided with input terminals to selected positions, for engagement with terminals of an electrical junction block. The block includes a series of terminals representing a plurality of different electrical circuits. The receptacle block has neutral, ground and positive flexible positive conductor bars electrically connected to neutral, ground and positive electrical terminals. Input terminals of the block are formed integral with the flexible conductor bars and levers are provided for moving the terminal ends of the conductor bars to physically different positions. In one configuration, the receptacle block housing is provided with openings at opposing ends, and the flexible conductor bars have terminal ends controlled by levers at both ends of the outlet receptacle block. In another configuration, the block has output terminals in a front wall, and the input terminals of the receptacle block are formed as ends of the flexible bars and extend at an approximately 90 degree angle to the bars. They further send through openings in the back wall of the outlet receptacle for engagement with terminals of a junction block. Levers are provided in the back wall of the receptacle block for positioning the terminal ends in alignment with different terminals of the junction block, and windowed openings in the front wall expose indices on the levers identifying selected circuits.

Byrne, U.S. Pat. No. 5,096,434, issued Mar. 17, 1992, discloses an electrical interconnection assembly for use in wall panels of a space divider wall system. The system includes junction blocks having several receptacle connectors, so as to provide a plurality of electrical outlets on both sides of a wall panel. The junction block is connected by means of conduits extending from both ends of the junction block to oppositely directed connector blocks for connection to adjoining panels. The assembly of the junction block and connector blocks allows electrical power to be supplied to one end of the panel and conducted to and through the junction block to other panels. The receptacle connectors on the junction block each have one type of terminal configuration, e.g., a female electrical terminal configuration. One of the connector blocks is provided with the identical terminal configuration. The other connector block is provided with a matching terminal configuration, e.g., a male electrical terminal configuration. When two wall panels are joined at their respective edges, the male connector block may be readily connected to the female connector block in the adjacent panel. When two panels are joined to a third panel, all at one point, the arrangement of this invention allows the male connector block to be connected to the female connector block of one of the other two panels, and the male connector of the other of the two panels may be connected to one of the receptacle connectors of the junction block on either of the other two panels, in this manner establishing a three way interconnection arrangement. In a similar fashion, a fourth, or other additional panels may be added to the junction and plug into receptacle outlets of other panels in order to provide an arrangement of panels that is totally interconnected, electrically.

Snodgrass, et al., U.S. Pat. No. 5,164,544, issued Nov. 17, 1992, describes an electrified space dividing panel having a panel member, raceway, modular, or electric system disposed in a raceway and raceway covers for gaining access to the system. The system includes a single terminal block having end and side sockets, with first and second electrical receptacles being respectively removeably engaged with the end socket and the side sockets, such that the first and second electrical receptacles are disposed in horizontally spaced, side-by-side relation and project outwardly for predetermined light dimensions through receptacle openings in one of the raceway covers. The raceway can include a web having an opening which cooperates with a support ear on the first receptacle during engagement of the first receptacle with an end socket, so as to provide additional lateral support for the electrical receptacle when a plug is removed there from.

Kilpatrick, et al., U.S. Pat. No. 5,178,555, discloses a kit which includes a junction box for installation along a raceway. The kit includes a mounting bracket having a first adjustable mounting mechanism for locating the bracket along the raceway. This provides an initial adjustment, and a second adjustable mounting mechanism is provided for securing the junction box to the mounting bracket. This adjustably locates the junction box along the mounting bracket, and provides a second or final adjustment to accurately locate the junction box between two pre-measured lengths of cable.

Byrne, U.S. Pat. No. 5,259,787, issued Nov. 9, 1993, discloses an electrical junction block mounting assembly, which may be utilized for mounting the junction block within a raceway. The assembly includes a cantilever beam formed on an outer wall of the junction block. This beam is provided with a transversely extending channel for engagement with a support structure. The beam is attached to the junction block by means of a resilient hinge section, and is provided with a first arm section extending between the hinge section and the channel, and a second arm section extending beyond the channel. The first arm section has a sloping surface sloping away from the outer channel between the hinge section of the panel. The second armed section has a sloping surface sloping toward the wall beyond the channel. The surfaces will contact a mounting rail or similar structure during installation of the junction block. In this manner; the hinged cantilever beam is deflected until the rail is in alignment with the channel for engagement with the structural support member.

Other issues which arise with respect to the use of modular electrical systems relate to the complexity of wires and cables which may be embodied within the system. In this regard, it is advantageous to provide some type of general wire management system for purposes of facilitating management of the complexity of wires and cables.

BRIEF DESCRIPTION OF THE DRAWINGS

The invention will now be described with reference to the drawings, in which:

FIG. 2 is a perspective view of a four-wire receptacle junction block with keying, in accordance with the invention;

FIG. 3 is an upside-down view of the four-wire receptacle junction block illustrated in FIG. 2;

FIG. 4 is a left, side elevation view of the four-wire female receptacle junction block illustrated in FIG. 2;

FIG. 5 is a front, elevation view of the four-wire female receptacle junction block illustrated in FIG. 2;

FIG. 10 is a perspective view of a four-wire female receptacle junction block in accordance with the invention, similar to the junction block of FIG. 2, but with a still further alternative keying arrangement;

FIG. 11 is an upside-down view of the four-wire female receptacle junction block illustrated in FIG. 10;

FIG. 12 is a left-side elevation view of the four-wire female receptacle junction block illustrated in FIG. 10;

FIG. 13 is a front, elevation view of the four-wire female receptacle junction block illustrated in FIG.;

FIG. 16 is a planned view of a four-wire male blade connector having a keying configuration in accordance with the invention;

FIG. 17 is a perspective view of the four-wire male blade connector block illustrated in FIG. 16;

FIG. 18 is a front, elevation view of the four-wire male blade connector block illustrated in FIG. 16;

FIG. 19 is a right-side elevation view of the four-wire male blade connector block illustrated in FIG. 16, showing a particular keying arrangement;

Figure 31:
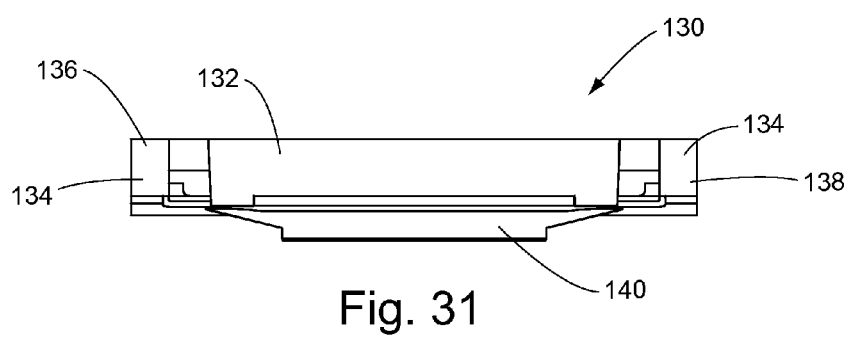
Figures 32, 33, 34:
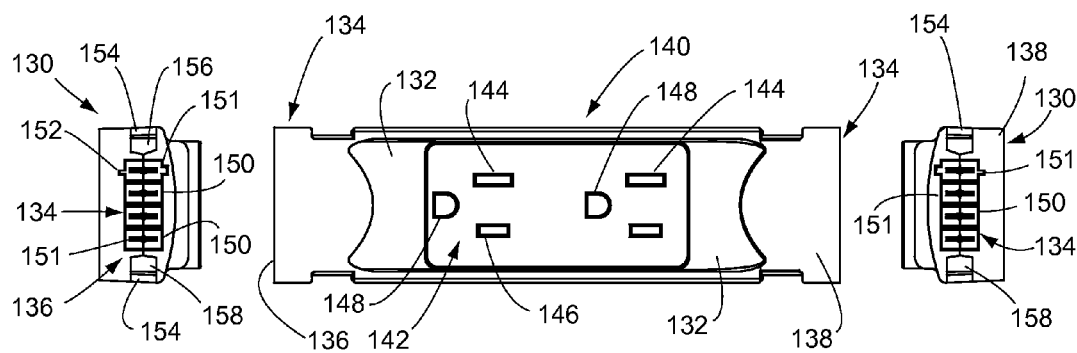
Figure 35:
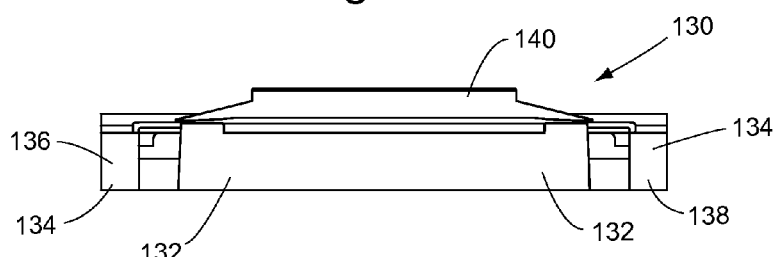
Figure 36:
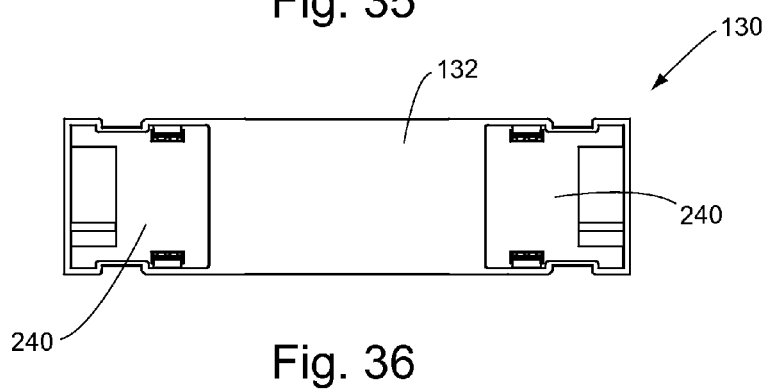
Figure 37:
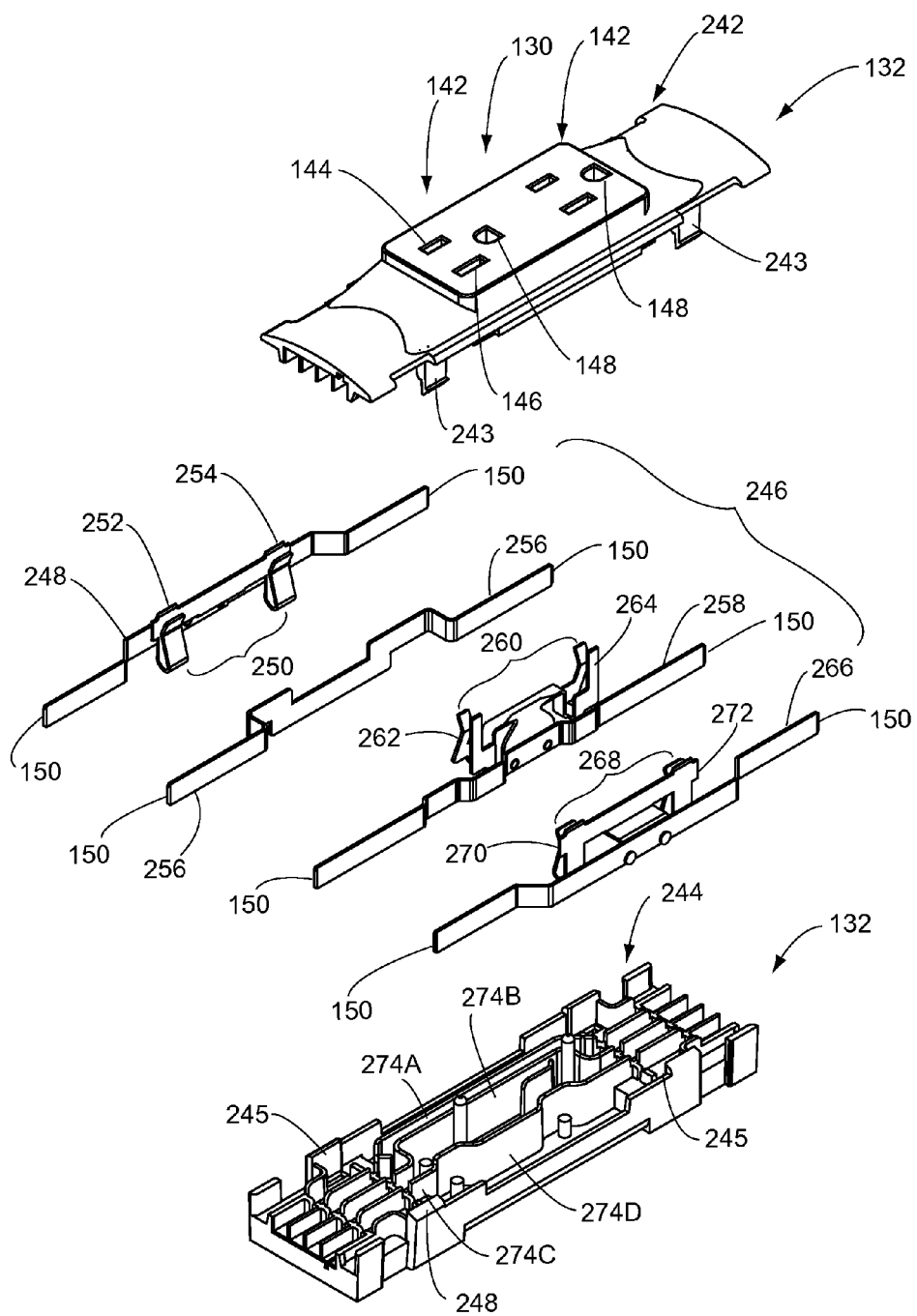

four-wire receptacle junction blocks having male/male end connectors;

a two-way connector having female/female terminals;

a four-way connector assembly having male/male end connectors on each of the opposing ends of the connector assembly;

a three-way jumper assembly having pair of female end connectors and a male end connector;

FIG. 31 is an upside-down view of receptacle junction block assembly in accordance with the invention;

FIG. 32 is a front, elevation view of the receptacle junction block assembly illustrated in FIG. 31;

FIG. 33 is a left-side elevation view of the receptacle junction block assembly shown on FIG. 31;

FIG. 34 is a right-side elevation view of the receptacle junction block assembly shown in FIG. 31;

FIG. 35 is a side, upright view of the receptacle junction block assembly shown in FIG. 31;

FIG. 36 is an elevation view of the receptacle junction block assembly shown in FIG. 31, with FIG. 36 showing the side of the junction block assembly opposing the side shown in FIG. 32;

FIG. 37 is an exploded view of the receptacle junction block assembly shown in FIG. 31, and illustrated in four separate bus bars.

Figure 38:
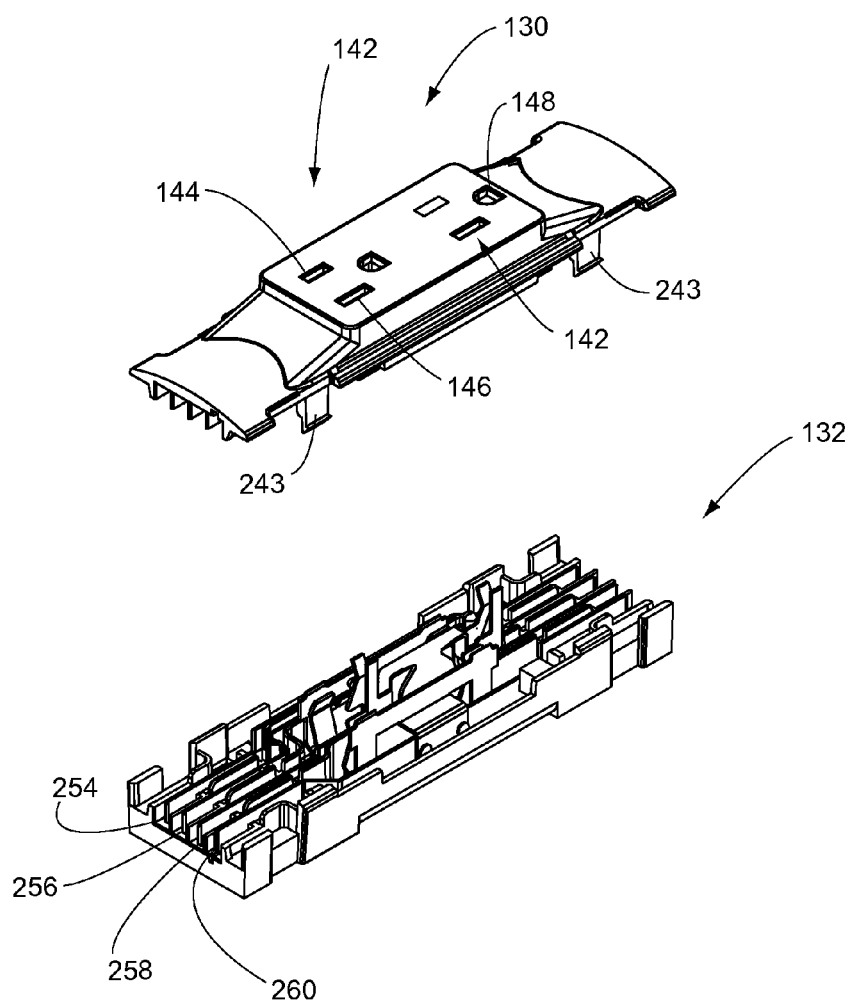
Figure 39:
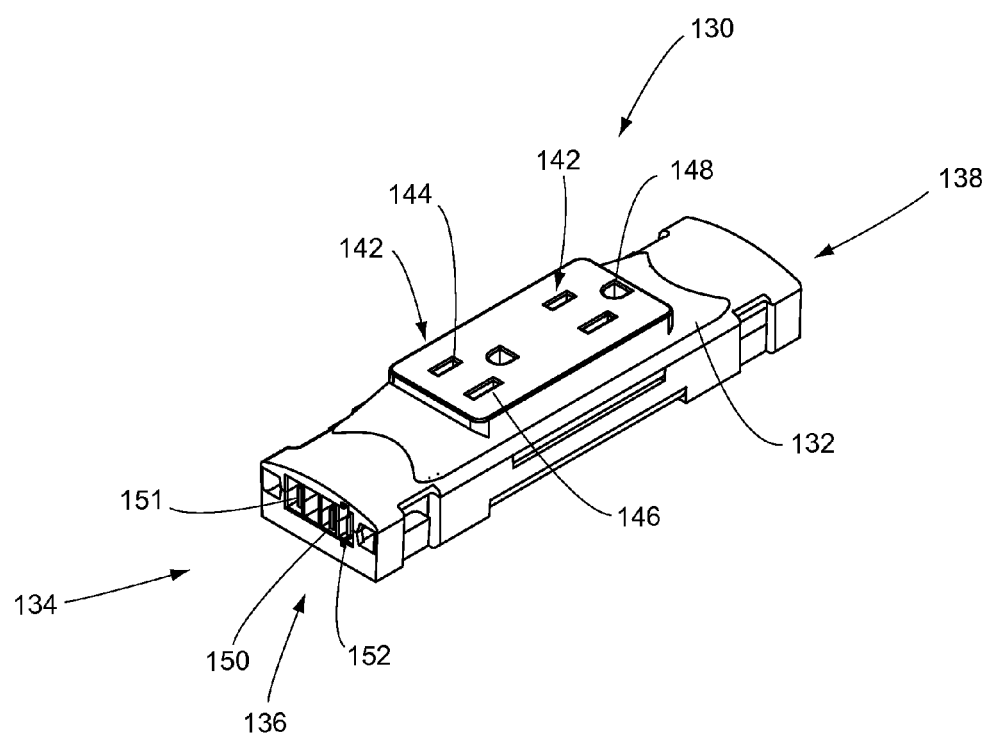
Figure 40:
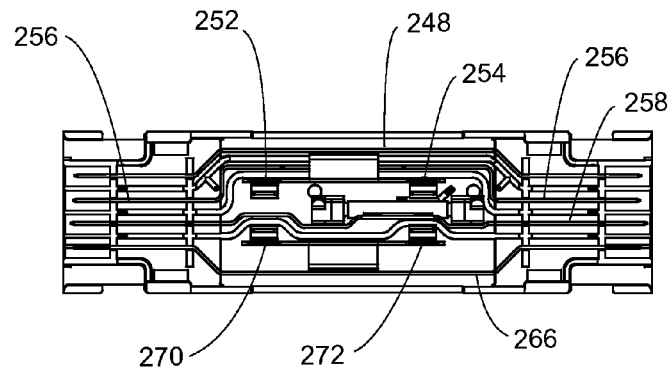

FIG. 38 is a partially exploded view of the receptacle junction block assembly shown in FIG. 31, showing the bus bars inserted into the junction block housing;

FIG. 39 is a perspective view of the receptacle junction block assembly shown in FIG. 31;

FIG. 40 illustrates the bus bar configuration for the receptacle junction block assembly illustrated in FIG. 31, for use of a first one of the two available circuits.

Figure 41:
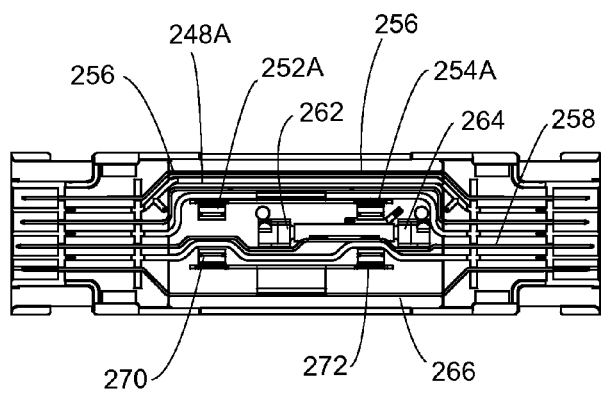
Figure 42:
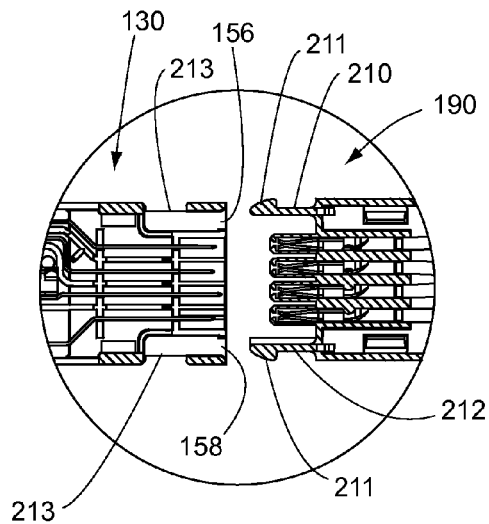
Figure 43:
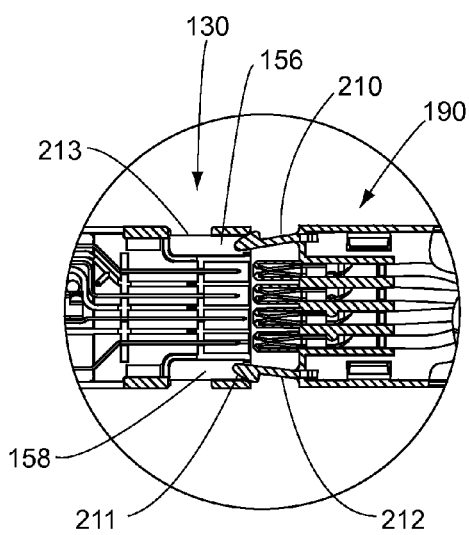
Figure 44:
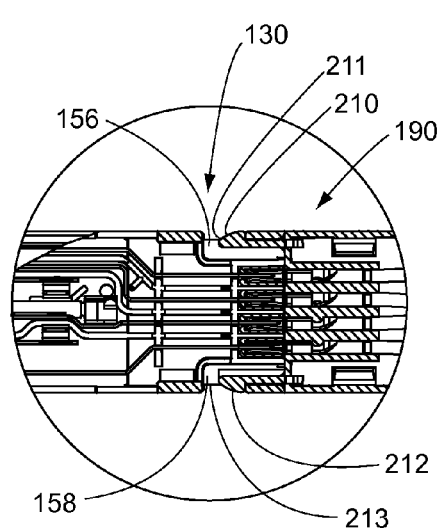
Figure 55:
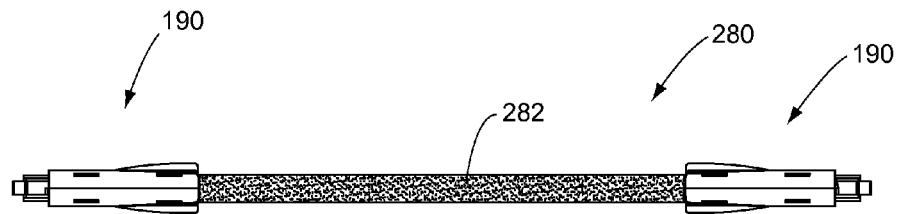
Figures 56, 57, 58:
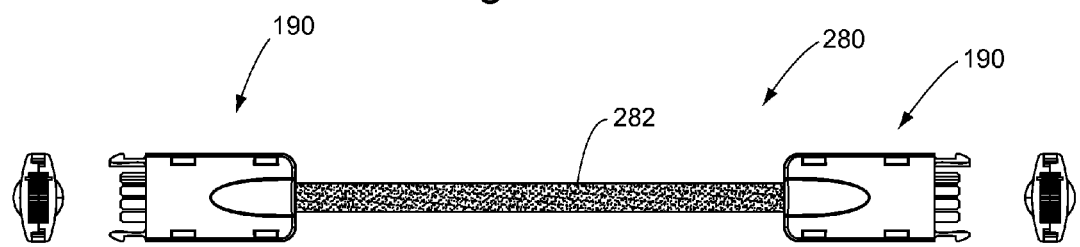
Figure 59:
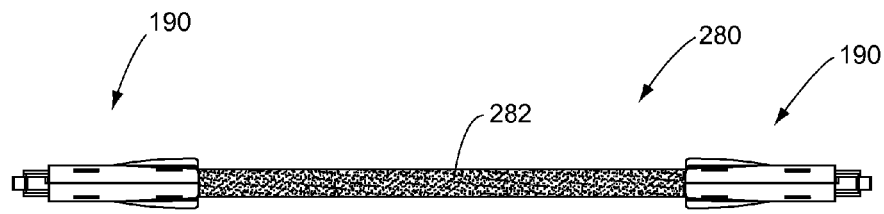
Figure 60:
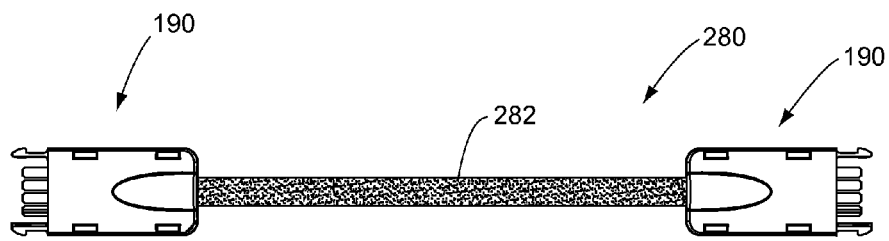
Figure 67:
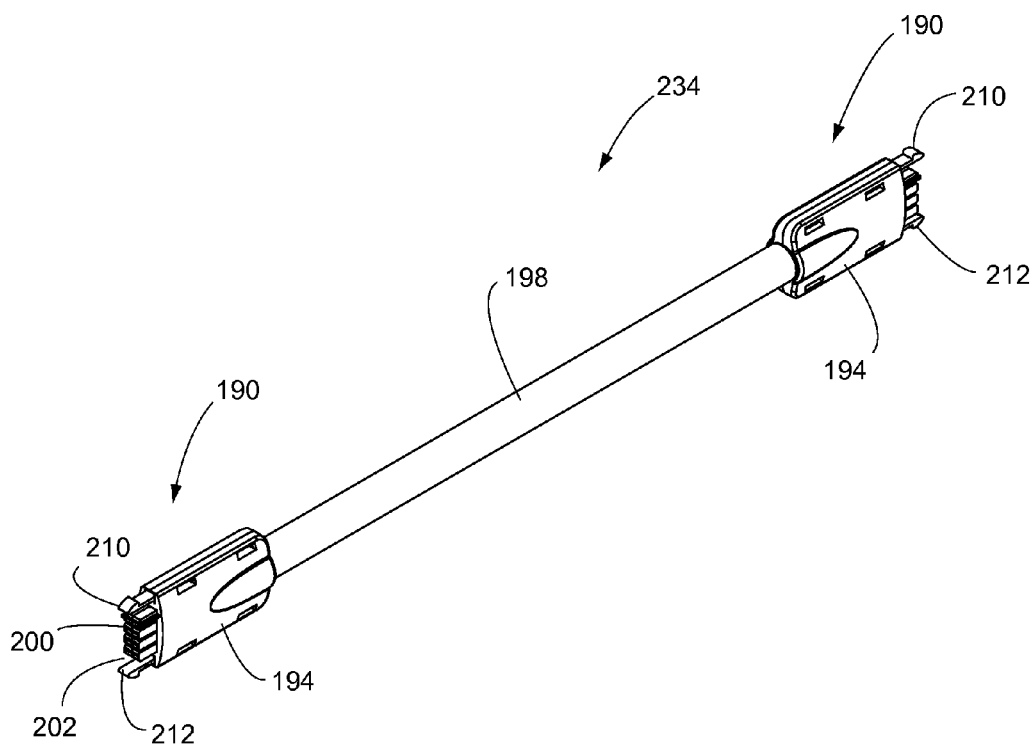
Figure 68:
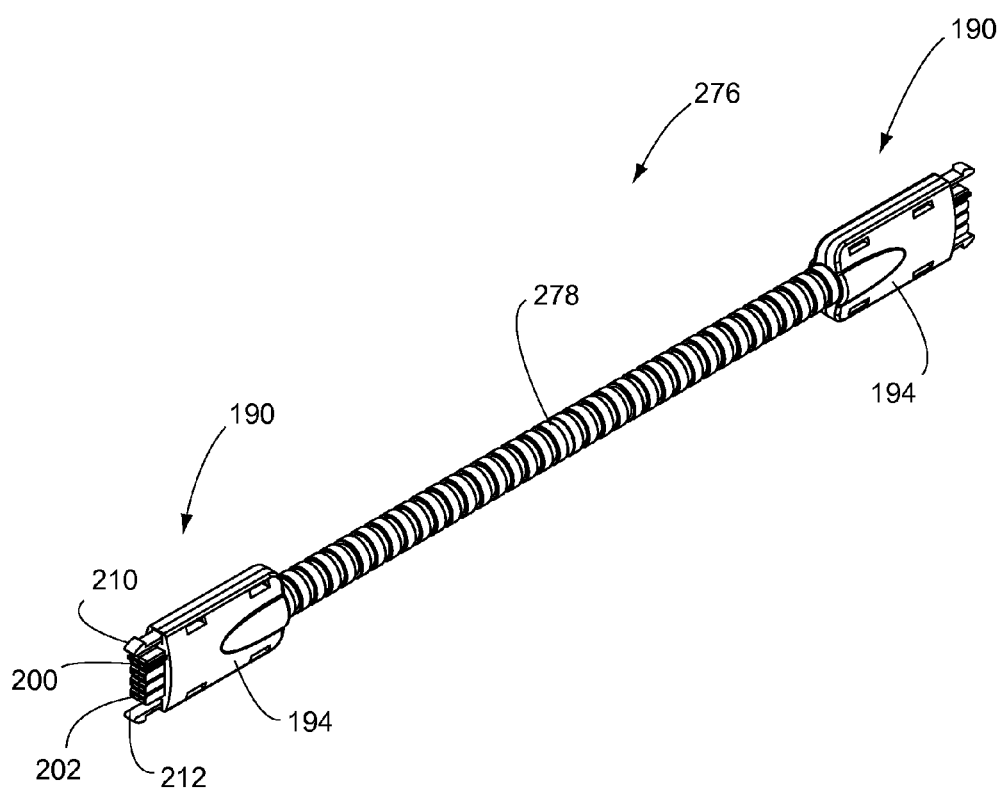
Figure 69:
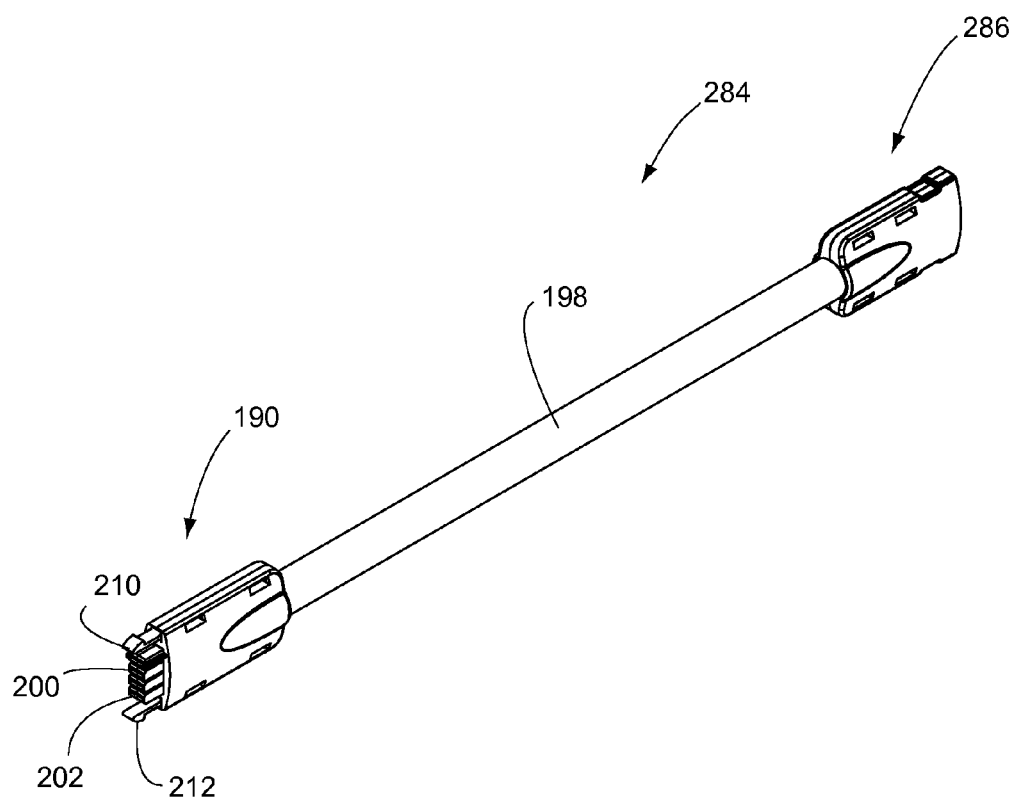
Figure 70:
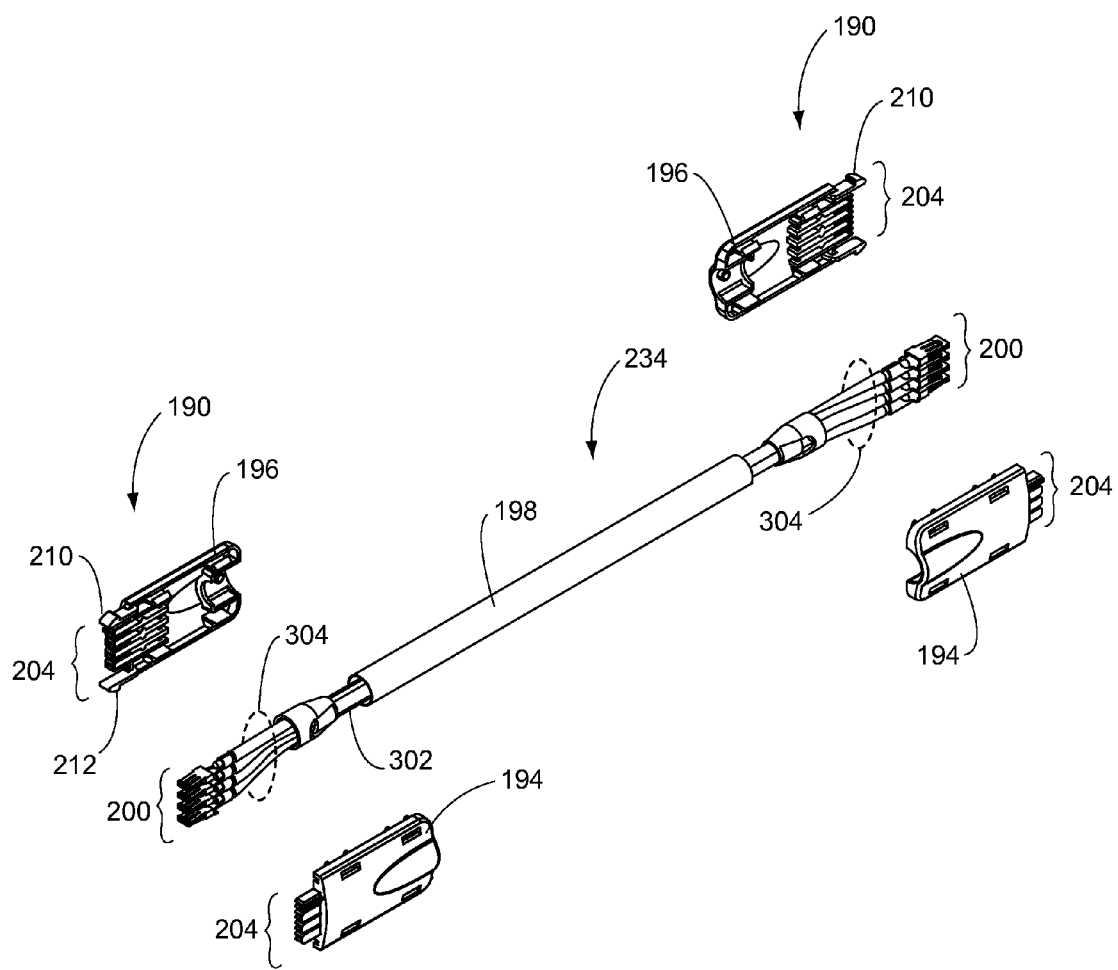
Figure 71:
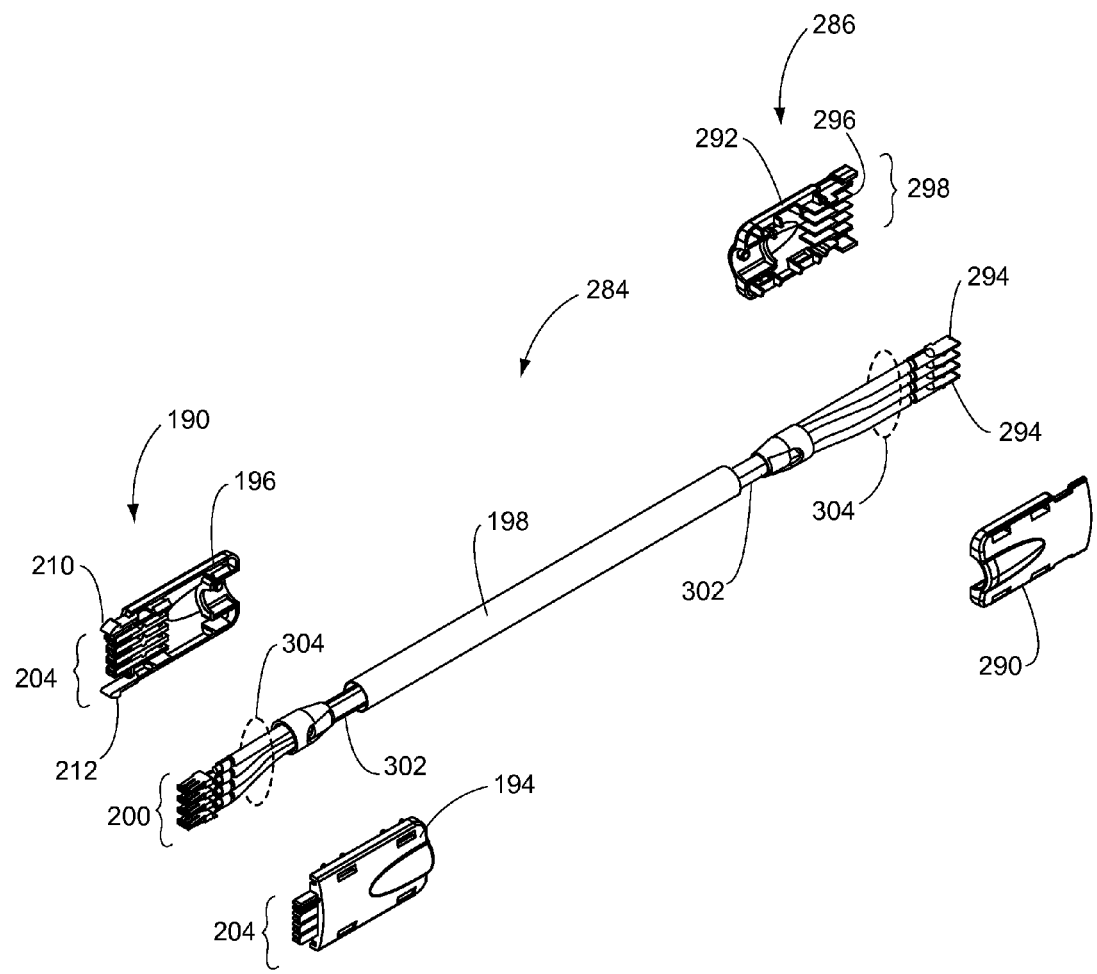
Figure 72:
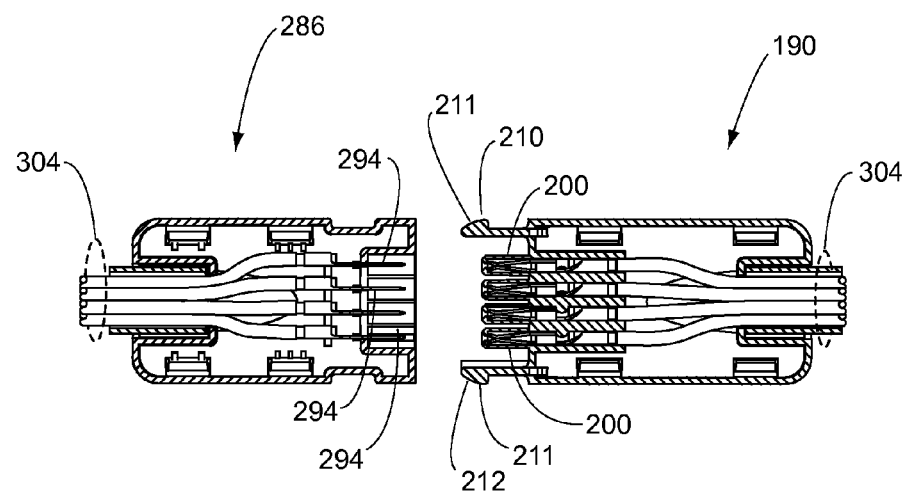
Figure 73:
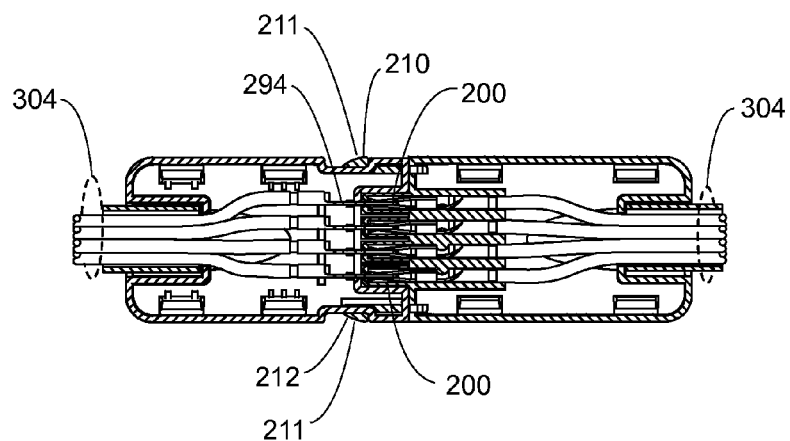
Figure 74:
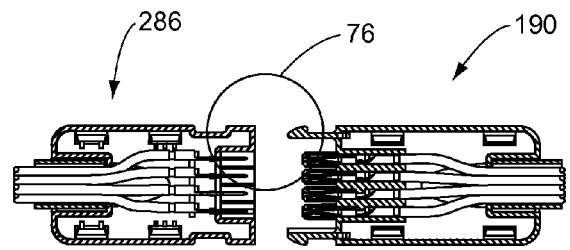
Figure 75:
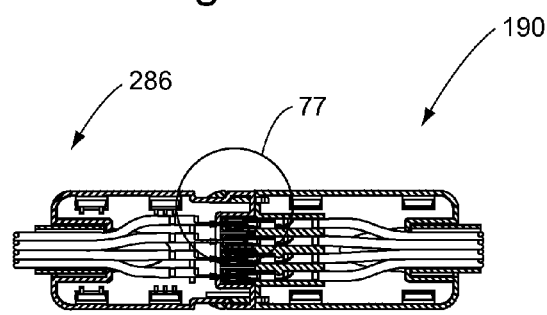
Figures 76, 77:
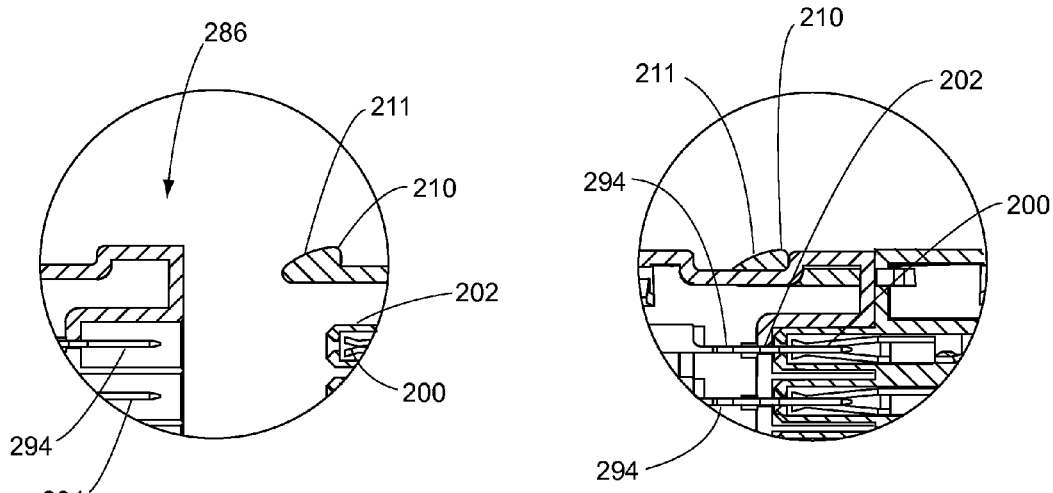
Figure 78:
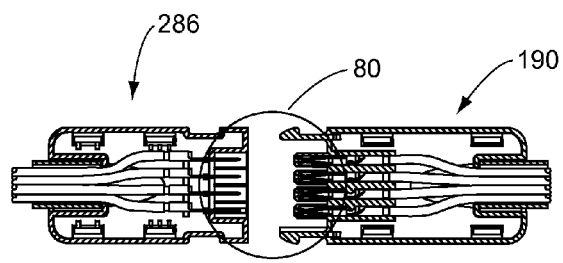
Figure 79:
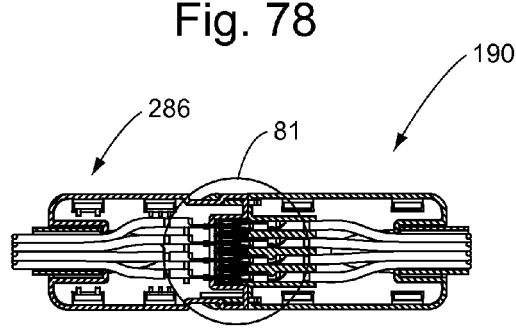
Figures 80, 81:
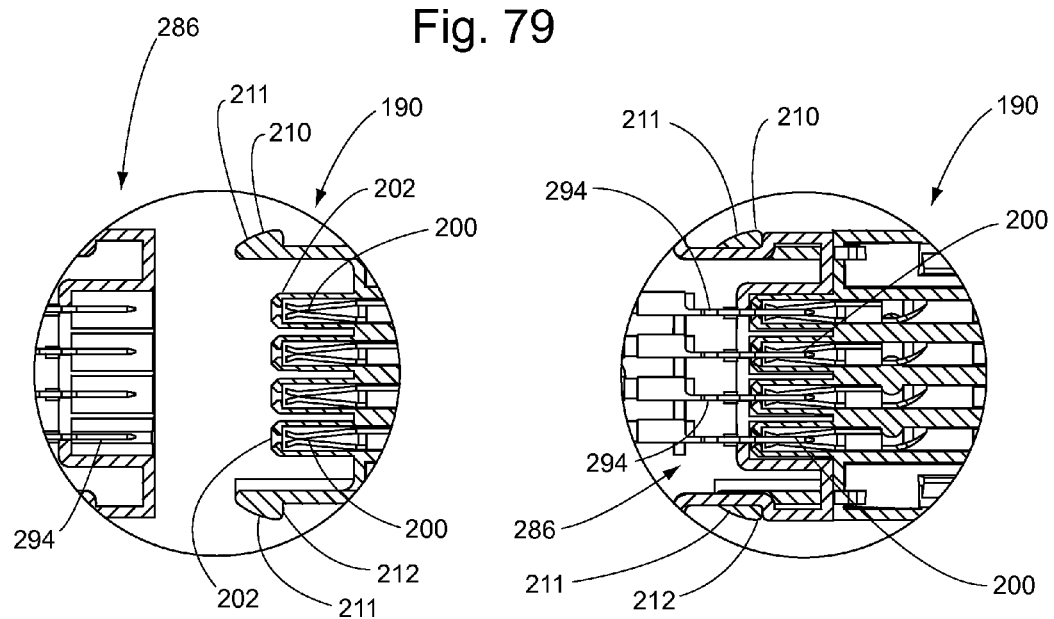
Figure 88:
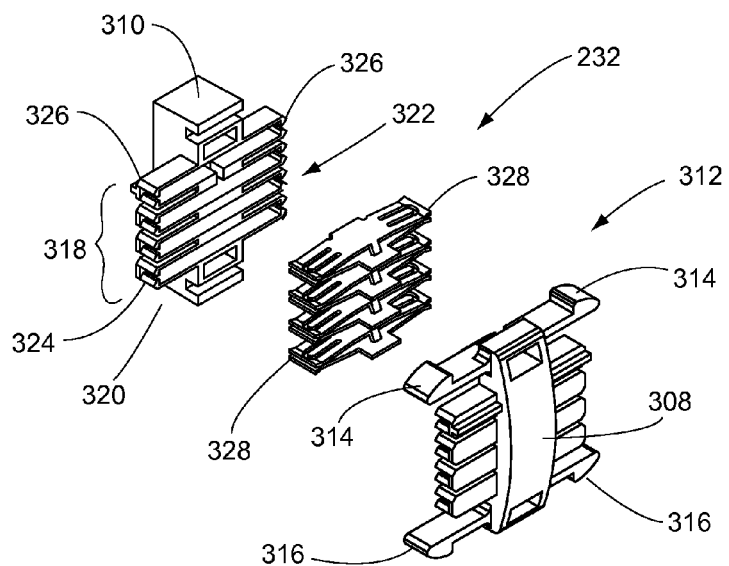
Figure 89:
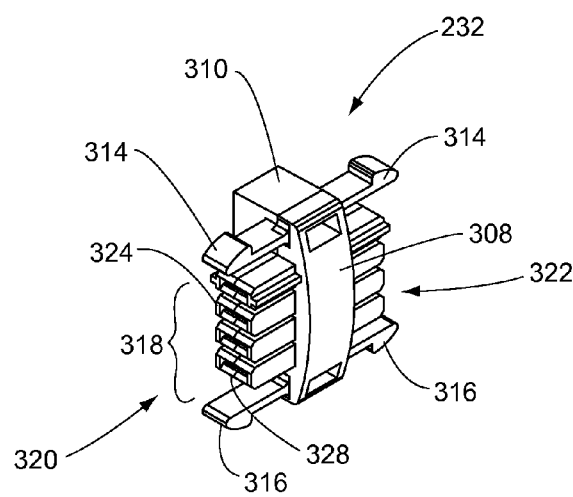
Figure 90:
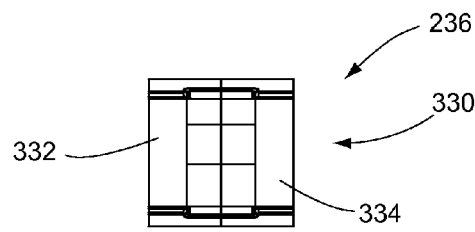
Figure 92:
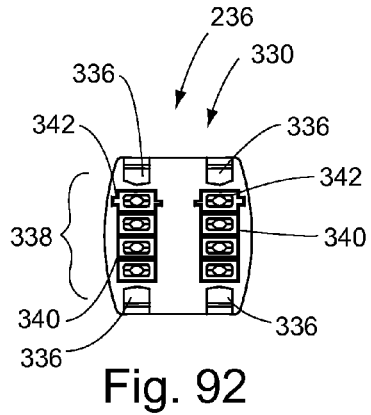
Figure 91:
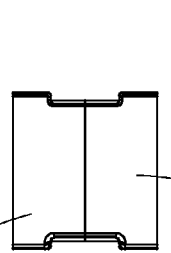

FIG. 41 is a view similar to FIG. 40, but shows the bus bar configuration for use with the second one of the two available circuits;

FIG. 42 illustrates an initial position of one end of the receptacle junction block assembly illustrated in FIG. 31, relative to the position of a female connector block for purposes of interconnection of the elements;

FIG. 43 illustrates somewhat of an initial position as the receptacle junction block assembly begins to electrically and mechanically interconnect to the female connector block;

FIG. 44 is similar to FIGS. 42 and 43, but illustrates the final connection position between the receptacle junction block assembly and the female connector block;

FIG. 45 is a planned view of a two-way jumper assembly for use with the modular electrical system in accordance with the invention;

FIG. 46 is a front, elevation view of the jumper assembly shown in FIG. 45;

FIG. 47 is a left-end elevation view of the jumper assembly shown in FIG. 45;

FIG. 48 is a right-end view of the jumper assembly shown in FIG. 45;

FIG. 49 is an underside view of the jumper assembly shown in FIG. 45;

FIG. 50 is a rear, elevation view of the jumper assembly shown in FIG. 45;

FIG. 51 is a planned view of an alternative embodiment of a two-way jumper assembly in accordance with the invention, showing the use of expandable conduit interconnecting the pair of female end connector blocks;

FIG. 52 is a front, elevation view of the jumper assembly shown in FIG. 51;

FIG. 52A is a left-end elevation view of the jumper assembly shown in FIG. 51;

FIG. 52B is a right-end elevation view of the jumper assembly shown on FIG. 51;

FIG. 53 is an underside view of the jumper assembly shown on FIG. 51;

FIG. 54 is a rear, elevation view of the jumper assembly shown on FIG. 51;

FIG. 55 is a planned view of a further embodiment of a two-way jumper assembly in accordance with the invention, showing the use of wire mesh for purposes of interconnecting the pair of opposing female end connector blocks;

FIG. 56 is a front, elevation view of the jumper assembly shown in FIG. 55;

FIG. 57 is a left-end, elevation view of the jumper assembly shown in FIG. 55;

FIG. 58 is a right-end, elevation view of the jumper assembly shown in FIG. 55;

FIG. 59 is an underside view of the jumper assembly shown in FIG. 55;

FIG. 60 is a rear, elevation view of the jumper assembly shown in FIG. 55;

FIG. 61 is a planned view of a two-way jumper assembly in accordance with the invention, showing the jumper assembly with a female end connector block and a male end connector block;

FIG. 62 is a front, elevation view of the jumper assembly shown on FIG. 61;

FIG. 63 is a left-end, elevation view of the jumper assembly shown on FIG. 61;

FIG. 64 is a right-end, elevation view of the jumper assembly shown on FIG. 61;

FIG. 65 is an underside view of the jumper assembly shown on FIG. 61;

FIG. 66 is a rear, elevation view of the jumper assembly shown on FIG. 61;

FIG. 67 is a perspective view of the jumper assembly shown on FIG. 45;

FIG. 68 is a perspective view of the jumper assembly shown on FIG. 51;

FIG. 69 is a perspective view of the jumper assembly shown on FIG. 61;

FIG. 70 is an exploded view of the jumper assembly shown on FIG. 45;

FIG. 71 is a perspective view of the jumper assembly shown on FIG. 61;

FIG. 72 is a sectional view showing an initial position for connection female and connector block of the jumper assembly shown on FIG. 45 to a male blade connector block assembly;

FIG. 73 is similar to FIG. 72, but shows the final position of the element shown in FIG. 72 when they are electrically and mechanically connected together;

FIG. 74 is a sectional view similar to FIG. 72 and showing the portion of the elements which will be illustrated in FIG. 76;

FIG. 75 is a sectional view similar to FIG. 73 and showing the location of the enlarged view of FIG. 77;

FIG. 76 is an enlarged view of a portion of the element shown in FIG. 72, as the elements are moved into position for electrical connection;

FIG. 77 is a view corresponding to the circled portion of FIG. 75, showing the final positioning of the elements shown in FIG. 75 and an electrical and mechanical connection;

FIG. 78 is a view similar to FIG. 74, but showing the relative position of FIG. 80;

FIG. 79 is a sectional view similar to FIG. 75, but showing the relative position of FIG. 81;

FIG. 80 is an enlarged, sectional view similar to FIG. 76, but showing additional components of the elements being connected together;

FIG. 81 is a sectional, enlarged view similar to FIG. 77, but showing the final positioning of the connection of elements shown in FIG. 80;

FIG. 82 is a plan view of a two way male connector in accordance with the invention;

FIG. 83 is a front, elevation view of the two way connector shown in FIG. 82;

FIG. 84 is a left-side end view of the two way connector shown in FIG. 82;

FIG. 85 is a right-end, elevation view of the two way connector shown in FIG. 82;

FIG. 86 is an underside view of the two way male connector shown in FIG. 82;

FIG. 87 is a rear, elevation view of the two way male connector shown in FIG. 82;

FIG. 88 is a perspective and exploded view of the two way male connector shown in FIG. 82;

FIG. 89 is a perspective view of the two way male connector shown in FIG. 82, in a fully assembled state;

FIG. 90 is a plan view of a four way male connector in accordance with the invention;

FIG. 91 is a front, elevation view of the four way male connector shown in FIG. 90;

FIG. 92 is a left-end, elevation view of the four way male connector shown in

Figure 93:
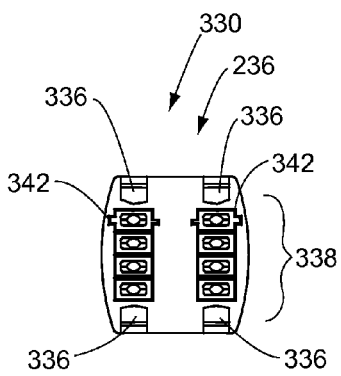
Figure 94:
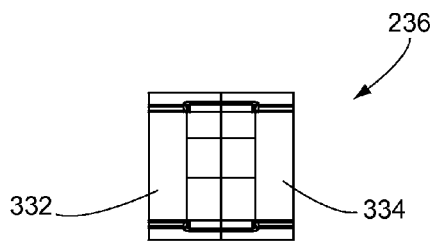
Figure 95:
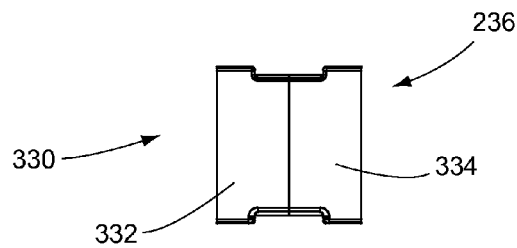
Figure 97:
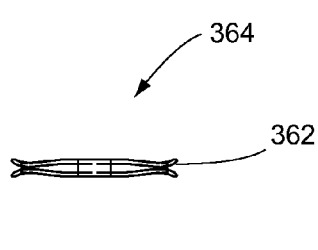
Figure 96:
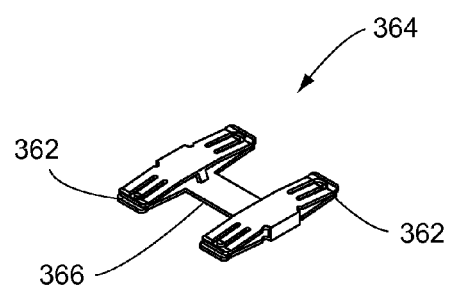
Figure 98:
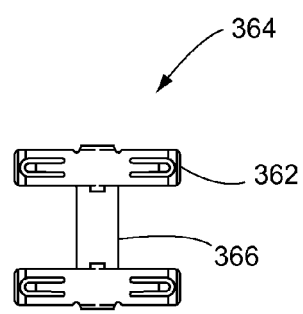
Figure 99:
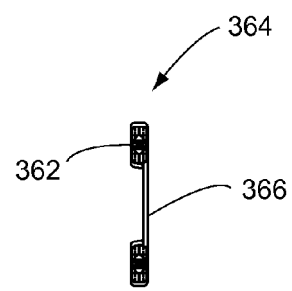
Figure 100:
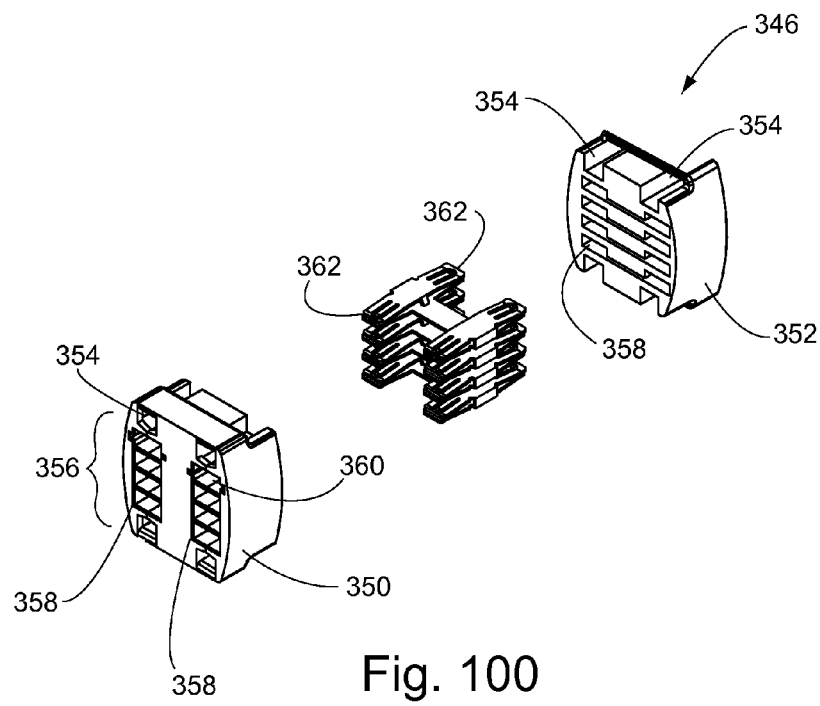
Figure 101:
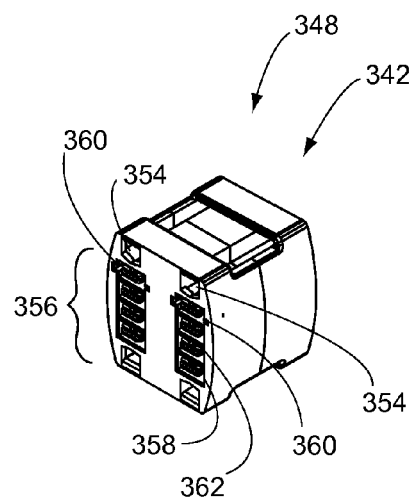

FIG. 90;

FIG. 93 is a right-end, elevation view of the four way male connector shown in FIG. 90;

FIG. 94 is an underside view of the four way male connector shown in FIG. 90;

FIG. 95 is a rear, elevation view of the four way male connector shown in FIG. 90;

FIG. 96 is a perspective view of an H-shaped terminal set which may be utilized with the four way male connector shown in FIG. 90;

FIG. 97 is a front, elevation view of the terminal set shown in FIG. 96;

FIG. 98 is a plan view of the terminal set shown in FIG. 96;

FIG. 99 is a right-end view of the terminal set shown in FIG. 96;

FIG. 100 is a perspective and exploded view of the four way male connector shown in FIG. 90;

FIG. 101 is a perspective view of the four way male connector shown in FIG. 90, in a fully assembled state;

FIG. 102 is a plan view of a three way jumper assembly in accordance with the invention;

FIG. 103 is a front, elevation view of the three way jumper assembly shown in

Figure 110:
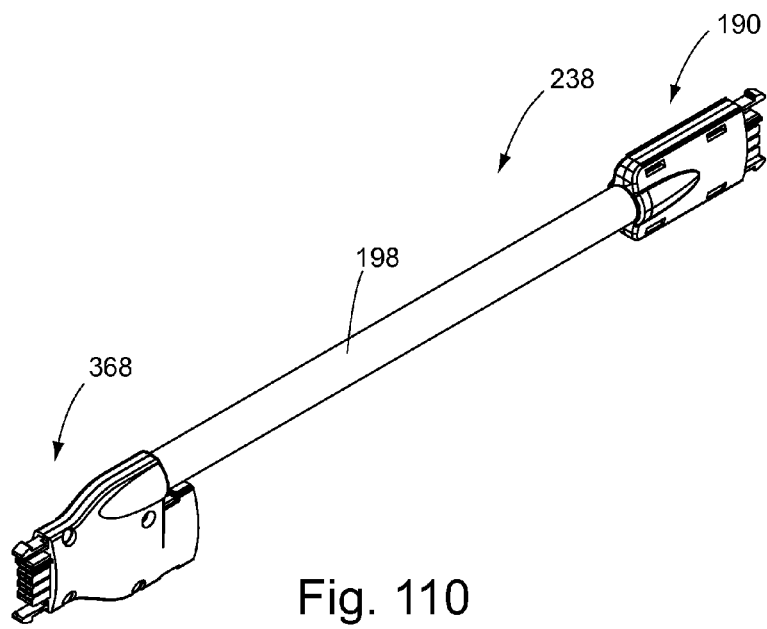
Figure 111:
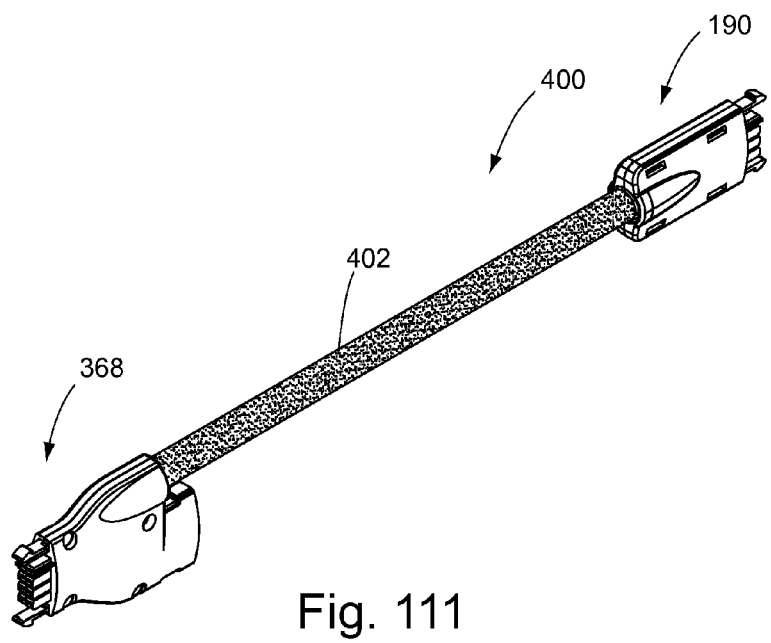
Figure 112:
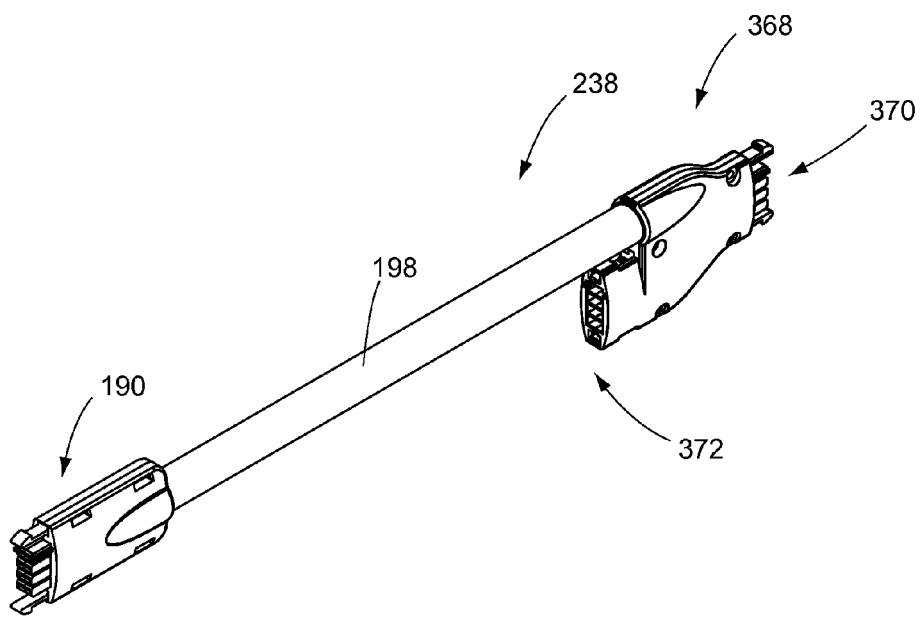
Figure 113:
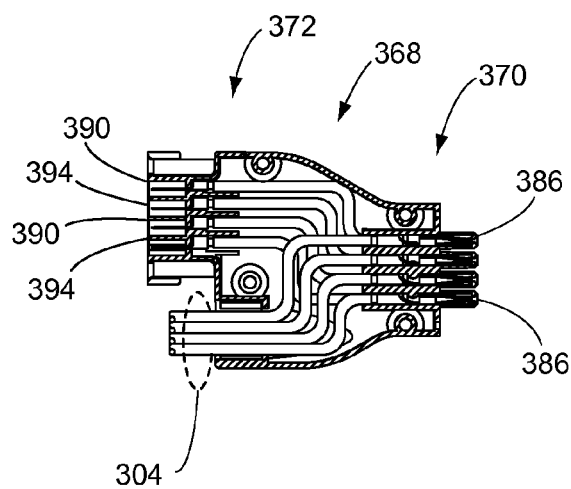
Figure 114:
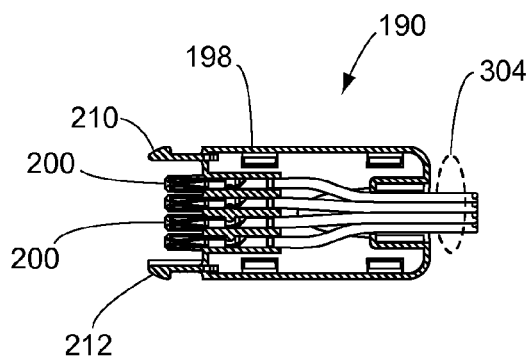
Figure 115:
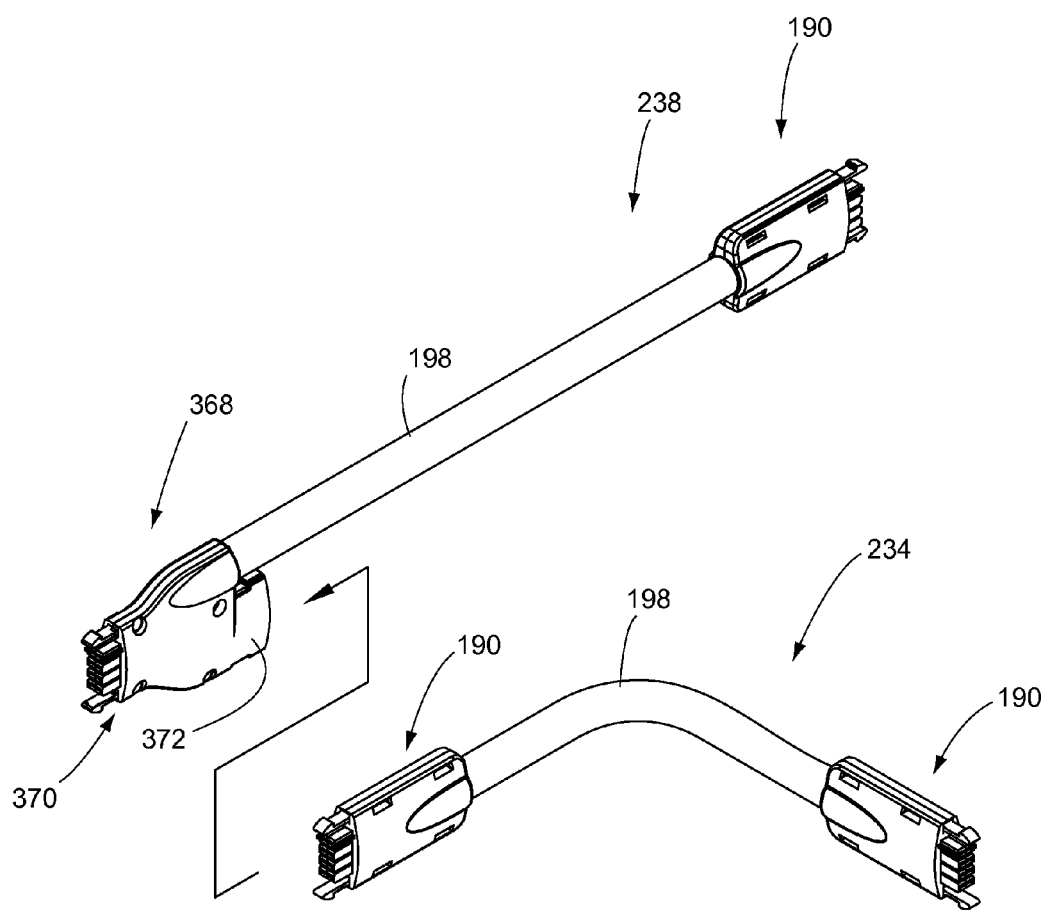
Figure 116:
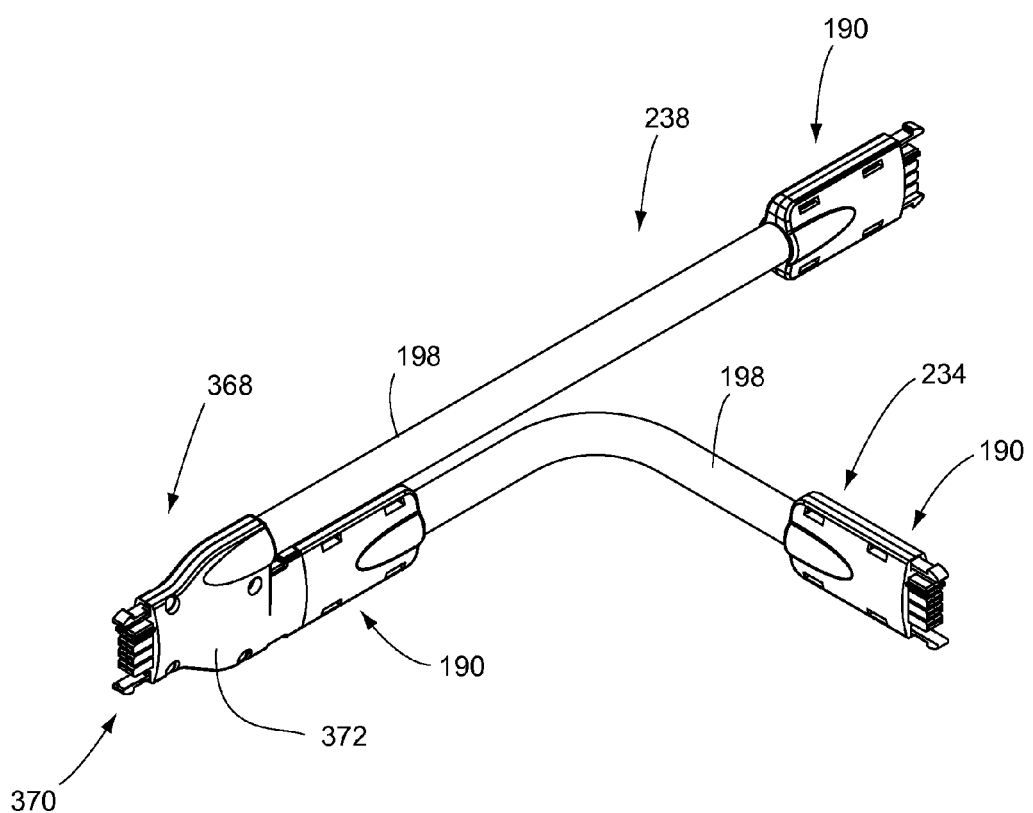
Figure 117:
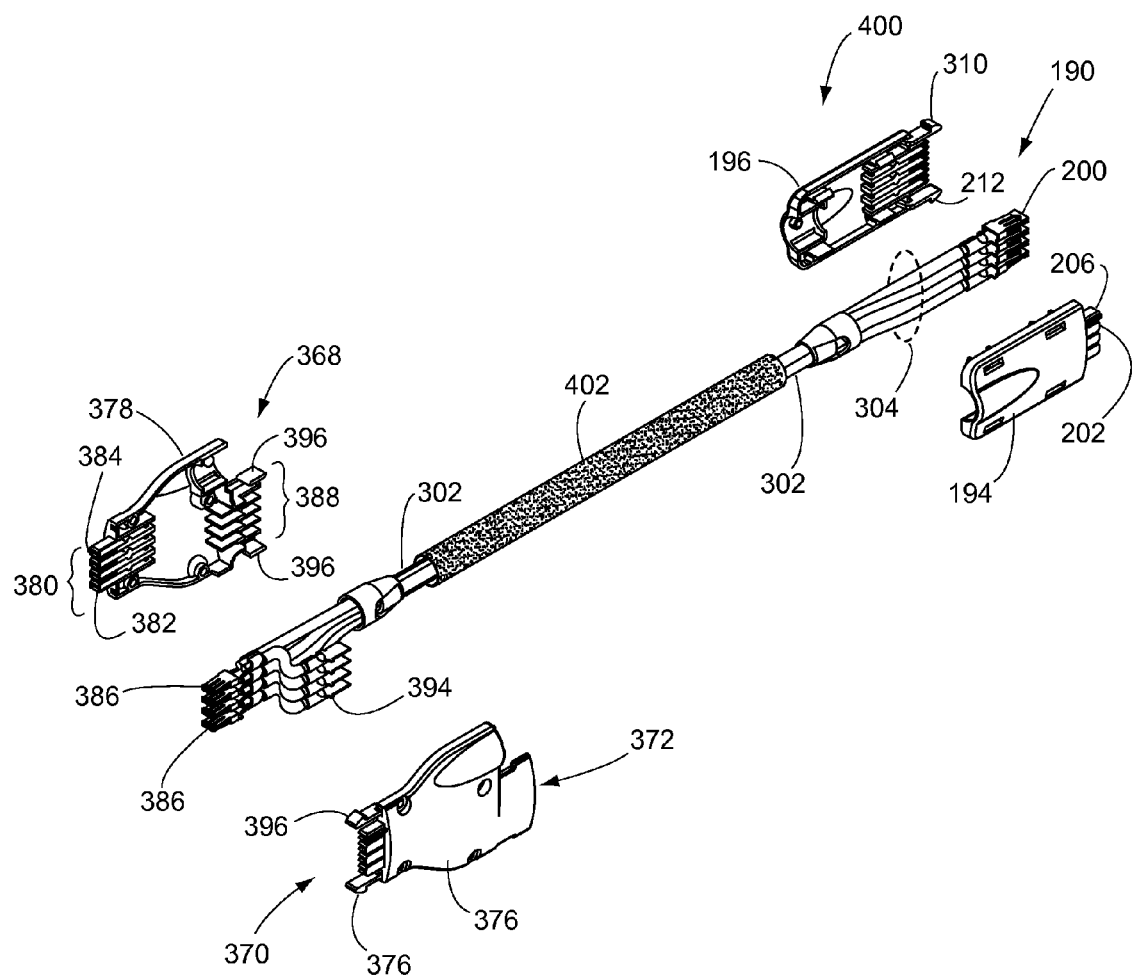
Figure 118:
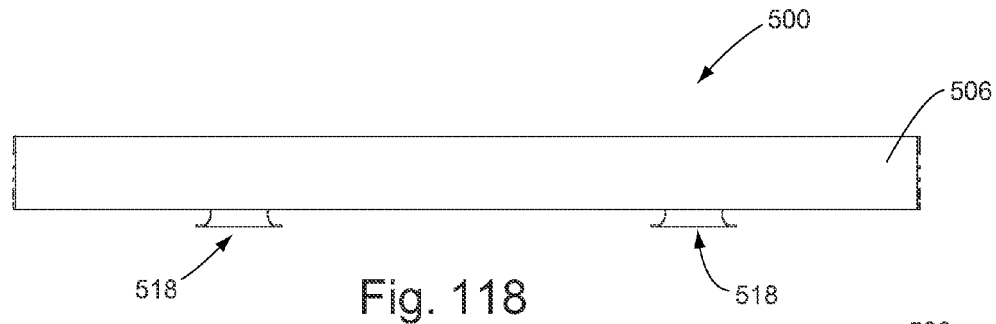
Figure 119:
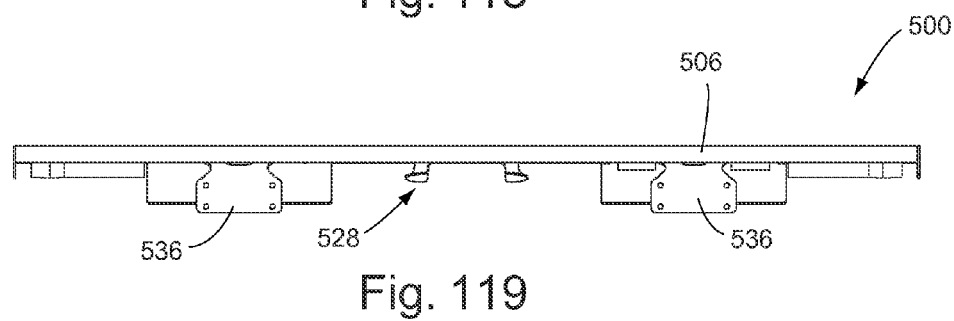
Figures 120, 120A, 120B:
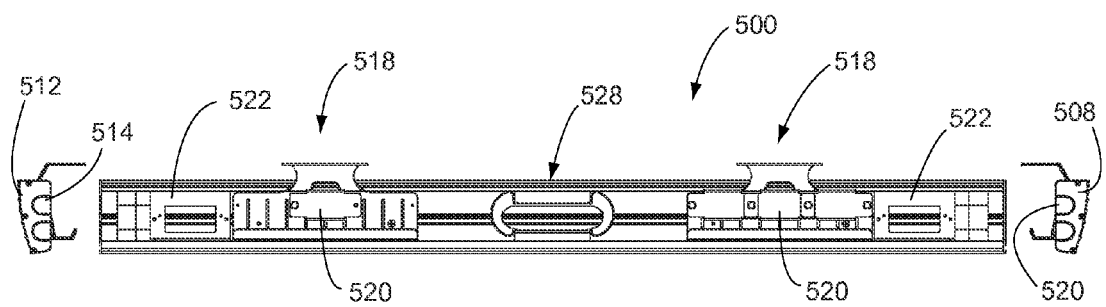
Figure 121:
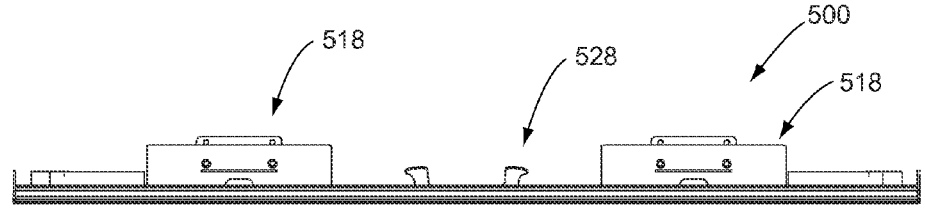
Figure 122:
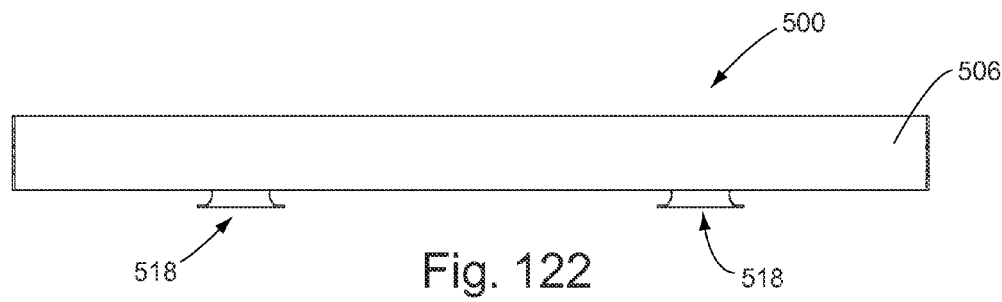
Figure 123:
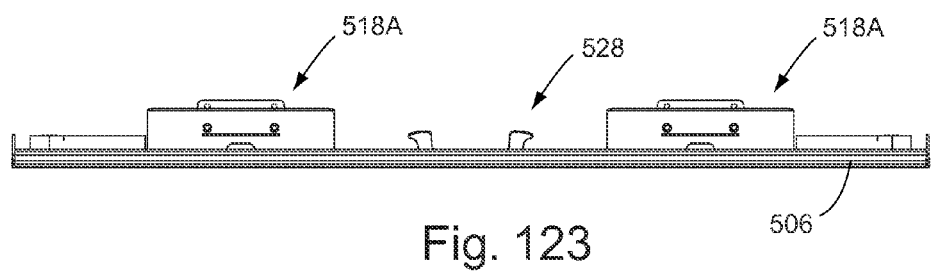
Figures 124, 124A, 124B:
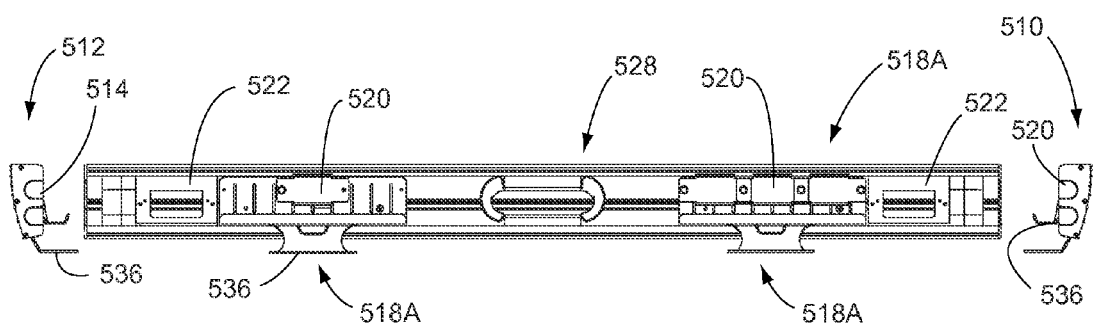
Figure 125:
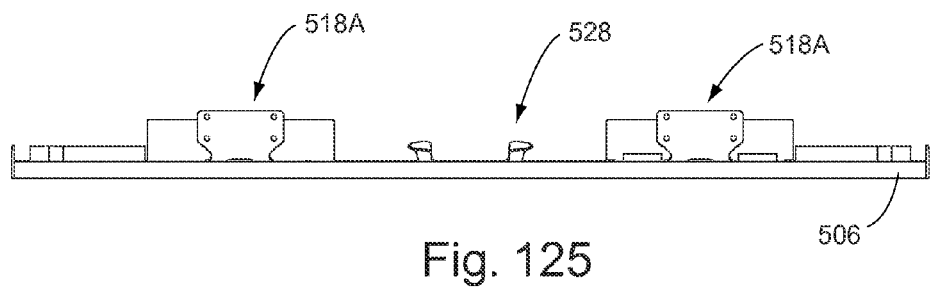
Figure 126:
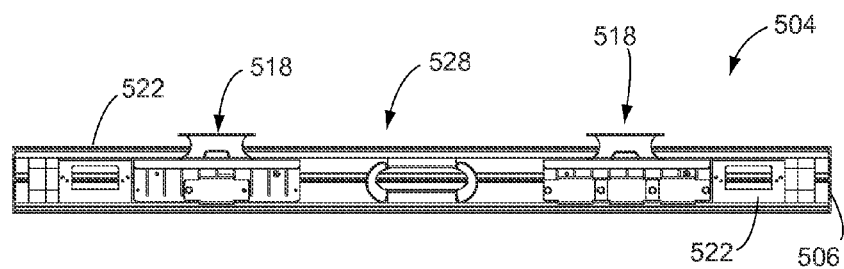
Figure 127:
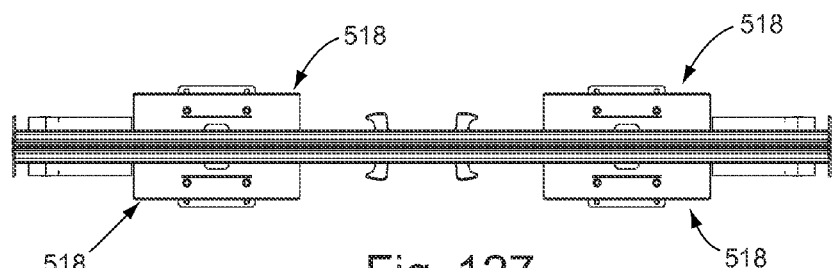
Figures 128, 128A, 128B:
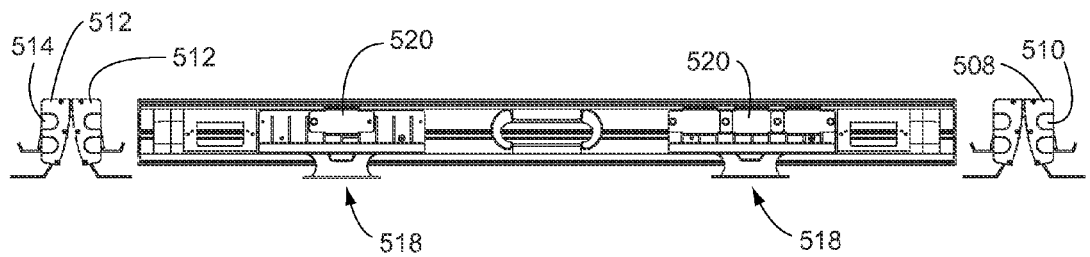
Figure 129:
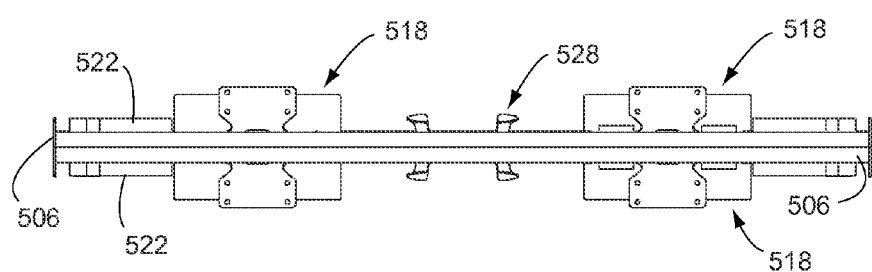
Figure 130:
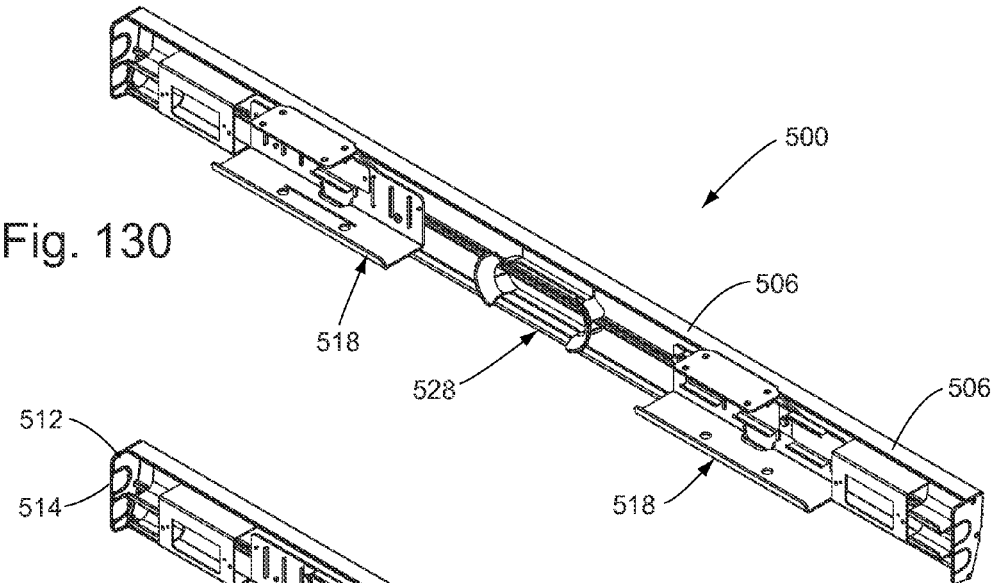
Figure 131:
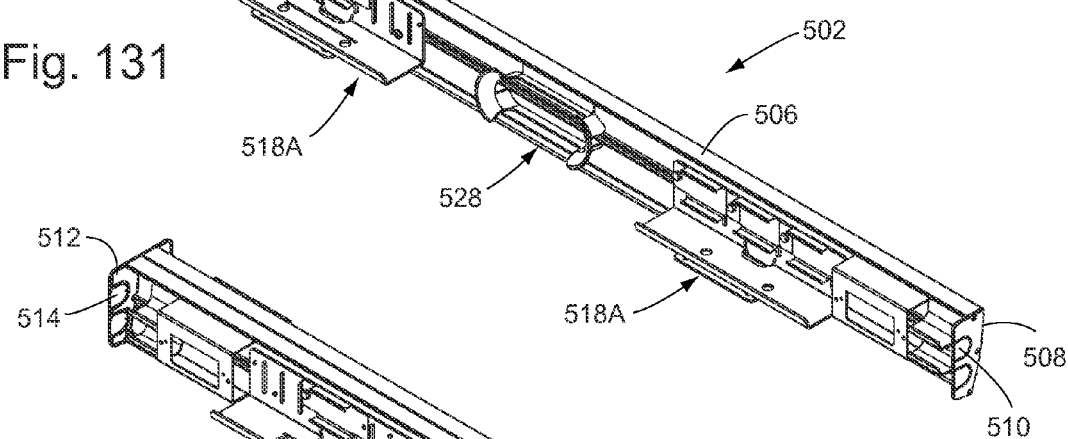
Figure 132:
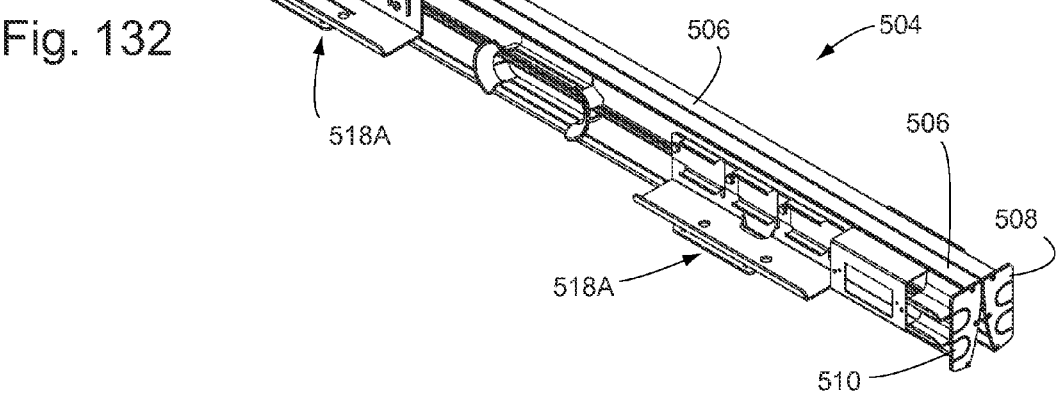
Figure 141:
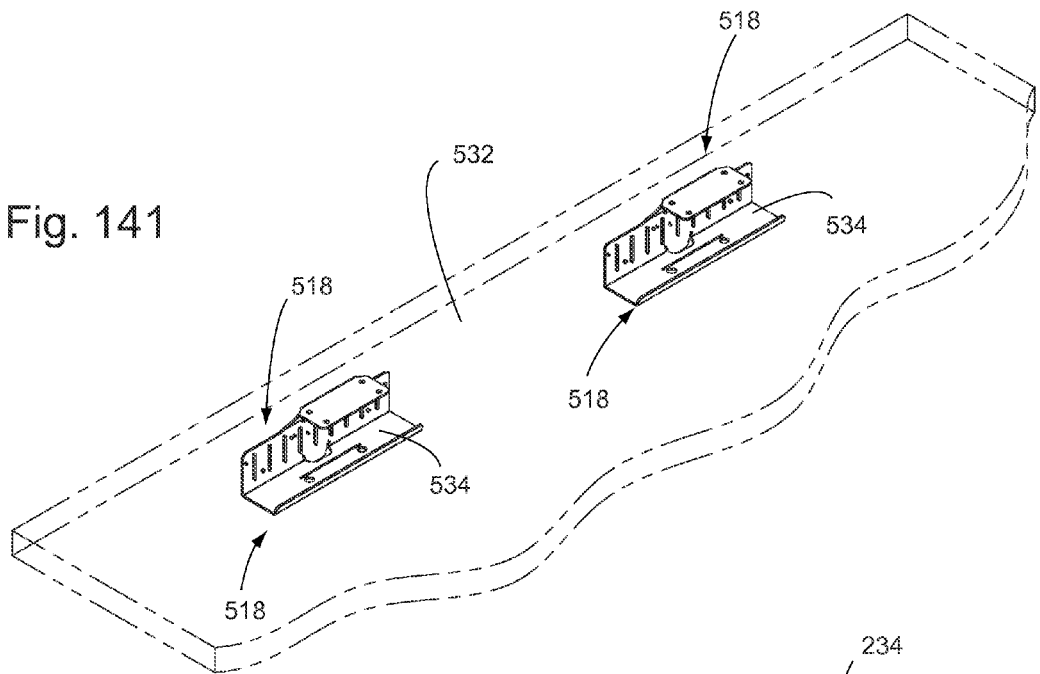
Figure 142:
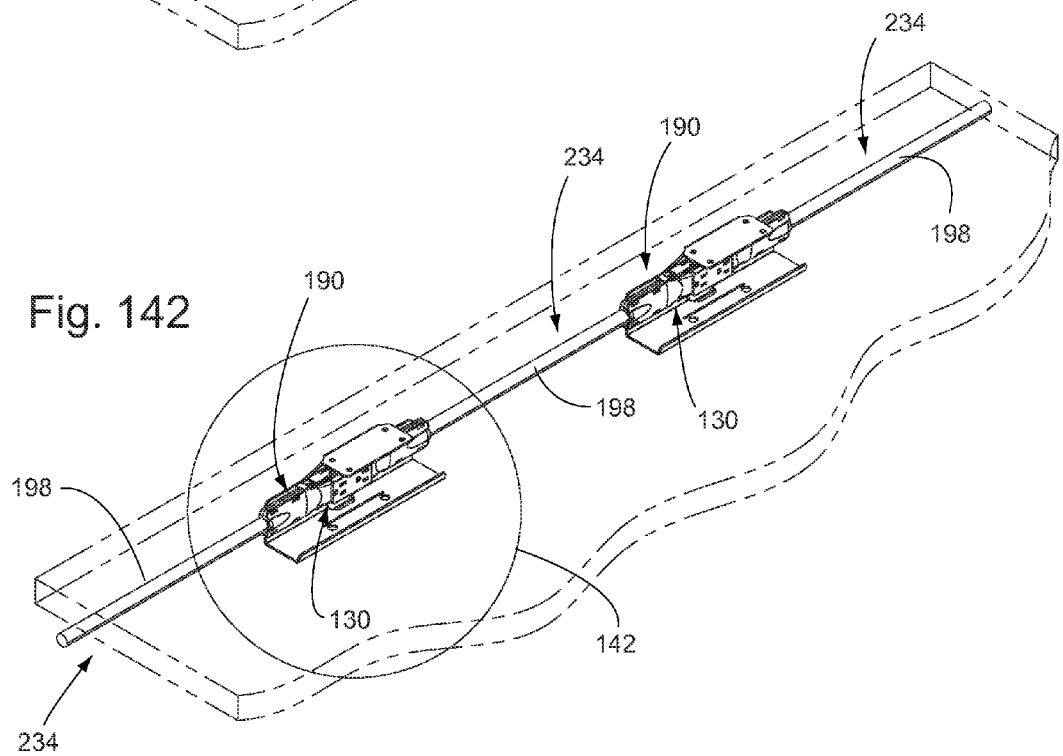
Figure 143:
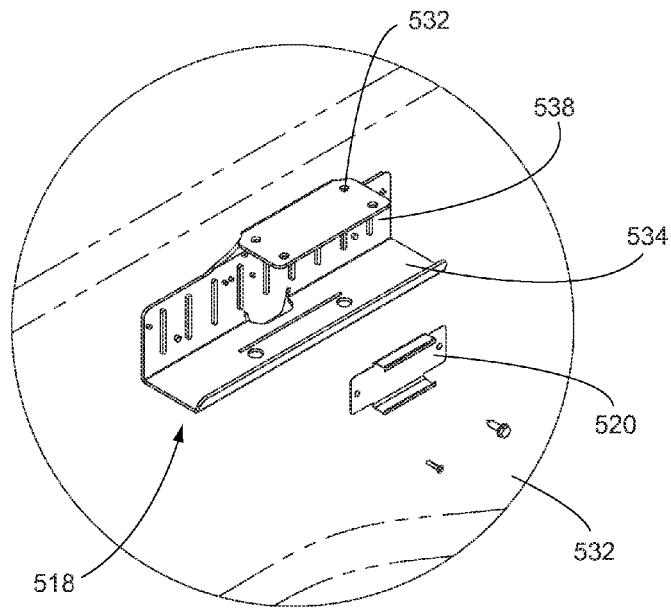
Figure 144:
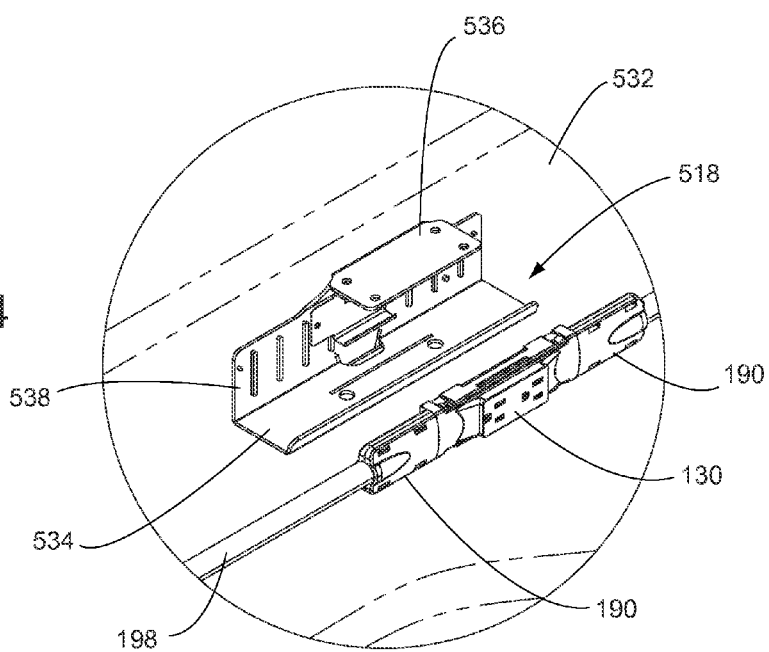
Figure 145:
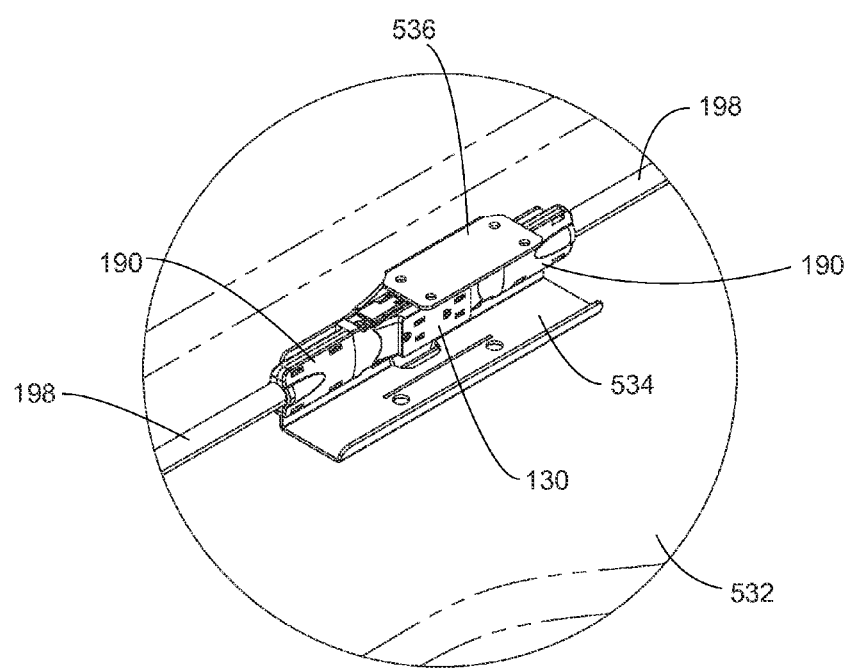

FIG. 102;

FIG. 103A is a left-end, elevation view of one end of the three way jumper assembly shown in FIG. 102;

FIG. 103B is a right-end, elevation view of the three way jumper assembly shown in FIG. 103;

FIG. 103C is an end, elevation view of the male connector block of the three way jumper assembly shown in FIG. 102;

FIG. 104 is an underside view of the three way jumper assembly shown in FIG. 102;

FIG. 105 is a rear, elevation view of the three way jumper assembly shown in FIG. 102;

FIG. 106 is a plan view of a further embodiment of a three way jumper assembly in accordance with the invention, showing the connector cable with a wire mesh configuration;

FIG. 107 is a front, elevation view of the three way jumper assembly shown in FIG. 106;

FIG. 107A is a left-end, elevation view of one of the end connector blocks of the three way jumper assembly shown in FIG. 106;

FIG. 107B is a right-end, elevation view of the three way jumper assembly shown in FIG. 106;

FIG. 107C is an end view of the male connector block of the three way jumper assembly shown in FIG. 106;

FIG. 108 is an underside view of the three way jumper assembly shown in FIG. 106;

FIG. 109 is a rear, elevation view of the three way jumper assembly shown in FIG. 106;

FIG. 110 is a perspective view of the three way jumper assembly shown in FIG. 102;

FIG. 111 is a perspective view of the three way jumper assembly shown in FIG. 106;

FIG. 112 is a reverse perspective view of the three way jumper assembly shown in FIG. 102;

FIG. 113 is a partial, sectional view showing the internal components of the male/female end connector block of the three way jumpers shown in FIG. 102;

FIG. 114 is a sectional view of the four wire female end connector block of the three way jumper assembly shown in FIG. 102;

FIG. 115 is a perspective and partially exploded view showing the relative positioning of the three way jumper assembly shown in FIG. 102 and one of the two way jumper assemblies, with one of the female end connector blocks of the two way jumper assembly being positioned so as to electrically interconnect to the male connector block of the three way jumper assembly;

FIG. 116 is a perspective view similar to FIG. 115, but showing the two way female jumper assembly connected to the three way jumper assembly;

FIG. 117 is a perspective and partially exploded view of the wire mesh three way jumper assembly shown in FIG. 106, and further showing internal components of the male/female end connector block and the female end connector block of the three way jumper assembly;

FIG. 118 is an upside down, rear view of an underside main wire management element in accordance with the invention;

FIG. 119 is a plan view of the wire management element shown in FIG. 118;

FIG. 120 is a front, elevation view of the wire management element shown in FIG. 118;

FIG. 120A is a left-end, elevation view of the wire management element shown in FIG. 118;

FIG. 120B is a right-end, elevation view of the wire management element shown in FIG. 118;

FIG. 121 is an underside view of the wire management element shown in FIG. 118;

FIG. 122 is an upside down, rear view of a top surface main wire management element in accordance with the invention;

FIG. 123 is a plan view of the wire management element shown in FIG. 122;

FIG. 124 is a front, elevation view of the wire management element shown in FIG. 122;

FIG. 124A is a left-end, elevation view of the wire management element shown in FIG. 122;

FIG. 124B is a right-end, elevation view of the wire management element shown in FIG. 122;

FIG. 125 is an underside view of the wire management element shown in FIG. 122;

FIG. 126 is an upside down, rear elevation view of a back-to-back wire management element in accordance with the invention;

FIG. 127 is a plan view of the wire management element shown in FIG. 126;

FIG. 128 is a front, elevation view of the wire management element shown in FIG. 126;

FIG. 128A is a left-end, elevation view of the wire management element shown in FIG. 126;

FIG. 128B is a right-end, elevation view of the wire management element shown in FIG. 126;

FIG. 129 is an underside view of the wire management element shown in FIG. 126;

FIG. 130 is a perspective view of the wire management element shown in FIG. 118;

FIG. 131 is a perspective view of the wire management element shown in FIG. 122;

FIG. 132 is a perspective view of the wire management element shown in FIG. 126;

FIG. 133 is a perspective view of a cover plate for the wire management system;

FIG. 134 is a perspective view of a right-end plate for the wire management system;

FIG. 135 is a perspective view of a left-end plate for the wire management system;

FIG. 136 is a perspective view of a pair of wire cradles for the wire management system;

FIG. 137 is a perspective view of a receptacle junction block cradle and a receptacle junction block connecting bracket;

FIG. 138 is a perspective view of an outlet connector bracket, along with perspective views of a connector blank and a voice/data connector;

FIG. 139 is a perspective view of a wire cradle and holder;

FIG. 140 is a perspective view of a receptacle cradle;

FIG. 141 is a perspective view showing a work surface in phantom line format, along with a pair of receptacle junction block cradles in accordance with the invention;

FIG. 142 is similar to FIG. 141, but shows an electrical system secured within the pair of receptacle junction block cradles;

FIG. 143 is a partially exploded view, showing the junction block cradle and a block bracket as positioned for connection to the junction block cradle;

FIG. 144 is an enlarged, perspective and partially exploded view showing positioning of the electrical system for securing to the block cradle and connector bracket;

FIG. 145 is similar to FIGS. 143 and 144, that shows an enlarged view of a portion of the electrical system being fully secured within the junction block cradle.

Figure 146:
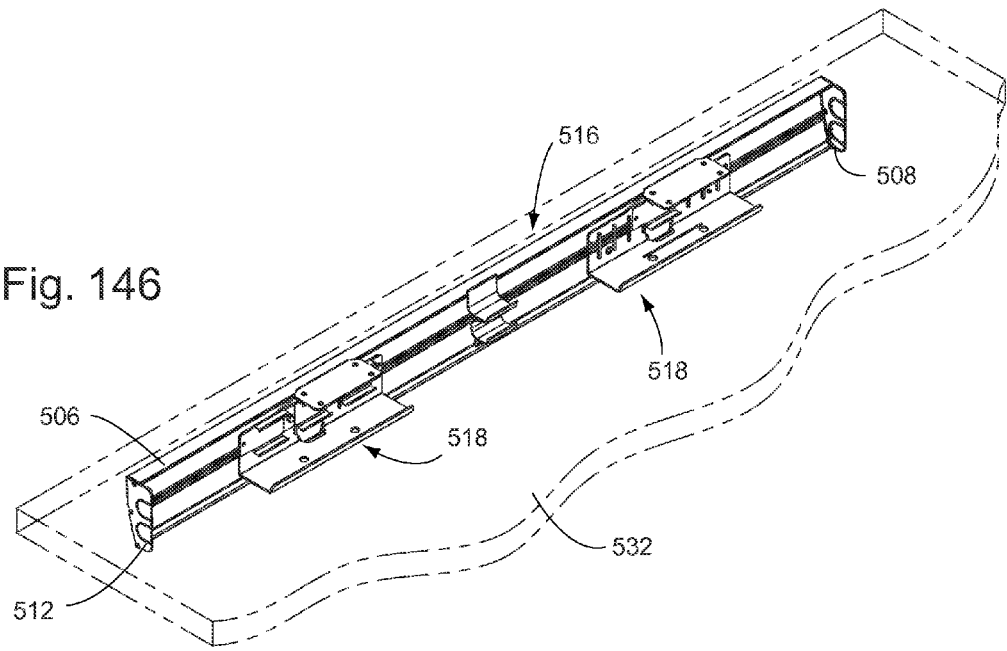
Figure 147:
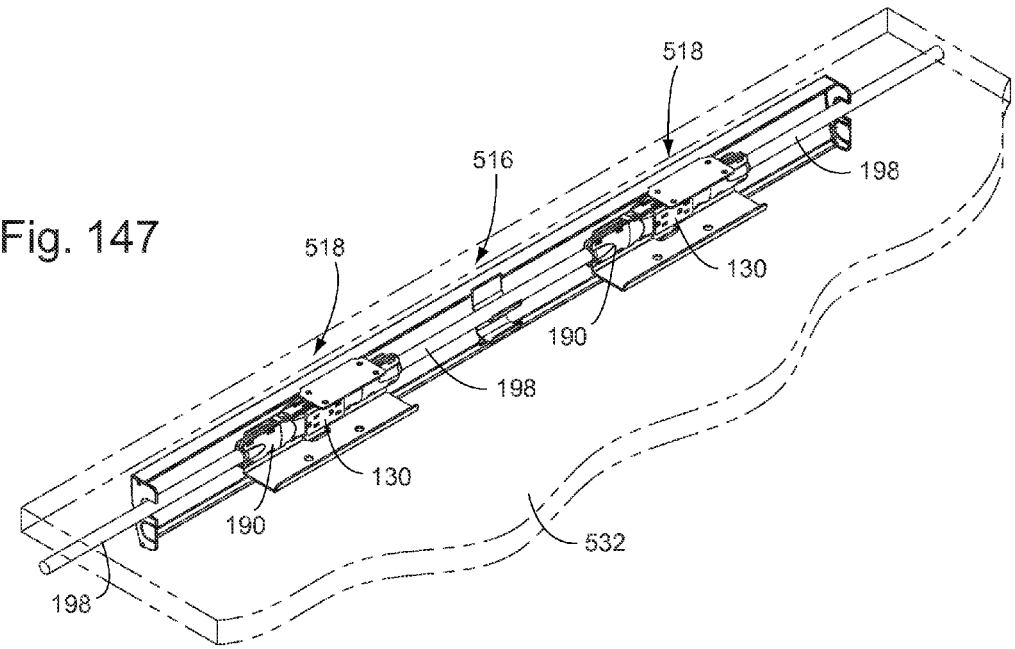
Figure 148:
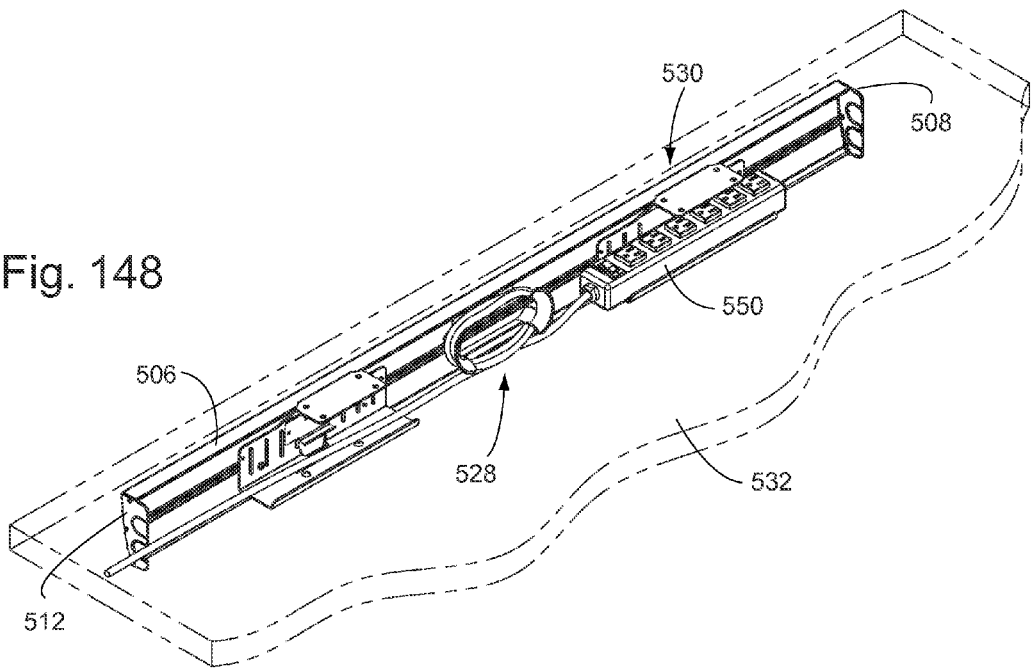
Figure 149:
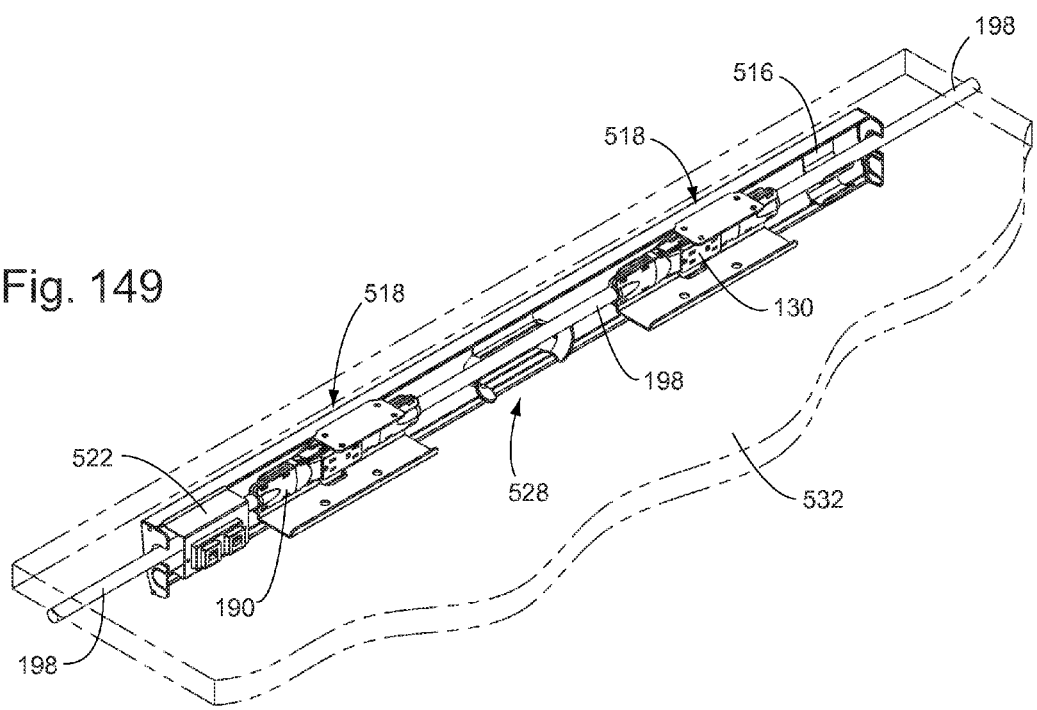
Figure 150:
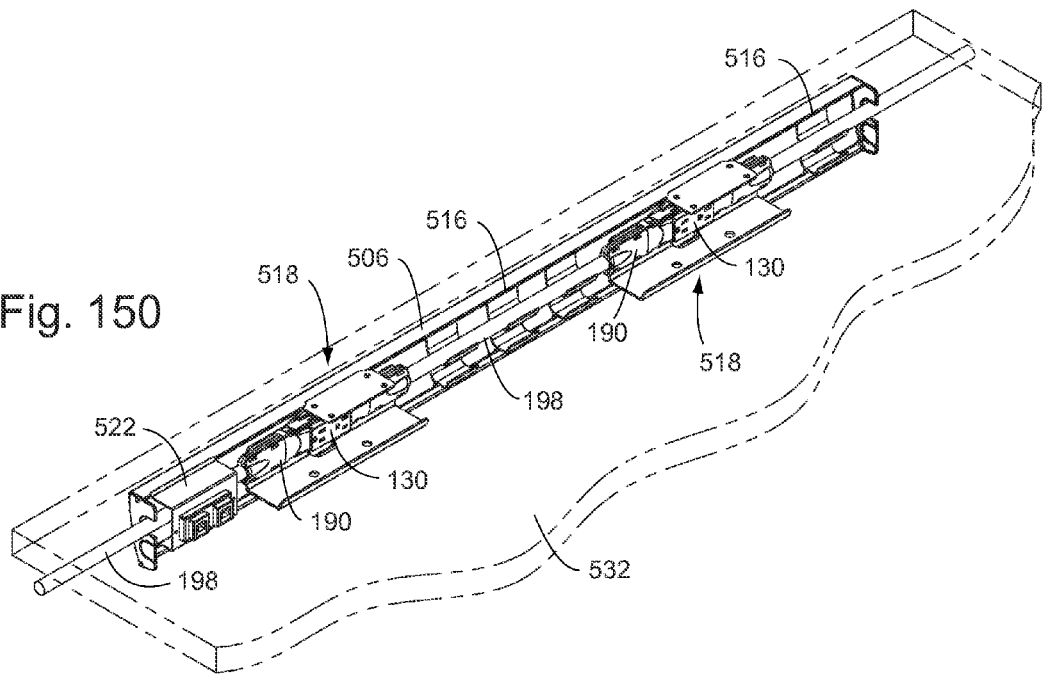
Figure 151:
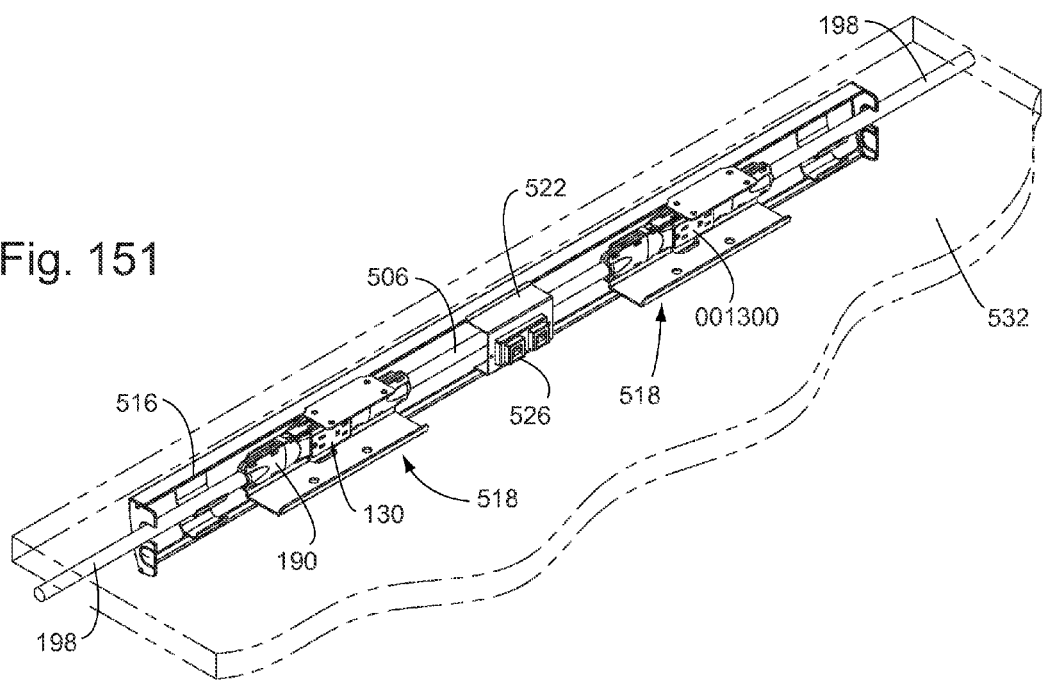
Figure 152:
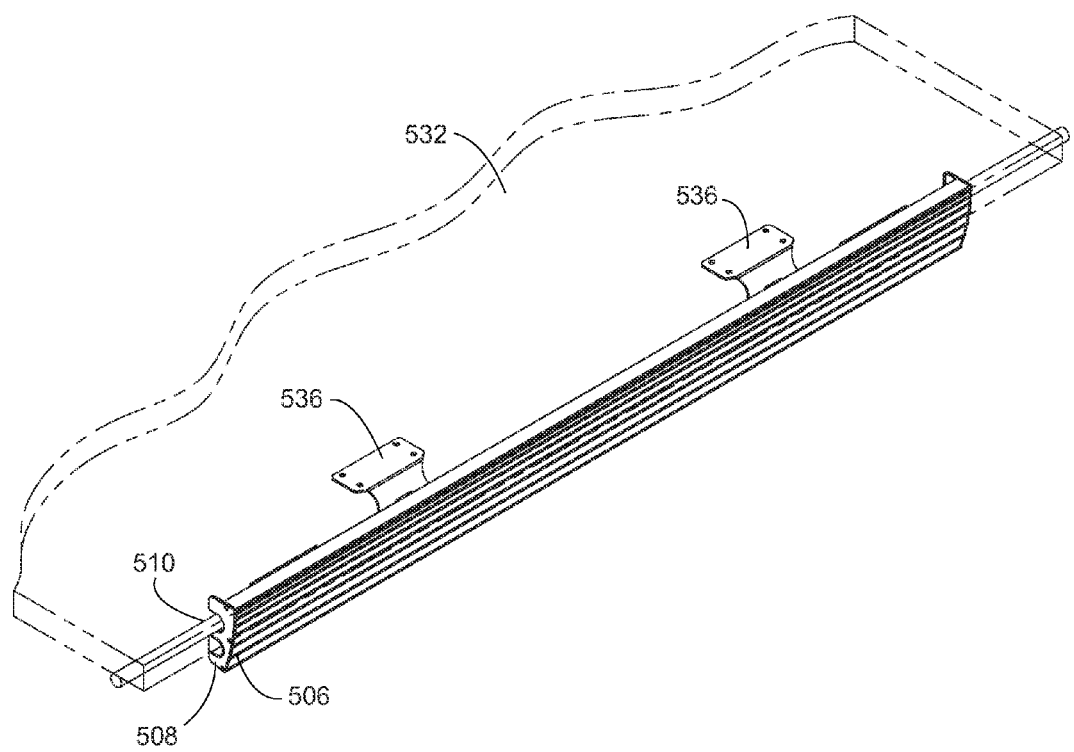
Figure 153:
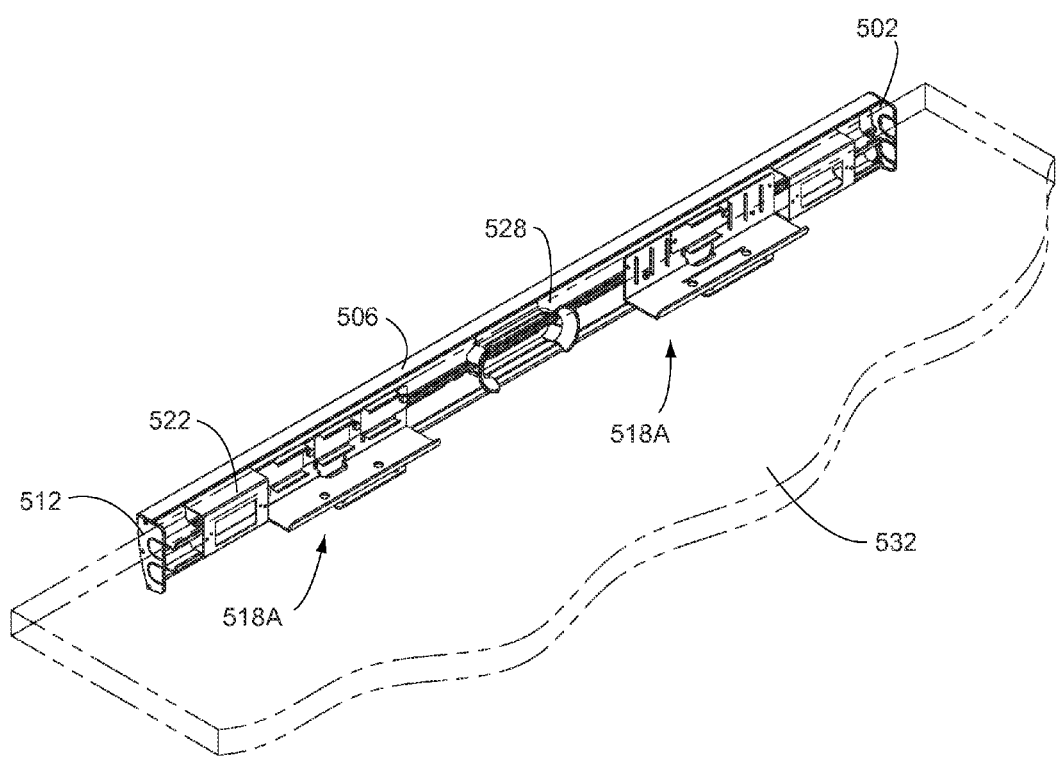
Figure 154:
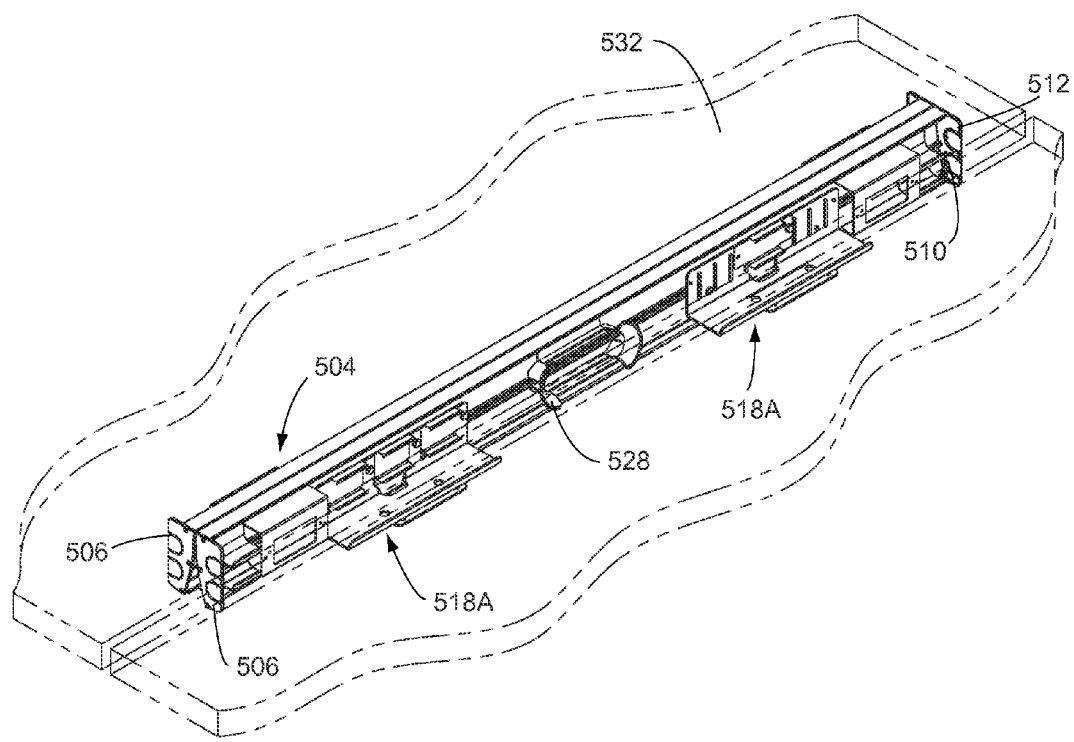
Figure 155:
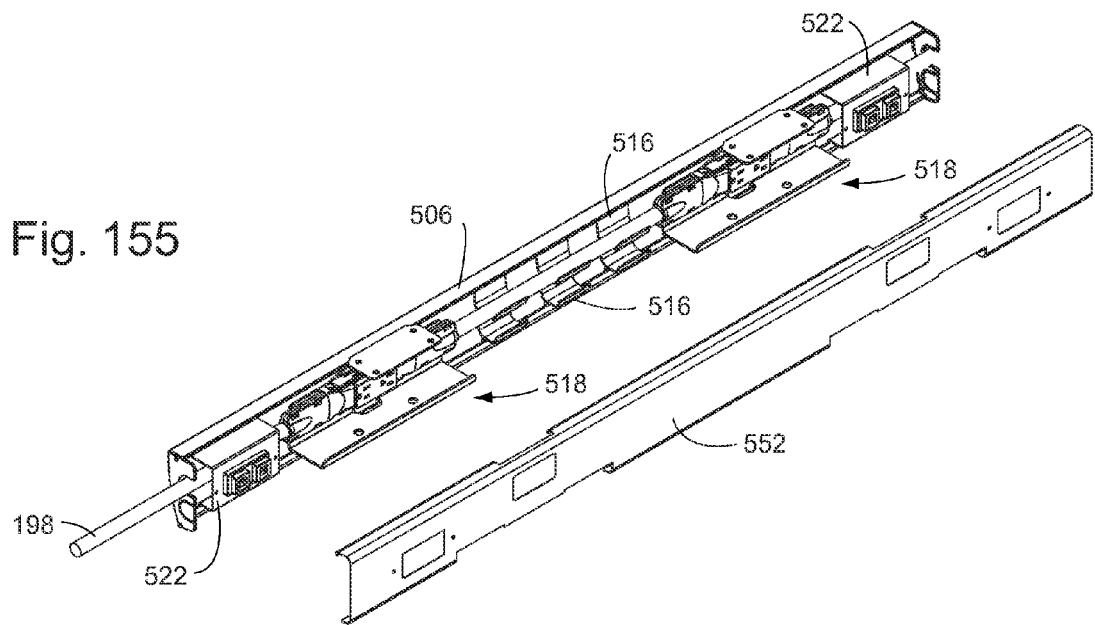
Figure 156:
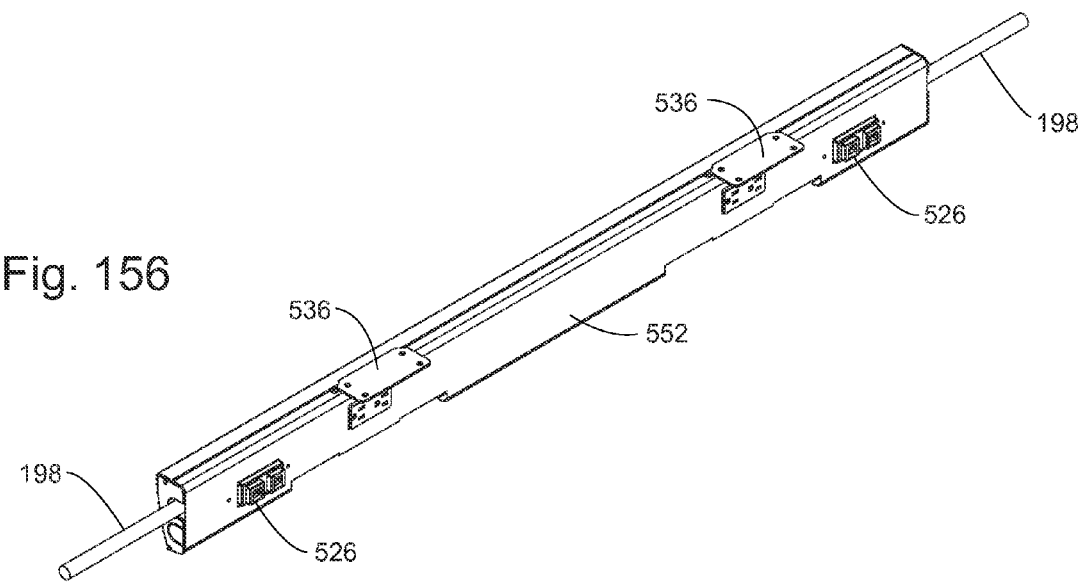

FIG. 146 illustrates the use of the underside main wire management element, with a pair of junction block cradles and a set of wire cradles;

FIG. 147 is similar to FIG. 146, but shows an electrical system secured within the wire management element illustrated in FIG. 146;

FIG. 148 is a perspective view similar to FIG. 147, but shows the wire management system as including the wire cradle and holder, receptacle cradle and receptacle block;

FIG. 149 is similar to FIG. 147, but shows the further addition of the connector bracket and voice/data connector;

FIG. 150 is similar to FIG. 149, but further shows the use of four wire cradles;

FIG. 151 illustrates an alternative configuration of the wire management system, showing the use of a pair of wire cradles at the ends of the system, as well as the use of a voice/data connector at the middle of the system;

FIG. 152 illustrates how the underside main wire management element may be secured to the work surface;

FIG. 153 illustrates the use of the top surface wire management element in a wire management and electrical circuit configuration;

FIG. 154 illustrates the use of the back-to-back wire management element on top of a work surface;

FIG. 155 is a partially exploded view showing the relative positioning of the cover with the main wire management element;

FIG. 156 is similar to FIG. 155, but shows the cover and wire management element in a fully assembled state.

DETAILED DESCRIPTION OF THE INVENTION

The principles of the invention are disclosed, by way of example, in several embodiments of a wire management system for use with modular electrical systems, as primarily shown in FIGS. 118-156. Prior to describing the wire management system, a modular electrical system in which the wire management system may be utilized is described herein with respect to FIGS. 1-117. For purposes of background, this description is also incorporated within the inventor's own United States Patent Application entitled MODULAR ELECTRICAL SYSTEM INCLUDING BACK-TO-BACK RECEPTACLE CONFIGURATIONS AND CAPABLE OF PROVIDING FOUR WIRE CIRCUITRY, Ser. No. 11/760, 787 filed Jun. 10, 2007. The initial portion of the detailed description of this specification describes this example modular electrical system. Thereafter, the wire management systems in accordance with the invention will be described. First, some general concepts associated with modular electrical systems will be described, and thereafter detailed descriptions are included with respect to the individual types of components which may be utilized. Following this description, various types of configurations of interconnection of electrical components in accordance with the invention will be described.

Figure 1:
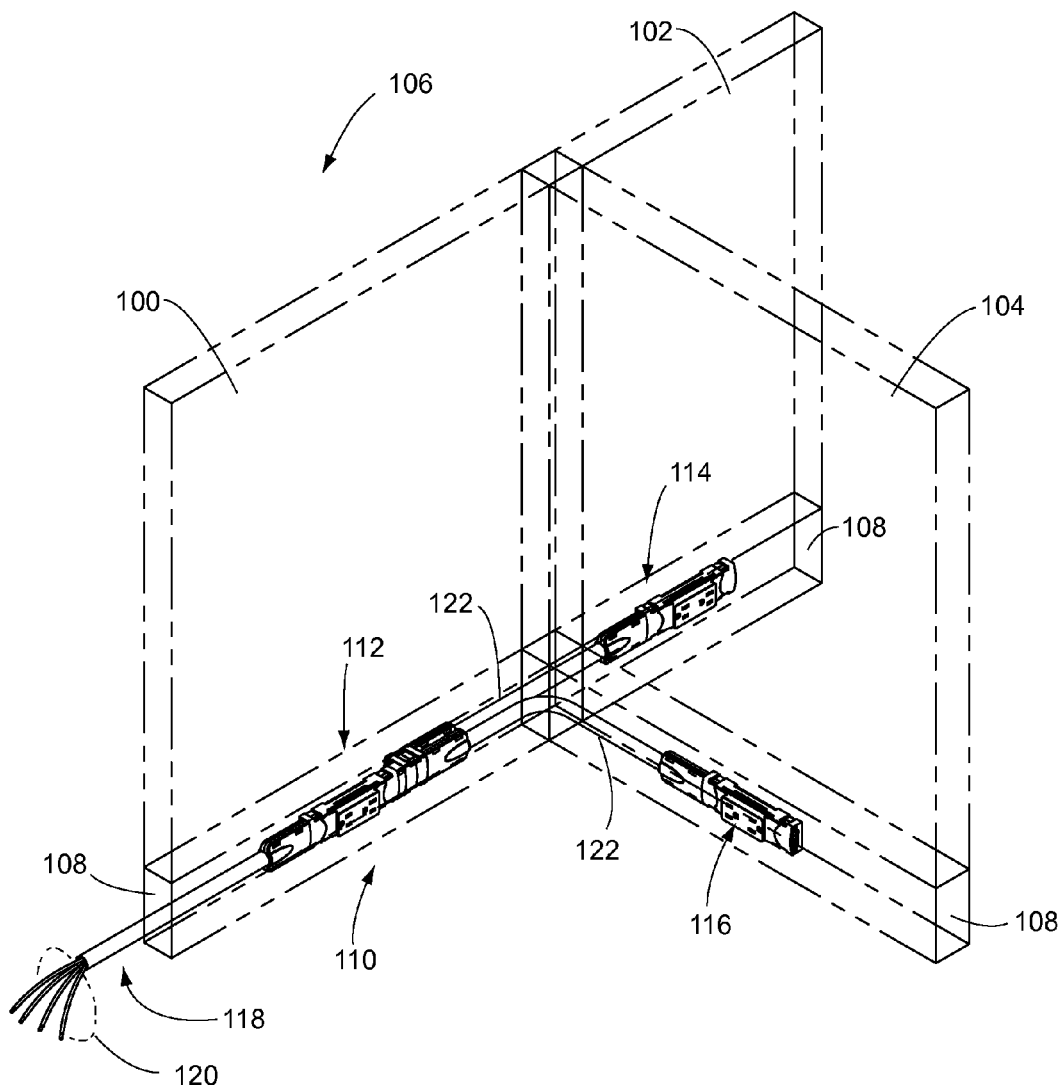
FIG. 1 is a fragmentary, perspective view of a plurality of adjacent wall panels and electrical connection assemblies arranged in the panels, with the electrical connection assemblies being part of a modular electrical system in accordance with the invention.
Figures 6, 7:
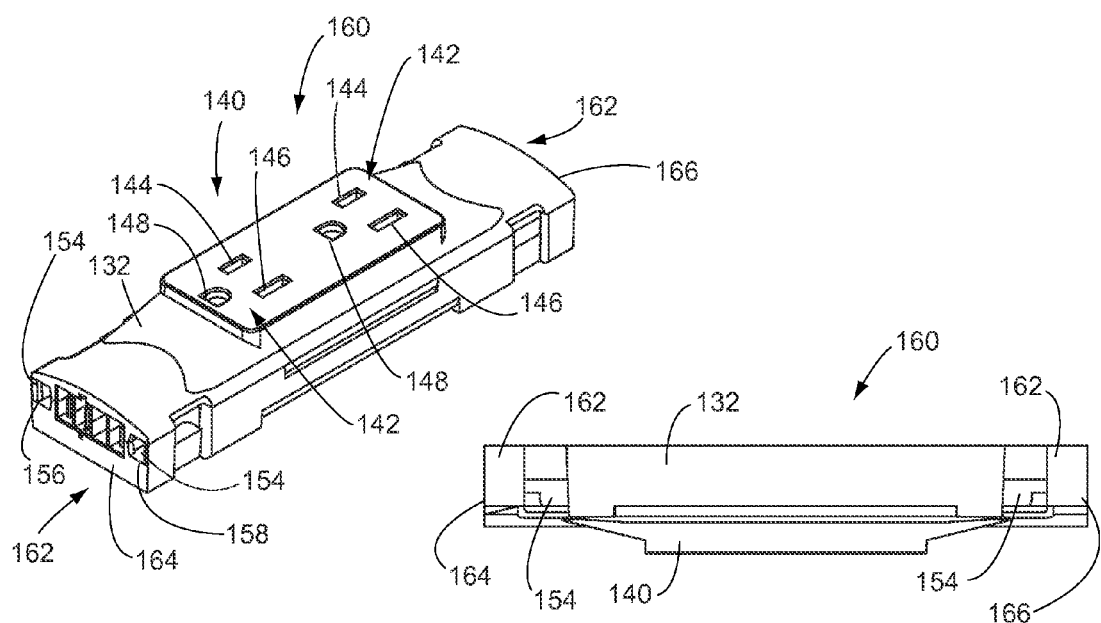
FIG. 6 is a perspective view of a four-wire female receptacle junction block in accordance with the invention, similar to the junction block shown in FIG. 2, but with an alternative keying arrangement.
FIG. 7 is an upside-down view of the four-wire female receptacle junction block illustrated in FIG. 6.

To provide for one example background of where modular electrical systems in accordance with the invention may be utilized, FIG. 1 illustrates a fragmentary, perspective view of a series of adjacent modular wall panels 100, 102 and 104 of a rearrangable wall system 106. In this case, wall panels 100 and 102 are aligned with each other, and wall panel 104 is perpendicular to panels 100, 102. Each of the wall panels includes a raceway area 108 formed along the lower edges of the wall panels 100, 102 and 104. For purposes of description, raceway covers, which would be customarily used, have been omitted from the drawing in FIG. 1 so as to better show the electrical components. The electrical components which are shown in FIG. 1 within the raceways 108 can be characterized in their entirety as a modular electrical system 110 in accordance with the invention. It should be understood immediately that electrical systems in accordance with the invention do not consist of only a single specific configuration of electrical components. Instead, part of the invention resides in the capability of forming a substantial number of electrical component configurations in a relatively easy manner, for purposes of providing desired power distribution. Again for purposes of description, the modular electrical system 110 shown in FIG. 1 is illustrated as including a first component set 112 within the raceway 108 of wall panel 100, and second component set 114 within the raceway 108 of wall panel 102 and a third component set 116 within the raceway 108 of wall panel 104. These electrical component sets 112, 114 and 116 are utilized for purposes of distributing power for facilitating use of power throughout the environment comprising the rearrangable wall system 106. In this particular case, FIG. 1 illustrates incoming power as being received only through a single power cable, namely, incoming power cable 118. Incoming power cable 118 may be connected to a source of suitable electrical power for purposes of energizing various types of application devices which may be connected to the electrical system 110.

In part, the modular electrical system 110 in accordance with the invention may be particularly suitable for use in a four wire electrical system. A four wire system may be suitable for providing electrical power where no more than two separate circuits may be required. In particular, certain concepts of the modular electrical system 100 in accordance with the invention are specifically directed to physical and electrical configurations which facilitate the use of the electrical system 100 raceways 108 which may be relatively narrow or otherwise relatively small. In such an instance, electrical components designed for use with 8, 10 or even 14 wires may be substantially too bulky for use within raceways 108. Also, such systems are inherently more expensive and essentially comprise a waste of money and materials if two circuits (using a common neutral and a common ground) may be sufficient for needs of the users. In such a four wire system, the four wire configuration typically would consist of two hot wires, a neutral wire and a ground wire. Electrical connections may be made to one of the two hot wires, depending upon which particular circuit would be used.

Returning again to FIG. 1, the incoming power cable 118 is utilized to supply incoming power through the four wire set 120 partially shown in FIG. 1. Although omitted from FIG. 1, the four wire set 120 would be connected to a source of appropriate incoming electrical power, with the power being provided on a four wire basis. As further shown in FIG. 1, the incoming power cable 118 is connected into the first component set 112. For purposes of efficiency in the description, the individual electrical components of the component set 112 will not be described at this point in the disclosure. Instead, these components will be made apparent from description in subsequent paragraphs herein with respect to the individual components and the means for interconnection therebetween. At this time, it may be stated that the power from the incoming power cable 118 is distributed as necessary within the first component set 112. Through connecting cables 122 (which will again be described in greater detail in subsequent paragraphs herein), the power coming from the incoming power cable 118 and the first component set 112 is distributed to the second components set 114 in the wall panel 102 and the third component set 116 in the wall panel 104. Again, as will be described in subsequent paragraphs herein, each of the connecting cables 122 may be in the form of a two way female jumper assembly.

Example embodiments of separate components which may be utilized with the modular electrical system 110 (or other electrical systems in accordance with the invention) will now be described. As will be apparent from the description and the illustrations of the drawings, the systems 100 which utilize four wire configurations are advantageous in view of their smaller size. Such systems are capable of fitting into narrower wall panels, and also with desk systems having relatively small raceways. Still further, as will also be apparent from subsequent description herein, certain components of the electrical systems in accordance with the invention utilize a "one piece" junction block and receptacle. That is, in the field, it is unnecessary to separately and physically connect a receptacle block to a junction block. Accordingly, fewer parts are required for installation of electrical systems within panel or desk assemblies.

In this regard, and particularly with respect to the use of a four wire configuration, the four wires will still provide for the use of two separate circuits. Still further, and again in accordance with subsequent description, the configurations of electrical systems in accordance with the invention facilitate assembly and installation, with what could be characterized as positive latching mechanisms. In addition, for facilitating installation, and ensuring proper installation, male and female connectors utilized within the electrical systems in accordance with the invention may be keyed for purposes of correct polarization and circuitry. Still further, the keying configurations can be changed for different circuitry.

Turning again to the drawings, the first electrical component in accordance with the invention which will be described herein is characterized as a four wire receptacle junction block 130, including a keying configuration. The receptacle junction block 130 is illustrated in particular in FIGS. 2-15.

For purposes of reducing the volume of description, the four wire receptacle junction block 130 with keying will be described herein as the "receptacle junction block 130." However, it should be emphasized that without departing from the spirit and scope of certain concepts of the invention, the junction block 130 and other electrical components of modular electrical systems in accordance with the invention may utilize other numbers of wires, such as five, eight, fourteen and the like. Also, when describing the receptacle junction block 130 and its interconnections to other components of the electrical system 110, it will be assumed that the connector sets (subsequently described herein) at opposing ends of the receptacle junction block 130 will consist of male blade terminals, and may be referred to herein as male connector sets or male connector blocks. However, it should again be emphasized that without departing from a number of concepts of the invention, the receptacle junction blocks 130 could be developed and assembled with female connector sets at opposing ends of the block 130. In fact, with all electrical components of the systems described herein in accordance with the invention, it should be remembered that female connector sets may be substituted for male connector sets, and vice versa. Also, and as earlier stated, a number of concepts of the invention are not limited to the use of four wires and/or two separate circuits. Instead, the connector configurations initially described herein, with respect to the use of four wire configurations, essentially comprise what the inventor believes may be preferred embodiments for electrical systems in accordance with the invention.

Turning again to FIGS. 2-15, the primary purpose of the four wire receptacle junction block 130 is to provide a means for supplying power to one or more electrical outlet receptacles which are formed as integral components of the receptacle junction block 130. The receptacle junction block 130 also provides a means for supplying power to the electrical outlet receptacles through one of two selective circuits (assuming four wire circuitry). In addition, the receptacle junction block 130 provides a means for passing incoming power past the integrally coupled electrical outlet receptacles and facilitating distribution of the power to other components of the modular electrical system.

FIG. 2 illustrates a perspective view of the receptacle junction block 130 in accordance with the invention. The receptacle junction block 130 includes opposing male end connectors with an integrally molded duplex receptacle. The junction block 130 is adapted to utilize four wires, thereby providing two separate circuits with a common neutral and a common ground. With reference first to fix 2-5, the receptacle junction block 130 includes a central housing 132 having like somewhat of a box-like configuration. Integrally molded to opposing ends of the central housing 132 are a pair of male end connector sets 134. The connector sets 134, as show in FIG. 2, comprise a first male end connector set 136 and a second opposing male end connector set 138. As described herein, each of the male end connector sets includes connectors housing for male blade terminals. Extending outwardly from one side of the central housing 132 and integrally molded therewith is a duplex receptacle set 140. The receptacle set 140 includes a pair of electrical outlet receptacles 142. Each of the outlet receptacles 142 is adapted for use with a grounded circuit, and includes three outlets. Specifically, each outlet receptacle 142 includes a hot terminal outlet 144, neutral terminal outlet 146 and ground terminal outlet 148, the outlets being conventional in nature.

As shown particularly in FIGS. 2 and 4, the first male end connector set 136 includes a series of four male blade terminals 150 extending into the male end connector set 136. These same male blade terminals 150 will also appear extending through the second opposing male end connector set 138. As particularly shown in FIG. 4, the first male end connector set 136 includes a keyed connector 152 located at the top of individual connectors 151. Although not shown on the drawings, a corresponding keyed connector 152 will also exist within a set of connectors 151 associated with the second opposing male end connector set 138. The keyed connectors 152, in accordance with the invention, provide for a means for ensuring proper polarization and circuitry connection among individual components of the modular electrical system 110 in accordance with the invention.

With further reference to FIGS. 2 and 4, the first male end connector set 136 includes a pair of tab slots 154 located at the top and bottom portions of the end of the connector set 136. The tab slots 154 comprise a first tab slot 156 and a second tab slot 158. As will be described in subsequent paragraphs herein, the tab slots 156, 158 are utilized to mechanically and releasably secure the receptacle junction block 132 other electrical components of the modular electrical system 110. Similar tab slots 154, although not shown in the drawings, will also exist on the second opposing male end connector set 138.

Figures 8, 9:
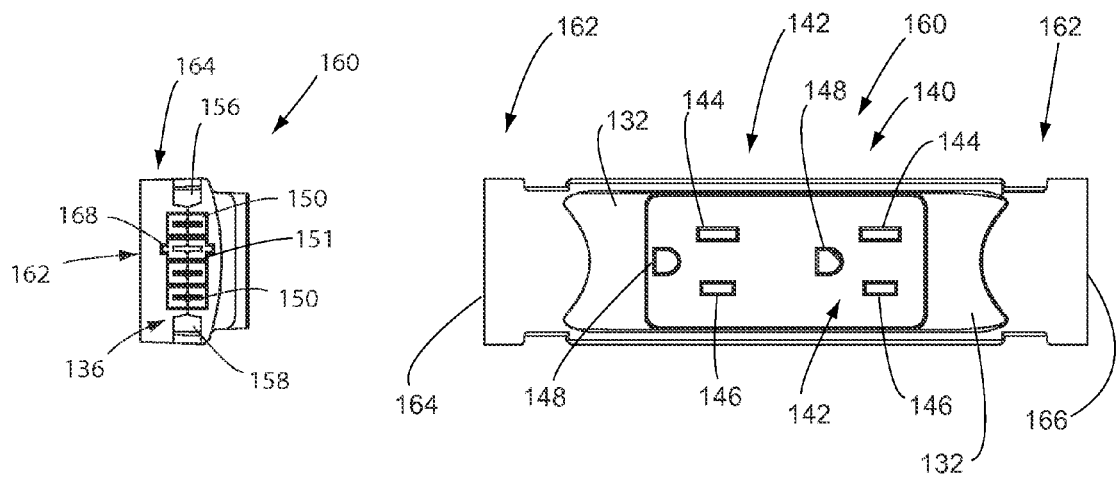
FIG. 8 is a left-side elevation view of the four-wire female receptacle junction block illustrated in FIG. 6.
FIG. 9 is a front, elevation view of the four-wire female receptacle junction block illustrated in FIG. 6.

As previously described herein, the four-wire receptacle junction block 130 includes a keyed connector 152 shown at the top of the connectors 151 in FIG. 4. A receptacle junction block substantially similar to the receptacle junction block 130, but having a difference keying arrangement is illustrated in FIGS. 6-9 as the four-wire receptacle junction block 160. With reference to these drawings, the four-wire receptacle junction block 160, like the receptacle junction block 130, includes a central housing 132 and duplex receptacle set 140. The duplex receptacle set 140 includes a pair of electrical outlet receptacles 142, each having a hot terminal outlet 144, neutral terminal outlet 146 and ground terminal outlet 148. The receptacle junction block 160 also includes male end connector sets 162, substantially corresponding to the male end connector sets 134 of junction block 130. The connector sets 162 include a first male end connector set 164 primarily shown in FIG. 8, and a second opposing male end connector set 166. With reference to the first male end connector set 162, the connector set 162 includes a series of four connectors 151, each adaptor to receive one of a set of male blade terminals 150. As further shown in FIG. 8, the connector 151 which is second from the top of the connectors 151 shown in FIG. 8 is a keyed connector identified as keyed connector 168. Accordingly, the keyed connector 168 in FIG. 8 for junction block 160 is in a different position than the keyed connector 152 of the junction block shown in FIG. 4. Also similar to the receptacle junction block 130, the receptacle junction block 160 includes a pair of tab slots 154 located on the first male end connector set 164 and a corresponding set of tab slots 154 (not shown) on the second opposing male end connector set 166. Each pair of tab slots 154 includes a first tab slot 156 and a second tab slot 158.

A still further embodiment of a four-wire receptacle junction block in accordance with the invention is illustrated as receptacle junction block 170 in FIGS. 10-13. The receptacle junction block 170 is substantially similar to receptacle junction blocks 130 and 160, but with an alternative keying arrangement. With reference to FIGS. 9-13, the four-wire receptacle junction block 170, as with the receptacle junction block 130, includes a central housing 132 and a duplex receptacle set 140. The duplex receptacle set 140 includes a pair of electrical outlet receptacles 142, with each receptacle 142 including a hot terminal outlet 144, neutral terminal outlet 146 and ground terminal outlet 148. The receptacle junction block 170 includes a pair of opposing male end connector sets 172, with the connector sets 172 comprising a first male end connector set 174 (primarily shown in FIG. 12) and a second, opposing male end connector set 176. As with receptacle junction blocks 130, 160, the receptacle junction block 170 includes, with each male end connector set, a set of connectors 151 through which a set of four male blade terminals 150 are received. Correspondingly, each of the connector sets 174, 176 includes a pair of tab slots 154 comprising a first tab slot 156 and a second tab slot 158. In a manner somewhat different from the receptacle junction blocks 130, 160, the receptacle junction block 170 includes a pair of keyed connectors from the set of four connectors 151. Specifically, as shown in FIG. 12, the key connectors include a first keyed connector 178 at the top of the connector set 174 and a second keyed connector 180 located as the third from the top connector 151 of the first male end connector set 174.

The concept of utilizing various alternative configurations of key connectors can be substantially advantageous for a number of reasons. First, as will be described in subsequent paragraphs herein, the receptacle junction blocks in accordance with certain aspects of the invention can be initially assembled so as to be adapted for use with a first one of the two circuits provided by the four-wire circuit configuration or, alternatively, a second one of the two separate circuits provided by the four-wire configuration. If desired, a manufacturer may utilize a particular keying arrangement as corresponding to a specific selected circuit configuration. For example, the keyed connector set 136 shown in FIG. 4 for the receptacle junction block 130 may be used solely for situations where it is desired to utilize the first circuit of the two available circuit configurations resulting from the four-wire configuration. Correspondingly, the alternative keying arrangement provided by the male end connector sets 172 shown in FIG. 12 for the four-wire receptacle junction block 170 may be solely utilized only when it is desired to select the second available circuit from the four-wire configuration. Still further, the keyed configurations also provide for safety features. That is, with the use of corresponding keyed connector configurations on other electrical components of the modular electrical systems in accordance with the invention as described in subsequent paragraphs herein, proper polarization and proper circuit connections can be ensured. That is, with the keyed configurations, it would not be possible to accidentally connect a receptacle junction block in a "reverse" configuration relative to other electrical components of the modular electrical system, in a manner such that the male blade terminals 150 associated with the hot, neutral and ground incoming power wires are not mis-connected. Of course, it will be apparent to those skilled in the art that various other types of keying configurations for the connectors can be utilized, without departing from the novel concepts of the invention.

Figure 14:
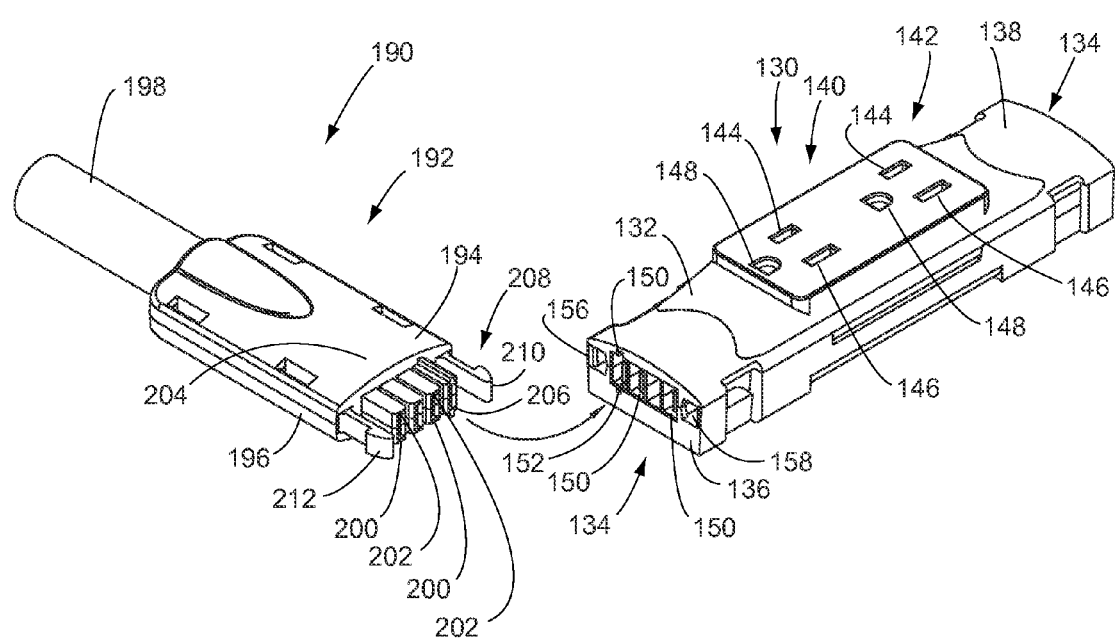
FIG. 14 is a perspective and partially exploded view, illustrating the relative positioning of the four-wire female receptacle junction block illustrated in FIG. 2 as it is being electrically connected to a male connector block of a separate element of the modular electrical system.

FIG. 14 is a perspective and partially exploded view showing an initial position for electrically and physically connecting a four-wire and two-way female jumper cable connector block 190 to the receptacle junction block 130. The connector block 190 will be described in greater detail in subsequent paragraphs herein. At this time, it is sufficient to describe the connector block 190 as including a housing 192 comprising a front housing cover 194 and rear housing cover 196. A cable 198 extends outwardly from the connector block 190, and may include a set of four wires (not shown) carrying the two separate circuits. As will be described in subsequent paragraphs herein, the four wires (not shown) within the cable 198 can be connected within the connector block 190 to a set of four female terminals 200. Each of the female terminals 200 is individually received within an individual connector 202. Four of the connectors 202 form a female end connector set 204. As shown in FIG. 14, the connectors 202 of the female end connector set 204 include a keyed connector 206 located as shown in FIG. 14. The keyed connector 206 is also even better shown with respect to its relative position in FIG. 15. When the cable assembly connector block 190 is brought into close proximity with the receptacle junction block 130, it is apparent from FIGS. 14 and 15 that the keyed connector 206, which matches the keying of the keyed connector 150, will mate with the keyed connector 150 so that the male blade terminal 151 within the keyed connector 150 will become electrically connected to the female terminal 200 within the keyed connector 206. The other connectors 151 of the receptacle junction block 190 will mate with the corresponding other three connectors 202 of the connector block 190. In this manner, an appropriate electrical circuit connection can be made.

Figure 15:
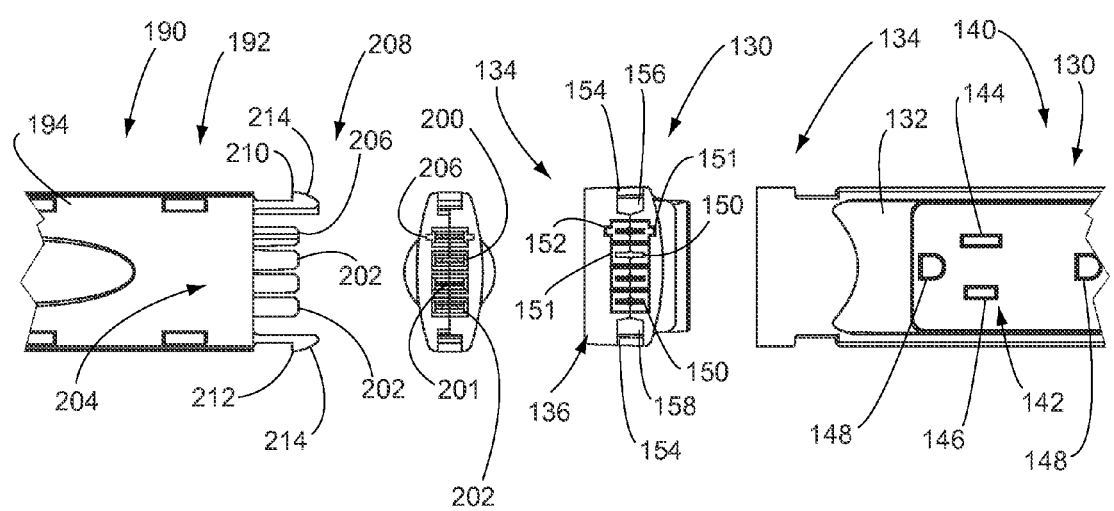
FIG. 15 is a combination illustration showing a side view and end view of the male connector block illustrated in FIG. 14, and a side-view and end-view of the four-wire female receptacle junction block also illustrated in FIG. 14.
Figures 20, 21:
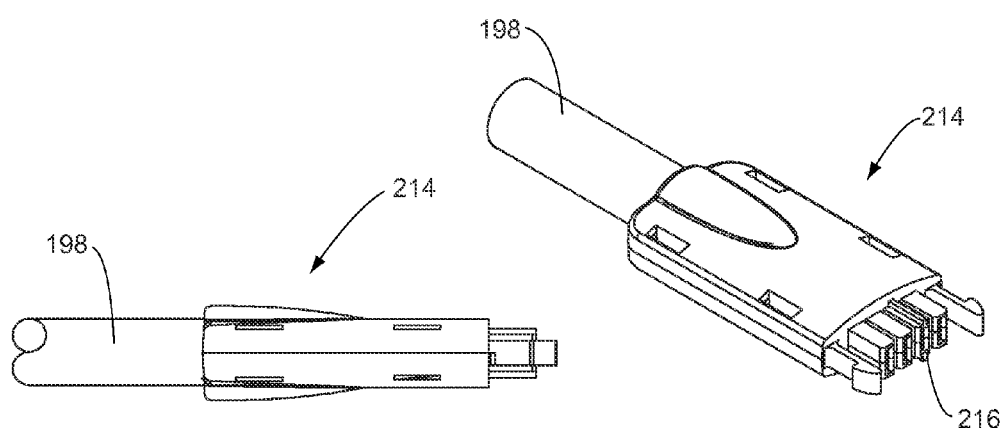
FIG. 20 is a planned view of an alternative four-wire male blade connector block similar to FIG. 16, but having a different keying arrangement.
FIG. 21 is a perspective view of the four-wire male blade connector block illustrated in FIG. 16.
Figures 22, 23:
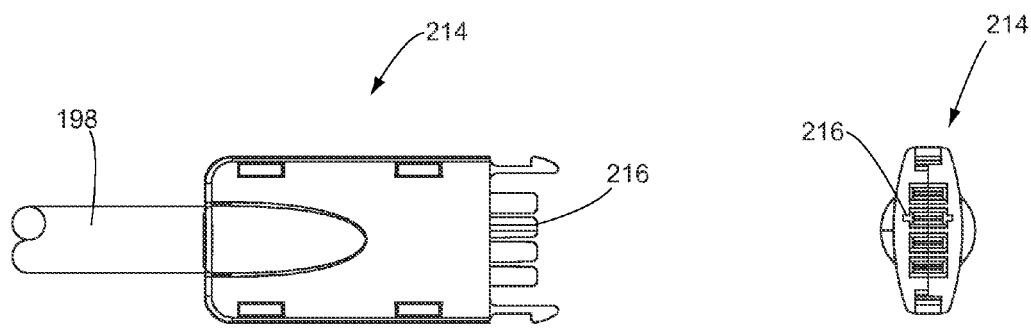
FIG. 22 is a front, elevation view of the four-wire male blade connector block illustrated in FIG. 20.
FIG. 23 is a right-side elevation view of the four-wire male blade connector block illustrated in FIG. 20, and showing the alternative keying arrangement.
Figures 24, 25:
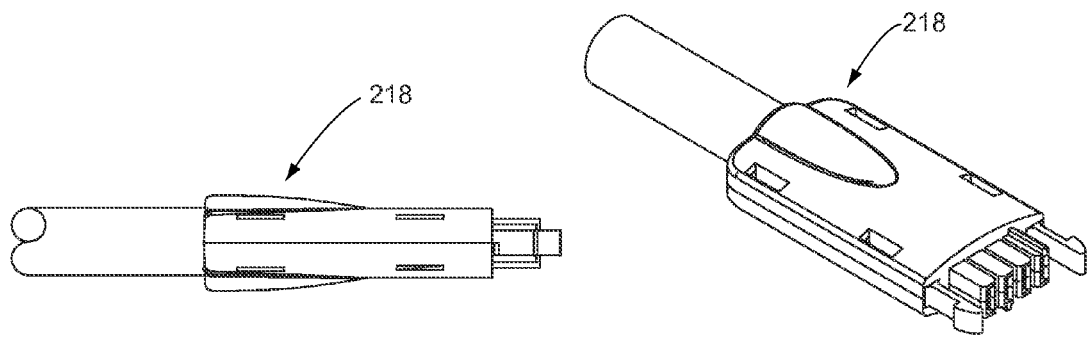
FIG. 24 is a planned view of a still further embodiment of a four-wire male blade connector block in accordance with the invention with a still further alternative keying arrangement.
FIG. 25 is a perspective view of the four-wire male blade connector block illustrated in FIG. 24.
Figures 26, 27:
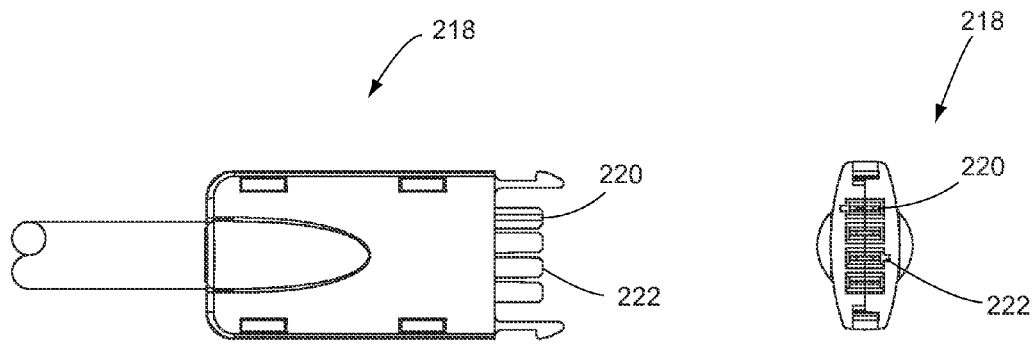
FIG. 26 is a front, elevation view of the four-wire male blade connector block illustrated in FIG. 24.
FIG. 27 is a right-side elevation view of the four-wire male blade connector block illustrated in FIG. 24, and showing the alternative keying arrangement.

For purposes of physically and releasably securing the connector block 190 to the receptacle junction block 130, the connector block 190 includes a pair of resilient connector tabs 208, shown in both FIGS. 14 and 15. The resilient connector tabs 208 include a first connector tab 210 and a second connector tab 212. Each of the resilient connector tabs 208 can be made of a rubber-like material so as to be resilient in nature. As shown particularly in FIG. 15, each of the connector tabs 208 includes a ramped surface 214 located at ends of the tabs 208. It is relatively apparent from FIGS. 14 and 15, the first resilient connector tab 210 is adapted to be received within the first tab slot 156 of the first male end connector set 136 of the receptacle junction block 130. Correspondingly, the second resilient connector tab 212 is adapted to be received within the second tab slot 158 of the receptacle junction block 130. The resilient tabs 208 are adapted to essentially be "snap fitted" into the tab slots 154. A more detailed description of this physical interconnection using the connector tabs 208 and tab slots 154 will be described in subsequent paragraphs herein. Also, the 208, four-wire female jumper cable assembly connector block 190 will be described in greater detail in subsequent paragraphs herein. FIGS. 14 and 15 have been included within the disclosure and described herein primarily for providing an initial understanding of the electrical and physical interconnection of the receptacle junction blocks to cable assembly connector blocks in accordance with the invention.

The prior description and the previously described drawings refer to the two-way, four-wire female jumper cable assembly connector block 190. As also previously described herein, the connector block 190 includes the capability of providing for a keying configuration with respect to its connectors. The junction block 190 and certain alternative embodiments (with respect to the keying arrangements) will now be described with respect to FIGS. 16-29. More specifically, the cable assembly connector block 190 previously briefly described herein is shown in greater detail in FIGS. 16-19. Although shown in greater detail, each of the elements of the connector block 190 were previously described herein with respect to FIGS. 14 and 15. That is, the connector block 190 includes a housing 192, comprising a front housing cover 194 and rear housing cover 196. The connector block 190 is connected in any suitable manner to a cable 198. The cable 198 includes a series of four wires (not shown) which extend through the cable 198 and into the connector block 190. The four wires (not shown) are each individually connected to a separate one of four female terminals 200. The female terminals 200 extend into corresponding and individual connectors 202. The four connectors 202 form a female end connector set

204. As shown particularly in FIGS. 17, 18 and 19, one of the connectors 202 of the connector set 204 is in the form of a keyed connector 206. In the particular embodiment of connector block 190, the keyed connector 206 is at the top of the female end connector set 204 as viewed in FIG. 19.

As also previously described herein, the connector block 190 includes a pair of resilient connector tabs 208. The resilient connector tabs 208 comprise a fust connector tab 210 and a second connector tab 212. The capability of using the resilient connector tabs 208 to releasably secure the connector block 190 to a receptacle junction block was previously described herein with respect to FIGS. 14 and 5.

An alternative embodiment of a two-way, four-wire female jumper cable assembly connector block is illustrated in FIGS. 20-23 as assembly connector block 214. The assembly connector block 214 is substantially identical to the assembly connector block 190 previously described herein with respect to FIGS. 16-19. However, instead of having a keyed connector 206 located at the top of the female end connector set 204, the assembly connector block 214 has a keyed connector 216 as one of the connectors 202 of the female end connector set 204. As particularly shown in FIGS. 21, 22 and 23, the keyed connector 216 is located immediately below and adjacent the upper connector 202 of the female end connector set 204.

Except for the use of the keyed connector 216 in place of the keyed connector 206, elements of connector block 214 correspond to elements of connector block 190. That is, the connector block 214 includes a housing 192 with a front housing cover 194 and rear housing cover 196. A cable 198 extends into the connector block 214 and connects to a series of female terminals 200. The female terminals 200 extend outwardly into the connectors 202 which form the female end connector set 204. Also identical to the connector block 290, the connector block 214 includes a pair of resilient connector tabs 208, comprising a first connector tab 210 and a second connector tab 212.

As previously described herein, the connector block 190 includes a keyed connector 206 which was positioned and adapted to appropriately mate with the receptacle junction block 130 having a corresponding keyed connector 152. In a similar manner, the connector block 214, as apparent from the prior description, will appropriately mate with a receptacle junction block having a keyed connector sized and position so as to mate with the keyed connection 216 of the connector block 214.

A third alternative embodiment of a connector block in accordance with the invention is illustrated in FIGS. 24-27 and identified as two-way, four-wire female jumper cable assembly connector block 218. As with the previously described connector block 214, the connector block 218 is substantially identical to the connector block 190 described in FIGS. 16-16. However, in stead of only including a single keyed connector 206 (as with the connector block 190), the connector block 218 includes a pair of keyed connectors. Specifically, the connector set 204 includes a first keyed connector 220 shown in FIG. 27 as located at the top of the four connectors 202 of the connector set 204. In addition, instead of having only a single keyed connector, the connector block 218 also include a second keyed connector 222. As illustrated primarily in FIG. 27, the second keyed connector 222 is located adjacent the lower most connector 202 in the female end connector set 204. Accordingly, the connector block 214 is adapted to mate with a receptacle junction block (or other elements of the modular electrical system which will be described in subsequent paragraphs herein) having a corresponding pair of mating keyed connectors.

With the exception of the paired keyed connectors 220 and 222, and as earlier mentioned, the connector block 218 is substantially identical to the connector blocks 190 and 214. More specifically, and with reference to FIGS. 24-27, the connector block 218 includes a housing 192 having a front housing cover 194 and rear housing cover 196. A cable 198 having four wires (not shown) is connection in any suitable manner to the connector block 218. The four wires (not shown) extend into and are connected to individual ones of a set of female terminals 200. The female terminals 200 are received within individual ones of connectors 202 forming a female end connector set 204. As also identical to the connector block 190 and the connector block 214, the connector block 218 includes a pair of resilient connector tabs 208, comprising a first connector tab 210 and a second connector tab 212. The connector tabs 208 are utilized to releasably secure the connector block 214 to an appropriate receptacle junction block or other electrical element of the modular electrical system.

Figure 28:
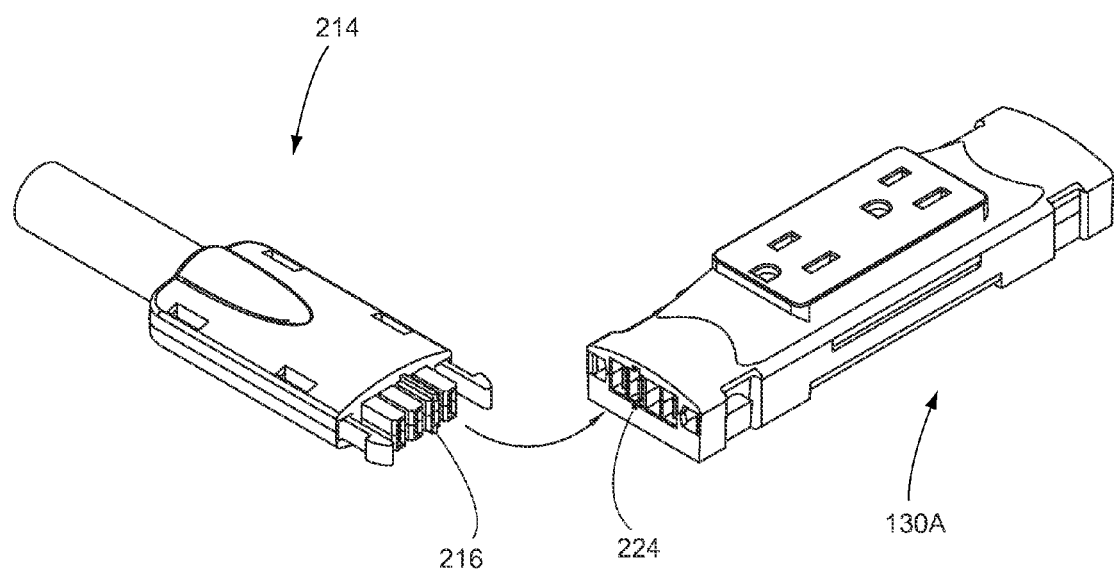
FIG. 28 is a partially exploded and perspective view similar to FIG. 14, and showing the relative positioning of the four-wire male blade connector block and the four-wire female receptacle junction block as the two elements are connected together.
Figure 29:
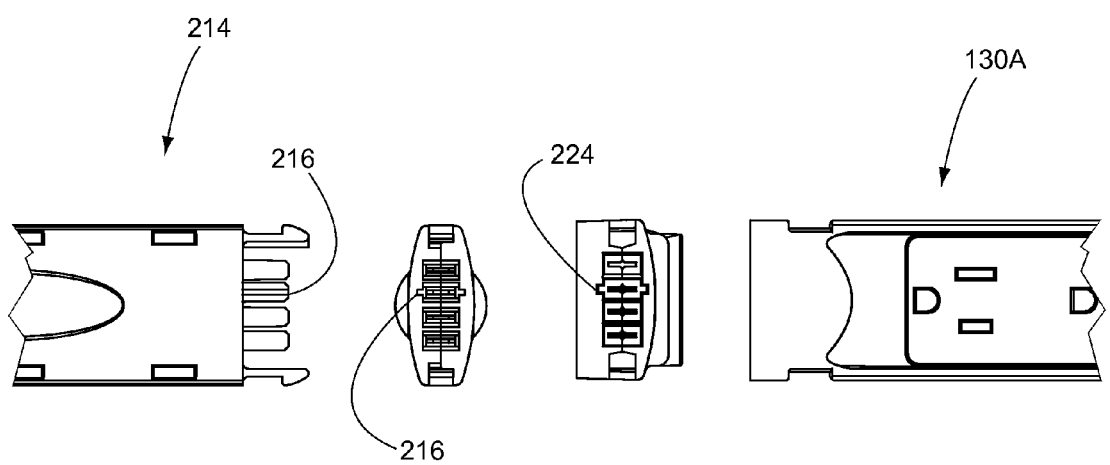
FIG. 29 is a combination illustration, showing elevation and end views of the four-wire male blade connector block shown in FIG. 28, and end and elevation views of the four-wire female receptacle junction block, also shown in FIG. 28, and further showing how the keying arrangements for the two elements match together.

FIG. 28 illustrates an initial position for connection of the assembly connector block 214 to a receptacle junction block 130A. The illustration of FIG. 28 is substantially identically to the illustration of FIG. 14. However, instead of using the connector block 190 and receptacle junction block 130, FIG. 28 illustrates an initial position for connecting connector block 214 and receptacle block 130A. The receptacle junction block 130A is substantially identical to the previously described receptacle junction block 130, with one exception. Instead of including a keyed connector 152 as shown in FIG. 14, the receptacle junction block 130A includes a keyed connector 224 which is positioned differently from the keyed connector 152 and is further positioned so as to appropriately mate with the keyed connector 216 of the connector block 214. In a similar manner, FIG. 29 consists of a drawing substantially identical to FIG. 14. That is, FIG. 29 is a combination illustration showing end and front elevation views of the connector block 214 and the receptacle junction block 130A shown in FIG. 28. In this particular instance, FIG. 29 clearly shows the relative positioning of the keyed connector 216 of the connector block 214 and the keyed connector 224 of the receptacle junction block 130A.

Figure 30:
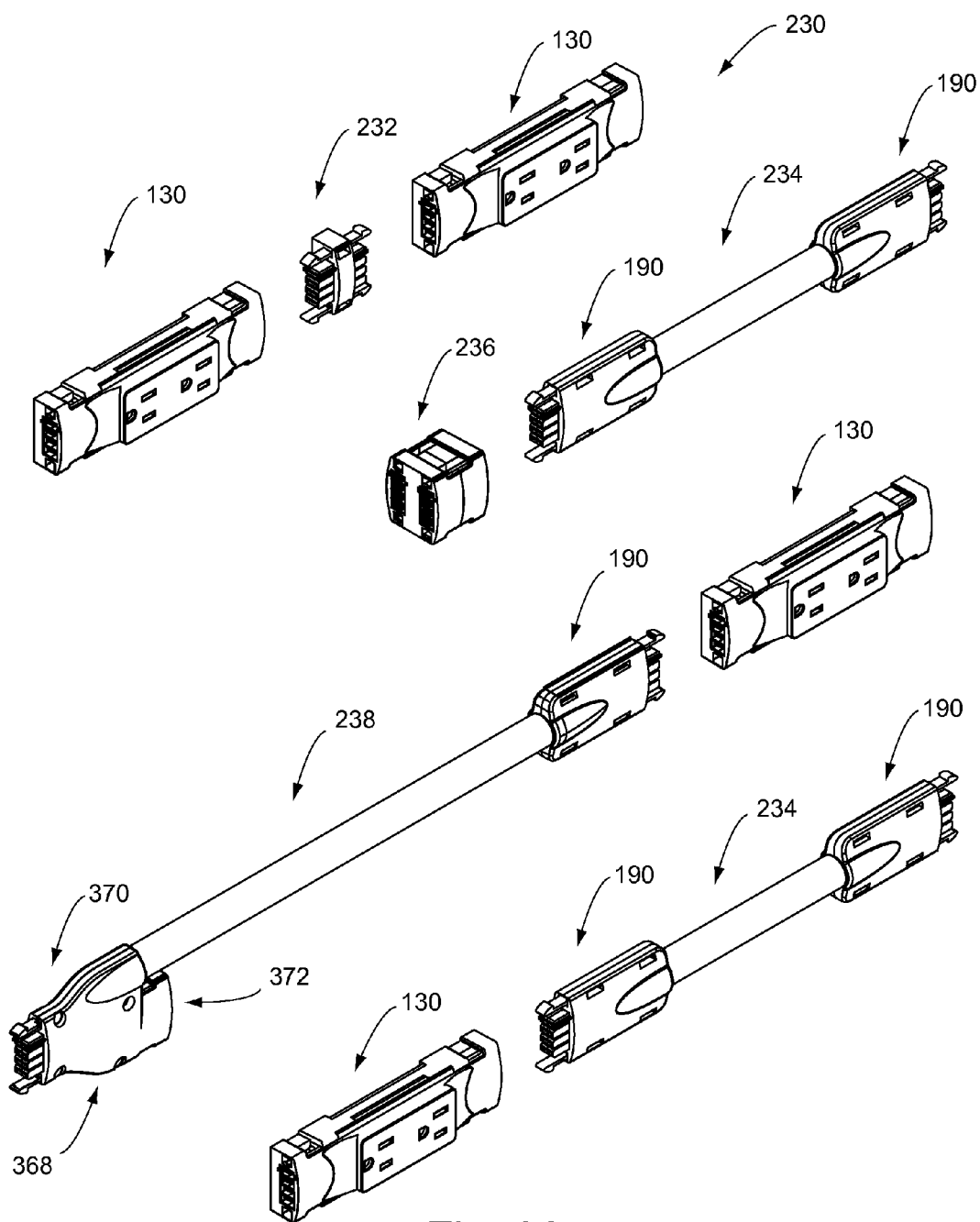
FIG. 30 is a composite illustration showing a number of elements which may be utilized with the modular electrical system in accordance with the invention, with the elements including.

In the prior description, certain electrical components which may be associated with the modular electrical system 110 illustrated in FIG. 1 have been described. These components have included four-wire receptacle junction blocks, including receptacle junction blocks 130, 160 and 170. In addition, two-way, four-wire female jumper cable assembly connector blocks have also been described, including connector blocks 190, 214 and 218. The following paragraphs will describe certain of the receptacle junction blocks and connector blocks in greater detail, and will also describe other electrical components of modular electrical systems in accordance with the invention. All of the components described herein may be utilized in the modular electrical system 110 previously shown with the rearrangeable wall system 106 in FIG. 1. As an example embodiment of a set of electrical components which may be utilized to form a modular electrical system in accordance with the invention, FIG. 30 illustrates, in combination, various electrical elements which are described as forming a modular electrical system component set 230. For purposes of brevity in description, the connector set 230 will be described herein as either the "connector set 230" or the "modular electrical system 230." In any event, the modular electrical system 230 will be described herein primarily with respect to use as a four-wire electrical system, providing for two separate circuits with a common neutral and a common ground. Also, for purposes of describing a specific embodiment in detail, the individual components of the modular electrical system 230 will be described as having specific connector blocks or end connectors which utilize either male blade terminals or female terminals. However, it should be emphasized that other male/female terminal arrangements may be utilized, without departing from the principal of the invention. Also, a number of the principal concepts of the invention may be utilized with systems other than four-wire systems, or other than with systems comprising two separate electrical circuits.

The modular electrical system in accordance with the invention provides for several advantages. First, as will be apparent from subsequent description herein, the electrical components of the component set 230 are of relatively smaller size, particularly with respect to width. Accordingly, the components of the modular electrical system 230 will fit in relatively narrower panels and desk systems having relatively smaller raceways. Also, as will be apparent from subsequent description herein, the modular electrical system 230 can be employed in a "back-to-back configuration," whereby electrical elements such as duplex receptacles may be made to face an either of two opposing directions. Still further, the electrical components described herein as receptacle junction blocks essentially comprise an integral combination of a junction block and a duplex receptacle. Junction blocks and receptacles in most known systems are formed as separate pieces. Accordingly, installation is facilitated in view of the relatively fewer parts required for panel and desk assemblies. In addition to the foregoing, although the particular module or electrical system 230 only includes four wires, the four wires still provide the capability of having two circuits. In addition, as will be apparent from description herein, assembly and installation is facilitated in view of having positive and releasable latching mechanisms. Also, as is apparent from previous description herein, connectors having male and female terminals can be keyed for correct polarization and circuitry. Also, if desired, the keying can be modified so as represent particular electrical elements which are "set up" for specific circuit configurations.

Turning to FIG. 30, the modular electrical system 230 is shown as having a number of electrical components. The electrical components include four-wire male receptacle junction blocks 130, which are described in substantial part previously herein with respect to FIGS. 2-5. In addition, the modular electrical system 230 includes a component characterized as a two-way, four-wire female connector 232. The two-way connector 232 will be described in greater detail in subsequent paragraphs herein. However, it can be stated at this time that the connector includes female terminals which are adapted to mate with male blade terminals of receptacle junction blocks, so as to provide for a direct connection between a pair of male receptacle junction blocks, if desired. Such a configuration is shown in somewhat of an exploded view at the top of FIG. 30.

In addition to the foregoing, the modular electrical system 230 includes a two-way, four-wire female jumper cable assembly 234. The particular cable assembly 234 illustrated in FIG. 30 includes, at its ends, a pair of two-way, four-wire female jumper cable assembly connector blocks 190. One of the connector blocks 190 was previously described herein in substantial detail with respect to FIGS. 16-19. Still further, the modular electrical system 230 includes an additional electrical component characterized as a four-way, four-wire male connector 236. As will described in greater detail herein, the four-way connector male connector 236 includes four connector sets with male blade terminals extending therethrough. Accordingly, and as shown in somewhat of an exploded view in FIG. 30, the four-way male connector 236 is adapted to electrically mate with, for example, female terminals of a connector block 190 associate with a two-way female jumper cable assembly 234.

In addition to the foregoing, the modular electrical system 230 further includes what can be characterized as a three-way, four-wire jumper cable assembly 238. As will be described in subsequent paragraphs herein, the jumper cable assembly 238 includes a pair of female end connector sets, along with a single male end connector set. The connector blocks and associated connector sets incorporated within the three-way jumper cable assembly 238 will be described in subsequent paragraphs herein. As illustrated in somewhat of an explode view in FIG. 30, one of the female cable assembly connector blocks associated with the three-way jumper cable assembly 238 can be electrically connected to a male end connector set of a receptacle junction block 130.

The electrical components of the modular electrical system 230 in accordance with the invention as shown in FIG. 30 represent only one embodiment of a component set 230 in accordance with the invention. However, as will be apparent from subsequent description herein, a substantial number of electrical configurations can be provided by the relatively small number of electrical components associated with the component set 230. It is this capability of having a reduction in the number of separate electrical components which forms a basis for certain concepts of the invention. In this regard, receptacle junction blocks and two-way, four-wire female jumper cable assembly connector blocks have been described in substantial detail in previous paragraphs herein. The following paragraphs in this disclosure will describe additional detail with regard to the internal structure and components of the receptacle junction blocks and the two-way jumper cable assembly connector blocks. Also, the following paragraphs will describe in greater detail the following components: the two-way, four-wire female connector 232; the two-way, four-wire female jumper cable assembly 234; the four-way, four-wire male connector 236; and the three-way, four-wire jumper cable assembly 238.

For purposes of describing the interior and internal components of receptacle junction blocks in accordance with the invention, the previously described four-wire male receptacle junction block 130 will be utilized. The exterior elements of the receptacle junction block 130 are illustrated in FIGS. 31-36. Certain of these illustrations are duplicates of previous illustrations and will not be described in any substantial detail at this time. For example, FIG. 31 substantially corresponds to FIG. 3, while FIG. 32 substantially corresponds to FIG. 5. FIG. 4 substantially corresponds to FIG. 33. Further, FIG. 39, illustrating a perspective view of a fully-assembled receptacle junction block 130 substantially corresponds to FIG. 2, but is shown rotated 180°. Accordingly, the male end connector set 134 which is visible in FIG. 39 corresponds to the second opposing male end connector set 138 which is not readily visible in FIG. 2. In addition, the first male end connector set 136 which is visible in FIG. 2, is not visible in FIG. 39.

The drawing set of FIGS. 31-36 also include a view illustrated as FIG. 34, which corresponds to a right-end, elevation view of the receptacle junction block 130. In this view, the details of the second opposing male end connector set 138 are clearly visible. In addition, FIG. 36 is a rear, elevation view of the receptacle junction block 130. As shown in FIG. 36, the receptacle junction block 130 includes connection sections 240 which may be utilized to the receptacle junction block 130 to structural elements of a raceway, or to other elements of a modular electrical system in accordance with the invention, so as to provide for a "back-to-back" configuration. As with the description and illustrations of the receptacle junction block 130 in prior drawings, FIGS. 31-36 and 39 show identical elements. For example, these illustrations show the receptacle junction block 130 as having a central housing 132 with male end connector sets 134 comprising a first male end connector set 136 and second opposing male end connector set 138. A duplex receptacle set 140 is provided, with a pair of electrical outlet receptacles 142. Each outlet receptacle 142 includes a hot terminal outlet 144, neutral terminal outlet 146 and ground terminal outlet 148. Each of the male end connector sets 134 includes a set of four connectors 151, with a key connector 152. Male blade terminals 150, comprising four in number, extend into the individual connectors 151 of the connector sets 134. The receptacle junction block 130 also includes tab slots 154 comprising a first tab slot 156 and second tab slot 158.

As previously described herein, the receptacle junction block 130 can provide for a four-wire configuration, so as to provide two separate circuits with a common ground and a common neutral. The interior configuration of the receptacle junction block 130 for serving these purposes will now be described with respect to FIGS. 37-41. With reference first to FIG. 37, the receptacle junction block 130 is shown in an exploded view. Details regarding the exterior portions of the receptacle junction block 130 will not be described at this time, since such components have been described in previous paragraphs herein. The receptacle junction block 130 includes a central housing 132 which is shown in FIG. 37 as comprising a front central housing 242 and a back central housing 244. The central housings 242, 244 can be connected by any suitable means, such as through the use of the tabs 243 on the back central housing 244 and the tab slots 245 on the front central housing 242. The tabs 243 are adapted to releasably engage the tab slots 245.

The receptacle junction block 130 includes a series of four buss bars 246. As will described in greater detail herein, the specific physical configuration of the buss bars 246 will differ, depending upon whether the receptacle junction block 130 is configured for use with the first circuit or, alternatively, the second circuit. For purposes of description, the specific buss bar configuration illustrated in FIG. 37 will be characterized as the buss bar configuration which provides for power to be supplied to the electrical outlet receptacles 142 through the first circuit. The buss bars 246 are shown as including an elongated hot buss bar 248. Each of the buss bars 246 is metallic in nature and a pair of hot female terminals 250 comprising a first hot female terminal 252 and second hot female terminal 254. These female terminals 250 aligned with the hot terminal outlets 144 of the electrical outlet receptacles 142.

Figure 41A:
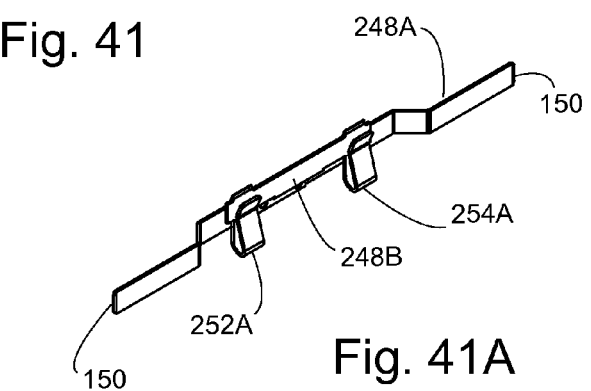

With further reference to FIG. 37, the buss bars 246 also include a pass-through buss bar 256. When the receptacle junction block 130 is set up to utilize the first circuit of the two circuits of the four-wire configuration, the pass-through buss bar 256 will be connected to the wires and terminals associated with the hot wire for the second circuit. Accordingly, the second circuit will not be made available through the electrical outlet receptacles 142 and, instead, will merely be passed through the receptacle junction block 130 so that, if desired, the second circuit can be utilized with other electrical components. In accordance with certain aspects of the invention, when it is desired to use the second circuit instead of the first circuit, the pass-through buss bar 256 will merely be repositioned into the buss bar slots (described subsequently herein) within the back central housing 244 which originally contained the hot buss bar 248. In the buss bar carrier slots vacated by the pass-through buss bar 256, a second circuit hot buss bar 248 will be positioned. This second circuit hot buss bar 248A is illustrated in FIG. 41 and FIG. 41A. As illustrated in these drawings, the hot buss bar 248A includes a bracket 248B which will extend the hot female terminals 252A and 254A into a position so that they are aligned with the hot terminal outlets 144 of the electrical outlet receptacles 142. In view of the foregoing, and therefore in accordance with certain aspects of the invention, the receptacle junction block 130 can be switched from providing power to the electrical outlet receptacles 142 from a first circuit of the four-wire configuration to a second circuit of the four-wire configuration merely by repositioning the pass-through buss bar 256 and substituting the hot buss bar 248 for the hot buss bar 248A. In the preferred embodiment, this procedure is actually performed during the assembly of the receptacle junction block 130.

In addition to the hot buss bars 248 and 248A, the receptacle junction block 130 may include a ground buss bar 248. The ground buss bar 258 includes ground terminals 260 comprising a first ground terminal 262 and a second ground terminal 264. The ground terminals 260 are positioned on the ground buss bar 258 so that they are in alignment with the ground terminal outlets 148 of the electrical outlet receptacles 142.

Still further, the receptacle junction block 130 also includes a neutral or common buss bar 266, as shown in FIGS. 37, 40 and 41. The neutral or common buss bar 266 is secured to a set of neutral female terminals 268, comprising a first neutral female terminal 270 and a second neutral female terminal 272. When the neutral buss bar 266 is appropriately positioned within the carrier slots of the back central housing 244, the neutral female 268 will be aligned with the neutral terminal outlets 146 of the electrical outlet receptacles 142.

While FIG. 37 shows the buss bars 246 in an exploded view relative to other components of the receptacle junction block 130, FIG. 40 shows the back central housing 244 with its attendant buss bar slots 274. The buss bar slots 274 comprise buss bar slots 247A, 274B, 274C and 274D. Each of the buss bars 246 is positioned and releasably secured within a corresponding one of the buss bar slots 274. The front central housing 242 will also have appropriate elements so as to mate with the slots 274 and appropriately secure the buss bars 246 therewithin.

As earlier described, the receptacle junction block 130 can have its buss bars 46 configured so as to provide for power from the first circuit to be supplied to the electrical outlet receptacles 142 or, alternatively, power from the second circuit to be supplied to the outlet receptacles 142. FIG. 40 illustrates the use of the buss bars 246 so as to provide for power to the electrical outlet receptacles 142 from the first circuit. Specifically, the configuration shown in FIG. 40 includes hot buss bar 248 and pass-through buss bar 256 and the particular configuration shown therein. In contrast, FIG. 41 illustrates the configuration of buss bars 246 when it is desired to provide power to the electrical outlet receptacles 142 from the second circuit. Specifically, FIG. 41 illustrates the use of the hot buss bar 248A, having a first hot female terminal 252, and a second hot female terminal 254A positioned as shown. Also, FIG. 41 illustrates the pass-through buss bar 256 as being in a different buss bar slot 274 than where it is positioned in FIG. 40. FIG. 41A is a perspective view of the configuration of the hot buss bar 248A.

As previously described herein, particularly with respect to FIGS. 14 and 15, the receptacle junction block 130 cannot be releasably secured to a female jumper cable assembly connector block 190. While the connection arrangement is somewhat shown in FIGS. 14 and 15, a more detailed set of illustrations is shown in FIGS. 42, 43 and 44. Therein, sectional views are shown of the part of the receptacle junction block 130 which can be releasably interconnected with part of the assembly connector block 190. Specifically, and as previously described herein, the receptacle junction block 130 includes tab slots 154 comprising a first tab slot 156 and second tab slot 158. Correspondingly, the connector block 190 includes a first connector tab 210 and a second connector tab 212, each tab being resilient. Each of the tabs 210 and 212 include a slanted front surface 211 which, because of the resilient nature of the tabs 208, have the capability of flexing. FIG. 42 shows an initial position of the receptacle junction block 130 and the female cable assembly connector block 190. As the components 130 and 190 are moved closer together, the slanted surfaces 211 of the tabs 210, 212 abut edges of the tab slots 154, and are bent inwardly relative thereto. Connector tabs 210, 212 are moved further into the receptacle junction block 130, the slanted surfaces 211 move forwardly a sufficient distance so that they can flex outwardly through apertures 213 formed within the sides of the tab slots 156, 158. This configuration is shown in FIG. 44, while the flex configuration is shown in FIG. 43. With the connector tabs 210, 212 positioned as shown in FIG. 44, the receptacle junction block 130 is releasably secured with the connector block 190. That is, the two electrical elements cannot really be "pulled apart." Instead, to disconnect the junction block 130 and connector block 190, inward pressure must be exerted on both of the slanted surfaces 211 (that is, inwardly toward the center of the electrical components), so that surfaces 211 are removed from within the apertures 213. This configuration is again shown in FIG. 43. In this configuration, outwardly directed forces can then release the connector block 190 from the junction block 134. In accordance with the foregoing, the electrical components 130, 190 comprise means for releasably securing the components together, with the capability of securing the components together and releasing the components from each other without the need of tools or the like.

Additional details will now be described with respect to various embodiments of two-way, four-wire female jumper cable assemblies in accordance with the invention. FIGS. 45-50 illustrate the two-way, four-wire female jumper cable assembly 234 previously shown in FIG. 30. As illustrated in FIGS. 45-50, the two-way jumper cable assembly 234 includes a pair of two-way, four-wire female jumper cable assembly connector blocks 190 as previously described with respect to FIGS. 16-19. In view of the prior description, the connector blocks 190 will not be described in particular detail herein. Suffice it to say that the jumper cable assembly 234 includes a connector block 190 at each of its opposing ends. As previously described, each connector block 190 includes a housing 192, comprising a front housing cover 194 and rear housing cover 196. A cable 198 which incorporates the four wires (not shown) for the four-wire configuration extends between the connector blocks 190 and is suitably connected by any conventional manner to each of the connector blocks 190. Each connector block 190 includes a female end connector set 204 comprising a set of four connectors 202. Female terminals 200 extend into each of the connectors 202 and are connected to the wires (not shown) which extend through the cable 198. The connectors 202 include a keyed connector 206. Each connector block 190 also includes a pair of resilient connector tabs 208, comprising a first connector tab 210 and a second connector tab 212. The structure and use of these connector tabs were previously described herein. In the particular embodiment of the female jumper cable assembly 234 illustrated in FIGS. 45-50, the cable 198 is shown as being constructed of a plastic or similar material, such as PVC material.

A second, alternative embodiment of a two-way, four-wire female jumper cable assembly is illustrated in FIGS. 51-54 as jumper cable assembly 276. As with the jumper cable assembly 234, the jumper cable assembly 276 includes an opposing pair of connector blocks 190. In view of the substantial similarities with the cable assembly 234, like components in the jumper cable assembly 276 will not be described in any detail herein. Instead, it will be noted that the distinction between the female jumper cable assembly 234 and the female jumper cable assembly 276 resides with respect to the cabling. Specifically, the jumper cable assembly 234 includes a cable 198 which was previously described herein as comprising PVC or some other type of similar material. The jumper cable assembly 276 illustrated in FIGS. 51-54 includes a cable 278 which is shown as being constructed of a metallic conduit. With this type of configuration, it may be possible to actually provide for expansion of the jumper cable assembly 276.

A third embodiment of a two-way, four-wire female jumper cable assembly is illustrated as cable assembly 280 in FIGS. 55-60. As with the cable assembly 276, the cable assembly 280 is substantially identical to the previously described female jumper cable assembly 234. That is, the cable assembly 280 includes a pair of connector blocks 190, corresponding to the connector blocks 190 associated with cable assembly 234. However, instead of utilizing a cable 198, the cable assembly 280 utilizes a cable 282 which is shown in FIGS. 55-60 as comprising wire mesh.

FIGS. 61-66 illustrate a still further embodiment of a two-way jumper cable assembly in accordance with the invention. The jumper cable assembly is shown as assembly 284. As with the jumper cable assembly 234, the jumper cable assembly 284 includes a female jumper cable assembly connector block 190 connected to one end of a cable 198. However, unlike the other embodiments of jumper cable assemblies previously described herein, the jumper cable assembly 284 includes, at its opposing end, a male jumper cable assembly connector block 286. The male jumper cable assembly connector block 286 includes male blade connectors so that the connector block 286 can be electrically connected to a female connector block, such as the female connector block 190. The male jumper cable assembly connector block 286 has some substantial similarities to the end connector sections of the receptacle junction blocks previously described herein, including receptacle junction block 130. That is, the male jumper cable assembly connector block 286 includes a housing 288, comprising a front housing cover 290 and a rear housing cover 292. Male blade terminals 294 which are connected to wires (not shown) within the cable 198 extend outwardly into connectors 296 of a male end connector set 298. The connectors 296 may include a keyed connector 300, as primarily shown in FIG. 64. It should be noted that the jumper cable assembly 284 is not shown in the individual electrical components illustrated in FIG. 30 for the particular modular electrical system being described herein. However, jumper cable connector assembly 284 makes apparent that various types of configurations of male and female connector blocks may be utilized with electrical components in accordance with the invention, without departing from the spirit and scope of a number of the novel concepts of the invention.

FIG. 67 is a perspective view of the female jumper cable assembly 234 previously illustrated in FIGS. 45-50. Correspondingly, FIG. 68 illustrates the embodiment of the female jumper cable assembly 276 previously described with respect to FIGS. 51-54. FIG. 69 illustrates the embodiment of a two-way jumper cable assembly 284 previously described with respect to FIGS. 61-66.

FIG. 70 is a partially exploded view of the two-way, four-wire female jumper cable assembly 234 previously described herein. FIG. 70 includes the cable 198, along with each of the connector blocks 190. As shown in FIG. 70, extending through the cable 198 is an internal cable 302. The internal cable 302 holds the sheathed set of four wires 304. As further shown in FIG. 70, each of the sheathed wires 304 is connected to an individual female terminal 200. Other components of the cable assembly 234 illustrated in FIG. 70 have been previously described herein.

FIG. 71 is an exploded view of the previously described two-way jumper cable assembly 284. The jumper cable assembly 284 was previously described with respect to FIGS. 61-66. As referenced with respect to those drawings, the jumper cable assembly 284 includes a female jumper cable assembly connector block 190, as well as a male jumper cable assembly connector block 286. The connector block 190 and the connector block 286 each have components previously described herein. FIG. 71 illustrates, in a manner similar to FIG. 70, that the jumper cable assembly 284 includes an internal cable 302 running through the cable 198. The internal cable 302 carries a set of sheathed wires 304, comprising the four-wire configuration. In the connector block 190, the sheathed wires 304 are connected to a set of female terminals 200. In contrast, the sheathed wires 304 within the connector block 286 are electrically connected to a set of male blade terminals 294. FIGS. 72 and 73 show the manner in which the male jumper cable assembly connector block 286 may be electrically interconnected and releasably secured to a female connector block, such as a female jumper cable assembly connector block 190. As shown in FIGS. 72 and 73, if desired, the male jumper cable assembly connector block 286 of the jumper cable assembly 284 could be connected to the connector block 190 of, for example, the female jumper cable assembly 234. In this way, two two-way jumper cable assemblies may be connected directly together. As shown in FIG. 72, the connector tabs 210, 212 are preferably brought into alignment with connector tab slots (not shown) on the connector block 286. FIG. 73 shows a final position of the connector tabs 210, 212 with the connector block 286 secured to the connector block 190. FIGS. 72 and 73 also show the electrical mating of the male blade terminals 294 of the connector block 286 with the female terminals 200 of the connector block 190.

FIGS. 74-77 show the physical and releasable securing of the male connector block 286 to the female connector block 190 in greater detail, as well as showing greater detail with respect to the electrical interconnections. Specifically, FIG. 74 corresponds to a smaller version of FIG. 72, while FIG. 75 corresponds to a smaller version of FIG. 73. FIG. 76 is an enlarged view of a portion of connector blocks 286 and 190, showing the relative positioning of the first connector tab 210 to the connector block 286 when the connector blocks 286, 190 are to be physically secured together. FIG. 76 also shows the relative positioning of certain of the male blade terminals 294 with the female terminals 200 and female connectors 202. FIG. 77 illustrates a final, secured position with the connector block 286 mated to the connector block 190. In this position, the male blade terminals 294 are electrically interconnected to the female terminals 200, within the connectors 202.

FIGS. 78-81 are similar to FIGS. 74-77, but show somewhat greater detail with respect to the electrical and physical interconnections of the connector blocks 286 and 190. Specifically, FIG. 78 is substantially identical to FIG. 74, while FIG. 79 is substantially identical to FIG. 75. However, FIG. 80, unlike FIG. 76, is an enlarged view showing the entirety of the four male blade terminals 294 as they are aligned in position with the four female terminals 200 of the connector block 190. Correspondingly, the first connector tab 210 and the second connector tab 212 of the connector block 190 are appropriately aligned with connector tab slots (not shown) on the connector block 186. FIG. 81 illustrates a final secured position of the connector block 286 with the connector block 190. In this position, the tabs 210 and 212 are releasably secured to the connector block 286, while the male blade terminals 294 are electrically interconnected with the female terminals 200.

As earlier described with respect to FIG. 30, the modular electrical system component set 230 includes a two-way, four-wire female connector 232. The connector 232 is adapted to connect in line to other electrical components having end connectors utilizing male terminals. The two-way connector 232 is illustrated in FIGS. 82-89. With respect thereto, the two-way female connector 232 includes a housing 306, comprising a front housing cover 308 and rear housing cover 310. Connector tabs 312 extend outwardly from opposing sides of the connector 232. The connector tabs 312 include a pair of first tabs 314 and a pair of lower second tabs 316. The connector tabs 314, 316 function in exactly the same manner as the connector tabs 210, 212 previously described with respect to other components of the component set 230.

As further shown in FIGS. 82-89, the two-way connector 232 also includes a pair of opposing female end connector sets 318. Each female end connector set 318 comprises four connectors 324. The pair of connector sets 318 comprise a first female end connector set 320 and a second female end connector set 322. In accordance with the invention, and if desired, the end connector sets 318 may include keyed connectors, such as the keyed connectors 326 primarily illustrated in FIGS. 84 and 85. Extending through and received within the connectors 324 are sets of female terminals 328, as primarily shown in FIG. 88. The female terminals 328 are constructed in the same manner as other female terminals previously described herein with respect to other electrical components of the component set 230. With this two-way, four-wire female connector, numerous variations in electrical system configurations may be achieved, through interconnection of male end connectors with the two-way connector 232.

As also previously described herein, the component set 230 includes a four-way, four-wire male connector 236, also previously illustrated in FIG. 30. The details of the four-way connector 236 will now be described primarily with respect to FIGS. 90-95. As shown therein, the four-way connector 236 includes a housing 330. The housing 330 can be characterized as having a left-side housing 332 and right-side housing 334 (the designations of left and right are arbitrary and do not have any specific meaning). In addition, the four-way connector includes a set of four connector tab slots 336 located on the left-side housing 332 and four corresponding connector tab slots 336 located on the right-side housing 334. The connector tab slots 336 function so as to releasably receive connector tabs, such as the connector tabs 210, 212 previously described herein with respect to other electrical components of the component set 230. These connector tab slots can be substantially similar in structure and function to the tab slots 154 previously described herein.

As further shown in FIGS. 90-95, the four-way connector 236 includes four male connector sets 338, two of which are located on each of the two opposing sides of the connector 236. The male connector sets 338 each include four male connectors 340. If desired, one or more of the male connectors 340 can be keyed, such as the keyed connectors 342 illustrated primarily in FIGS. 92 and 93. Male blade terminals 344 can be extended into and received through the male connector sets 338. In this manner, the four-way connector 236 provides a means for connecting (physically and electrically) with up to four female connector sets. Also, it is apparent from the structure of the four-way connector 236 that it may be used for purposes of connecting various elements of the component set 230 in a "back-to-back" relationship.

Although not shown in FIG. 30, it is also possible to utilize other types of four-way connectors in accordance with the invention. For example, FIGS. 100 and 101 illustrate what can be characterized as a four-way, four-wire female connector 346. Unlike the four-way connector 236, which included male terminals, the four-way connector 346 includes female terminals. More specifically, and with reference to FIGS. 100 and 101, the four-way female connector 346 includes a housing 348 comprising a left-side housing cover 350 and a right-side housing cover 352. Connector tab slots 354 are located in each of the four corners on each housing cover 350, 352. The connector 346 also includes four female connector sets 356, with each connector set 356 having four female connectors 358. If desired, one or more of the female connectors 358 can be keyed, such as the keyed connectors 360 illustrated in the drawings. Extending into and received by the female connectors 358 are a set of female terminals 362. In a preferred embodiment, the female connectors 362 may be provided by the use of H-terminal assemblies 364, as primarily shown in FIGS. 96-100. The H-terminal assemblies 364 would comprise four in number for a four-wire system. As primarily shown in FIGS. 96-99, each H-terminal assembly 364 includes a cross bar connector 366. The cross bar connector 366 connects opposing ones of pairs of female terminals 362. The structure and general configuration of the H-terminal assemblies 364 are particularly conducive to use with electrical components, such as the four-way connector 346.

As also previously described with respect to FIG. 30, the modular electrical system components set 230 includes a three-way, four-wire male/female jumper cable assembly 238. The jumper cable assembly will now be described with respect primarily to FIGS. 102-105. A number of the components of the three-way jumper cable assembly 238 are similar to other components previously described herein. Such components will, when possible, be like numbered and will not be described in substantial detail. More specifically, the jumper cable assembly 238 is adapted to provide for two female end connectors and one male end connector. With reference to FIGS. 102-105, the jumper cable assembly 238 includes a plastic or a similar cable 198 through which a set of four wires (not shown) extend. Connected in any suitable manner to one end of the jumper cable 198 is a female jumper cable assembly connector block 190. The connector block 190 has been previously described herein with respect to other electrical components of the component set 230. At the opposing end of the jumper cable 198, and connected in any suitable manner thereto, is a three-way, four-wire male/female jumper cable assembly connector block 368. The jumper cable assembly connector block 368 includes means for providing both female terminal connections and male terminal connections. With reference to the drawings, the male/female jumper cable assembly connector block 368 includes a female end connector portion 370 and a male end connector portion 372. The female end connector portion 370 is similar in structure and function to the female jumper cable assembly connector block 190. Correspondingly, the male end connector portion 372 is similar in structure and function to the male end connection configurations of the receptacle junction blocks 130.

More specifically, the male/female junction cable assemble connector block 368 includes a housing 374. The housing 374 comprises a front housing cover 376 and rear housing cover 378. With reference to the female end connector portion 370, the portion 370 includes a female end connector set 380 having a series of four female connectors 382. One or more of the connectors 382 may be a keyed connector 384, having structure and function as previously described herein. Extending into each of the female connectors 382 and connected internal within the female end connection portion 370 to the wires (not shown) extending through the jumper cable 198 are a set of four female terminals 386, each female terminal 386 being received within one of the connectors 382. Each female terminal 386 is connected to one of the four wires (not shown) of the four-wire configuration passing through the jumper cable 198.

Turning to the male end connector portion 372, the male end connector portion 372 is primarily shown in FIGS. 103, 103C and 105. With reference thereto, the male end connector portion 372 includes a male end connector set 388. The male end connector set 388 includes a set of four male connectors 390, substantially identical to male connectors previously described herein with respect to other components of the component set 230. One or more of the male connectors 390 may be a keyed connector, such as the keyed connector 392 illustrated in FIG. 103C. Male blade terminals 394, electrically connected to the wires (not shown) running through the jumper cable 198 extend into and are received within individual ones of the male connectors 390. In this manner, the connector portion 372 provides a male terminal set for electrically connecting to female terminal sets. In additional to the aforementioned elements, the female end connector portion 370 can include a set of connector tabs 396, corresponding in structure and function to the connector tabs previously described herein with respect to other elements of the component set 230. In addition, the male end connector portion 372 can include a pair of connector tab slots 398 adapted to receive connector tabs associated with female end connectors of other electrical components of the component set 230.

In addition to the three-way, four-wire male/female jumper cable assembly 238 illustrated in FIGS. 102-105, other, slightly modified embodiments of three-way jumper cable assemblies may be utilized. For example, FIGS. 106-109 illustrate a three-way jumper cable assembly 400. The jumper cable assembly 400 is identical to the jumper cable assembly 238, with the exception that the jumper cable assembly 400 utilizes a wire mesh cable 402, instead of a plastic or a similar jumper cable 198. In this regard, FIG. 110 illustrates a perspective view of the jumper cable assembly 238, while FIG. 111 illustrates a perspective view of the three-way jumper cable connector assembly 400. For purposes of the full description, FIG. 112 is another perspective view of the three-way jumper cable connector assembly 238, but rotated 180° relative to the perspective view of FIG. 110.

FIGS. 113 and 114 illustrate special views showing the interiors of the connector block 190 and the connector block 368 of the jumper cable assembly 238. As shown in FIG. 113, the connector block 368 includes the connector portion 370 having a set of female terminals 386 connected to the four sheathed wires 304. Correspondingly, the four sheathed wires 304 are also connected to the male blade terminals 394 which extend outwardly through the male connectors 390 of the male end connector portion 372. Correspondingly, FIG. 114 illustrates the interior of the connector block 190, which has previously been described herein with respect to other components of the component set 230. Specifically, FIG. 114 illustrates the set of sheathed wires 304 as being connected to individual ones of the female terminals 200.

FIG. 115 illustrates an initial position for interconnecting a connector block 190 of a two-way connector 234 to the male end connector portion 372 of the connector block 368 of the three-wire connector 238. FIG. 116 is similar to FIG. 115, but shows the three-way connector 238 fully connected to the two-way connector 234. FIG. 117 is a perspective and partially exploded view of the three-way connector 400, having the wire mesh cable 402. FIG. 117 shows the interiors of the jumper cable assembly connector block 368 and the jumper cable assembly connector block 190. The remaining elements shown in FIG. 117 have been previously described herein.

The principles of the invention will now be described with respect to wire management systems as illustrated in FIGS. 118-156. FIGS. 118-121 illustrate what can be characterized as an underside main wire management element, comprising various components which will be common to differing wire management elements described herein in accordance with the invention. Specifically with reference to main wire management element 500, the wire management element 500 is shown as incorporating a main base plate 506, having the configuration illustrated in perspective view in FIG. 133. Secured to the main base plate 506 through snap fits or any other suitable means is a right-end plate 508 (also shown in FIG. 134) and a left-end plate 512 (also shown in FIG. 135). The right-end plate 508 is illustrated in FIG. 120B as having a pair of slots 510, comprising upper and lower slots. Correspondingly, the left-end plate 512 includes a pair of upper and lower slots 514.

In addition to the foregoing, the main wire management element 500 is further shown as including a wire cradle and holder 528 substantially centered in the main base plate 506 and connected thereto by any suitable means. The wire cradle and holder 528 is also illustrated in FIG. 139.

Still further, the wire management element 500 includes as an example, a pair of receptacle junction block cradles 518. The junction block cradles 518 are adapted to releaseably secure receptacle junction blocks (such as those previously described herein) to the wire management element 500. To assist in the foregoing, block brackets 520 (also shown in FIG. 137) are connected to the sides of the receptacle junction block cradles 518.

In addition to the foregoing, the wire management element 500 illustrates the use of connector brackets 522, with a pair of connector brackets 522 being located at opposing ends of the main base plate 506. In the particular embodiment the wire management element 500 shown in the drawings, a connector blank 524 is inserted into the slots of each of the connector brackets 522. Such a blank is illustrated in FIG. 138, as well as the connector bracket 522. If desired, as an example, the connector blank 524 could be substituted for a voice/data connector 526 (also shown in FIG. 138) or other type of connector configuration. It should be emphasized that the underside main wire management element 500 illustrated in the drawings is merely an example embodiment of a wire management system in accordance with the invention. Other types of components may be connected to and incorporated with the main base plate 506. The following paragraphs describe various other configurations. However, it should be made apparent that wire management systems in accordance with the invention are not limited to the particular embodiments described herein. That is, other embodiments may be utilized, without departing from the spirit and scope of the novel concepts of the invention.

The underside main wire management element 500 previously described herein is adapted for use on the underside of a work surface or the like. In contrast, FIGS. 122-125 and FIG. 131 illustrate a top surface main wire management element 502. The top surface wire management element 502 is adapted to be positioned on the top of a work surface or the like. As with the wire management element 500, the wire management element 502 includes a number of functional elements for purposes of providing wire management. As with the wire management element 500, the wire management element 502 includes the main base plate 506, with a right-end plate 508 and left-end plate 512. Also included is a wire cradle and holder 528. In addition, a pair of connector brackets 522 and connector blanks 524 are also incorporated within the wire management element 502. However, in place of the receptacle junction block cradle 518 previously described with respect to the wire management element 500, the wire management element 502 includes a pair of somewhat modified receptacle junction block cradles 518A. The receptacle junction block cradles 518A are somewhat different from the cradles 518, in that the cradles 518 include connection brackets 536 which are located at the top of the cradles 518. This is for purposes of securing the cradles 518 to the underside of a work surface or the like. In contrast, the connector brackets 536 of the receptacle junction block cradles 518A, as shown in FIGS. 123, 124, 124A and 124B are located on the underside of the cradles 518A. This is for purposes of connection to the tops of work surfaces or the like.

FIGS. 126-129 and FIG. 132 illustrate a modified wire management element which could be characterized as a back-to-back wire management element 504. As shown therein, the back-to-back wire management element 504 includes a pair of opposing main base plates 506, which could be secured together, if desired, in any suitable manner. An illustration of the wire management element 504 in use on the top of a work surface is shown in FIG. 154.

As with the wire management element 502, the wire management element 504 as illustrated in the drawings as including a number of elements, although these elements are now in pairs. Specifically, the wire management element 504 includes a pair of main base plates 506, with a pair of right-end plates 508 and left-end plates 512. A pair of opposing wire cradles and holders 528 are also provided, along with pairs of receptacle junction block cradles 518. In addition, the drawings illustrate for the wire management element 504 two pairs of connector brackets 522, with each connector bracket including a connector blank 524.

Individual elements of the example wire management elements in accordance with the invention are illustrated in FIGS. 133-140. With reference thereto, FIG. 133 illustrates a perspective view of the main base plate 506. The main base plate 506 includes a back support 540, upper lip 542 and lower lip 544. FIG. 134 illustrates the right-end plate 508. As previously described, the end-plate 508 includes a pair of upper and lower slots 510. The slots are adapted to receive wires, cables or other electrical elements. FIG. 135 illustrates the left-end bracket 512, having upper and lower slots 514. FIG. 136 illustrates a pair of wire cradles 516. The wire cradles 516 each have an arcuate shape and are adapted to support various types of wires or other cables, and are connectable to the connecting ledge 546 of the base plate 506. FIG. 137 illustrates the receptacle junction block cradle 518, and the block bracket 520. The receptacle junction block cradle 518 has a shape shown in FIG. 137, and includes a lower horizontal support 534, a back support plate 538 and upper connector bracket 536. As previously described herein, the similar receptacle junction block cradle 518A includes the connector bracket 536 positioned below the lower support 534. It is this type of cradle which is utilized in the wire management elements 502 and 504.

As previously described herein, FIG. 138 illustrates the connector bracket 522 mountable to the base plate 506. The connector bracket 522 includes an open slot 548 into which various types of connectors may be inserted and connected to appropriate electrical wiring or cabling. In this regard, FIG. 138 also shows a connector blank 524 which may be utilized when the connector bracket 522 is not in use. Also shown in FIG. 138 is a voice/data duplex connector 526, which may be utilized to provide external connections to devices employing voice or data communications.

FIG. 139 illustrates a wire cradle and holder 528. The wire cradle and holder 528 is connectable to the base plate 506 and is adapted to support wires or cables from a modular electrical system. However, the cradle and holder 528 also provides for the capability to "loop around" excess wire or cable, if not in use. Still further, FIG. 140 illustrates a receptacle cradle 530. The receptacle cradle 530 is similar to the receptacle junction block cradle 518, but is specifically adapted for use to support receptacle blocks or the like.

FIG. 141 illustrates an initial assembly of a wire management element in accordance with the invention. As shown therein, a pair of receptacle block cradles 518 are positioned on top of a work surface 532, and mounted to the work surface through screws or other connecting means (not shown) extending through the lower supports 534. In this manner, it is shown that it may not be necessary to utilize the upper connector bracket 536, or a specialized configuration of the receptacle block cradle 518A. Instead, the upper connector bracket 536 can essentially be ignored, and the lower support 534 can be connected to the work surface 532, instead of connecting to the work surface through the upper connector brackets 536.

FIG. 142 illustrates the initial insertion of a modular electrical system into the receptacle junction block cradles 518. As shown in FIG. 142, the modular electrical system includes (with reference to elements previously described herein) a pair of receptacle junction blocks 130 and a 2-way jumper cable assembly 234 connecting the junction blocks 130 together. Extending from opposing ends of each of the receptacle junction blocks 130 is a further 2-way jumper cable assembly 234.

FIG. 143 is an enlarged view of a portion of FIG. 142, showing the connection of the block bracket 520 to the receptacle junction block cradle 518. FIG. 144 is another enlarged view similar to FIG. 143, but showing the block bracket 520 connected to the block cradle 518, and the initial positioning of one of the receptacle junction blocks 130 for securing to the block cradle 518. FIG. 145 is similar to FIGS. 143 and 144, but shows the modular electrical system assembled into the block cradle 518.

FIG. 146 shows a somewhat alternative embodiment of a wire management element in accordance with the invention, with the element comprising a base plate 506, to receptacle junction block cradles 518, to block brackets 520 and a set of wire cradles 516. FIG. 147 is similar to FIG. 146, which shows a wire management system as secured within the wire management element shown in FIG. 146. FIG. 148 is similar to FIG. 146, but shows a wire management element in accordance with the invention with the use of a receptacle junction block cradle 518 and a receptacle cradle 530. Also shown is a power receptacle block 550 secured within the receptacle cradle 530. The wire management element shown in FIG. 148 also includes a wire cradle and holder 528. FIG. 149 illustrates a wire management element similar to FIG. 147, but with a connector bracket 522 having an inserted voice/data connector 526. Also, in place of the wire cradles 516, the wire management element in FIG. 149 utilizes a wire cradle and holder 528.

FIG. 150 is a further illustration of a wire management element in accordance with the invention, utilizing four wire cradles 516, a connector bracket 522 and a pair of receptacle junction block cradles 518. FIG. 151 is similar to FIG. 150, but includes only two wire cradles 516 and further includes a rearrangement of the positioning of the connector bracket 522.

FIG. 152 shows the use of the base plate 506 and upper connector brackets 536 of a pair of receptacle junction blocks 518, as the same may be utilized to support the wire management element underneath the work surface. FIG. 153 illustrates another configuration of a wire management element in accordance with the invention, utilizing the modified receptacle junction block cradles 518A. Correspondingly, FIG. 154 illustrates the use of the back-to-back wire management element 504, with modified receptacle junction block cradles 518A, a wire cradle and holder 528 and a pair of connector brackets 522.

FIG. 155 illustrates a perspective view of a wire management element in accordance with the invention, with the initial position of a cover plate 552 which may be utilized with the wire management element. FIG. 156 illustrates the wire management element of FIG. 155 and a cover plate 552 in a fully assembled state.

It will be apparent to those skilled in the pertinent arts that still other embodiments of wire management systems in accordance with the invention can be designed. That is the principles of wire management systems in accordance with the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

The invention claimed is:

1. A wire management system for supporting electrical components at a work surface, said system comprising:
   an elongate base plate;
   at least one mounting bracket configured to couple said base plate to a work surface;
   a wire cradle mounted at said base plate and configured to support electrical wiring that is disposed along said base plate;
   a junction block cradle mounted at said base plate and configured to support a junction block assembly that is electrically coupled to the electrical wiring; and
   wherein said base plate comprises an elongate upper lip and an elongate lower lip extending substantially the entire length of said base plate and configured to be slidably engaged by at least one of said mounting bracket, said wire cradle, and said junction block cradle.

2. The wire management system of claim 1, further comprising at least one end plate coupled to an end of said base plate of said wire management assembly.

3. The wire management system of claim 2, wherein said at least one end plate defines a slot configured to receive a portion of the electrical wiring.

4. The wire management system of claim 3, wherein said at least one end plate comprises a snap-fit coupling for attaching to said base plate.

5. The wire management system of claim 1, wherein said wire cradle is configured to receive an excess length of the electrical wiring in a wrapped manner.

6. The wire management system of claim 1, wherein said base plate further comprises an elongate connecting ledge disposed between said upper and lower lips, and wherein said elongate connecting ledge is configured to be slidably engaged by at least one of said mounting bracket, said wire cradle, and said junction block cradle.

7. The wire management system of claim 1, further comprising a connector bracket configured to be slidably coupled to said base plate via engagement with said elongate upper lip and said elongate lower lip, said connector bracket defining an opening for receiving a voice/data duplex connector.

8. The wire management system of claim 1, wherein said junction block cradle comprises (i) a back support plate configured for slidably engaging said elongate upper lip and said elongate lower lip, and (ii) a lower horizontal support that projects outwardly from said back support plate, and that is configured for supporting the junction block assembly.

9. The wire management system of claim 8, wherein said junction block cradle comprises said mounting bracket, which projects outwardly from said back support plate and is spaced above said lower horizontal support, and wherein said mounting bracket is configured to couple said base plate to an underside of the work surface.

10. The wire management system of claim 1, wherein said junction block cradle comprises said mounting bracket, which is configured to couple said base plate to an underside of the work surface.

11. The wire management system of claim 1, wherein said mounting bracket is configured to couple said base plate to an upper side of the work surface.

12. A wire management system for supporting electrical components at a work surface, said system comprising:
  an elongate base plate having two opposite ends, upper and lower edge portions extending between said opposite ends, and an engaging element comprising at least one chosen from (i) an elongate upper lip along said upper edge portion of said base plate, (ii) an elongate lower lip along said lower edge portion of said base plate, and (iii) an elongate connecting ledge along said base plate between said upper and lower edge portions;
  at least two mounting brackets configured to couple said base plate to a work surface;
  a wire cradle mounted at said base plate via said engaging element and configured to support electrical wiring that is disposed along said base plate;
  a junction block cradle mounted at said base plate via said engaging element and configured to support a junction block assembly that is electrically coupled to the electrical wiring; and
  at least one end plate coupled to one of said ends of said base plate.

13. The wire management system of claim 12, wherein said engaging element comprises both an elongate upper lip along said upper edge portion of said base plate and an elongate lower lip along said lower edge portion of said base plate, and wherein said junction block cradle comprises (i) a back support plate configured for slidably engaging said elongate upper lip and said elongate lower lip, and (ii) a lower horizontal support that projects outwardly from said back support plate, and that is configured for supporting the junction block assembly.

14. The wire management system of claim 13, wherein said junction block cradle comprises said mounting bracket, which projects outwardly from said back support plate and is spaced above said lower horizontal support, and wherein said mounting bracket is configured to couple said base plate to an underside of the work surface.

15. The wire management system of claim 13, further comprising a connector bracket configured to be slidably coupled to said base plate via engagement with said elongate upper lip and said elongate lower lip, said connector bracket defining an opening for receiving a voice/data duplex connector.

16. The wire management system of claim 12, wherein said base plate comprises an elongate connecting ledge between said upper and lower lips.

17. The wire management system of claim 16, wherein said wire cradle comprises an arcuate shape for supporting the electrical wiring, and is coupled to said base plate via said connecting ledge.

18. The wire management system of claim 12, wherein said wire cradle is configured to receive an excess length of the electrical wiring in a wrapped manner.

19. The wire management system of claim 12, wherein said mounting bracket is configured to couple said base plate to an upper side of the work surface.

* * * * *